US007508977B2

(12) United States Patent
Lyons et al.

(10) Patent No.: US 7,508,977 B2
(45) Date of Patent: Mar. 24, 2009

(54) IMAGE PROCESSING APPARATUS

(75) Inventors: Alexander Ralph Lyons, Guildford (GB); Simon Michael Rowe, Guildford (GB); Richard Ian Taylor, Guildford (GB); Jane Haslam, Chertsey (GB)

(73) Assignee: Canon Kabushiki Kaisha, Tokyo (JP)

( * ) Notice: Subject to any disclaimer, the term of this patent is extended or adjusted under 35 U.S.C. 154(b) by 1122 days.

(21) Appl. No.: 10/793,850

(22) Filed: Mar. 8, 2004

(65) Prior Publication Data

US 2004/0247174 A1 Dec. 9, 2004

Related U.S. Application Data

(62) Division of application No. 09/718,342, filed on Nov. 24, 2000, now Pat. No. 6,980,690.

(30) Foreign Application Priority Data

| Jan. 20, 2000 | (GB) | ................................. | 0001300.3 |
| Jan. 21, 2000 | (GB) | ................................. | 0001479.5 |
| Jul. 27, 2000 | (GB) | ................................. | 0018492.9 |
| Aug. 3, 2000 | (GB) | ................................. | 0019082.7 |
| Aug. 3, 2000 | (GB) | ................................. | 0019089.2 |
| Aug. 3, 2000 | (GB) | ................................. | 0019120.5 |

(51) Int. Cl.
*G06K 9/00* (2006.01)

(52) U.S. Cl. ........................ 382/154; 382/285; 345/419; 356/12; 348/42

(58) Field of Classification Search ................. 382/154, 382/285, 305; 345/419–427, 700; 356/12–14; 348/42–60, 850; 359/462–477; 352/57–65; 33/20.4; 353/7–9; 378/41–42; 396/324–331; 707/104.1
See application file for complete search history.

(56) References Cited

U.S. PATENT DOCUMENTS

| 5,182,641 A | 1/1993 | Diner et al. | .................... 348/86 |
| 5,623,583 A | 4/1997 | Nishino | ....................... 345/420 |

(Continued)

FOREIGN PATENT DOCUMENTS

| EP | 0 403 125 A2 | 12/1990 |
| EP | 0 898 245 A1 | 2/1999 |

(Continued)

OTHER PUBLICATIONS

"Random Sample Consensus: A Paradigm for Model Fitting with Applications to Image Analysis and Automated Cartography", Communications of the ACM, Jun. 1981, vol. 24, No. 6, pp. 381 to 395, Martin A. Fischler and Robert C. Bolles, SRI International.

(Continued)

*Primary Examiner*—Aaron W Carter
(74) *Attorney, Agent, or Firm*—Fitzpatrick, Cella, Harper & Scinto

(57) ABSTRACT

A method of generating model data representative of a model in a three-dimensional space of an object from input signals representative of a set of images of the object taken from a plurality of respective camera positions includes the steps of displaying a model image derived from the model data and having a plurality of primitives for viewing by a user, receiving at least one primitive selection signal responsive to user actuation of an input whereby each primitive selection signal identifies a respective selected primitive of the model, and defining a plurality of virtual cameras in the three dimensional space having positions and look directions relative to the model which correspond substantially to those of the respective actual cameras relative to the object. Additional steps include evaluating which of the virtual cameras is an optimum virtual camera for generating a view of the selected primitives, identifying from the camera images a first camera image of the plurality of camera images taken from a camera position corresponding to that of the optimum virtual camera, and determining from the camera images a second camera image as being suitable for matching features in the first camera image and displaying the second camera image for comparison by the user with the first camera image.

21 Claims, 55 Drawing Sheets

U.S. PATENT DOCUMENTS

| | | | |
|---|---|---|---|
| 5,625,782 A | 4/1997 | Soutome et al. | 395/341 |
| 5,680,562 A | 10/1997 | Conrad et al. | 345/797 |
| 5,710,875 A | 1/1998 | Harashima et al. | 345/419 |
| 5,729,471 A | 3/1998 | Jain et al. | 725/131 |
| 5,745,098 A | 4/1998 | Yamaji | 345/121 |
| 5,777,620 A | 7/1998 | Billyard | 345/426 |
| 5,819,016 A | 10/1998 | Watanabe et al. | 395/119 |
| 5,850,352 A | 12/1998 | Moezzi et al. | 345/419 |
| 5,864,343 A | 1/1999 | Naughton et al. | 345/419 |
| 5,945,996 A | 8/1999 | Migdal et al. | 345/420 |
| 5,956,031 A | 9/1999 | Berteig et al. | 345/764 |
| 6,081,273 A | 6/2000 | Wend et al. | 345/425 |
| 6,121,966 A | 9/2000 | Teodosio et al. | 345/346 |
| 6,184,859 B1 | 2/2001 | Kojima | 345/130 |
| 6,222,551 B1 | 4/2001 | Schneider et al. | 345/419 |
| 6,224,214 B1 | 5/2001 | Martin et al. | 353/7 |
| 6,266,068 B1 * | 7/2001 | Kang et al. | 345/629 |
| 6,307,550 B1 | 10/2001 | Chen et al. | 345/418 |
| 6,346,938 B1 | 2/2002 | Chan et al. | 345/419 |
| 6,360,116 B1 | 3/2002 | Jackson et al. | 600/427 |
| 6,421,050 B1 | 7/2002 | Ruml et al. | 345/426 |
| 6,516,099 B1 | 2/2003 | Davison et al. | 382/284 |
| 6,525,731 B1 | 2/2003 | Suits et al. | 345/427 |
| 6,647,146 B1 | 11/2003 | Davison et al. | 382/199 |
| 6,668,082 B1 | 12/2003 | Davison et al. | 382/190 |
| 6,686,918 B1 | 2/2004 | Cajolet et al. | 345/473 |
| 2001/0056308 A1 | 12/2001 | Petrov et al. | 700/98 |
| 2002/0050988 A1 | 5/2002 | Petrov et al. | 345/418 |

FOREIGN PATENT DOCUMENTS

| | | |
|---|---|---|
| EP | 0898245 A1 | 2/1999 |
| EP | 0 901 105 | 3/1999 |
| EP | 0901105 | 3/1999 |
| EP | 1 086 730 A2 | 3/2001 |
| GB | 2 328 355 A | 2/1999 |
| GB | 2328355 A | 2/1999 |
| JP | 09-6984 A | 1/1997 |
| JP | 9-081778 A1 | 3/1997 |
| JP | 10-040421 A1 | 2/1998 |
| WO | WO 98/53428 A1 | 11/1998 |

OTHER PUBLICATIONS

"Closed-form Solution of Absolute Orientation Using Unit Quaternions", Berthold K. P. Horn, Department of Electrical Engineering, University of Hawaii at Manoa, Honolulu, 96720, vol. 4, No. 43/ Apr. 1987/J. Optical Society of America.

"Calibration of Image Sequences For Model Visualisation", A. Broadhurst et al., 1999 IEEE Computer Society Conference On Computer Vision and Pattern Recognition, vol. 1, pp. 100-105, Jun. 23-25, 1999, Fort Collins, Colorado.

"Efficient Bundle Adjustment With Virtual Key Frames: A Hierarchical Approach To Multi-Frame Structure From Motion" Heung-Yeung Shum et al., 1999 IEEE Computer Society Conference On Computer Vision and Pattern Recognition, vol. 2, pp. 538-543, Jun. 23-25, 1999, Fort Collins, Colorado.

"A Robust Technique For Matching Two Uncalibrated Images Through The Recovery of The Unknown Epipolar Geometry", Zhengyou Zhang et al., Research Report No. 2273, INRIA Sophia-Antipolis, pp. 15-47, Cedesc (France), 1994.

"Photorealistic Scene Reconstruction by Voxel Coloring", S. Seitz et al., Proc. Conf. Computer Vision and Pattern Recognition, pp. 1067-1073, 1997.

"Rapid Octree Construction From Image Sequences", R. Szeliski, CVGIP: Image Understanding, vol. 58, No. 1, pp. 23-48, Jul. 1993.

"Polynomial Expansion of Severely Aberrated Wave Fronts", J. Braat, J. Opt. Soc. Am. A, vol. 4, No. 4, pp. 643-650, Apr. 1987.

J. Bloomenthal, "An Implicit Surface Polygonizer", Graphics Gems IV.8, AP Professional 1994, pp. 324-350, ISBN 0-12-336155-9.

C. Wiles, et al., "Calibrating a Multi-Camera System for 3D Modelling," 1999 IEEE Workshop on Multi-View Modelling and Analysis of Visual Scenes, pp. 29-36, ISBN 0-7695-0110-9.

R. M. Haralick, et al., "The Facet Model," Computer and Robot Vision, vol. 1, Ch. 8, Addison-Wesley (1992), pp. 371-452, ISBN 0-201-10877-1.

R. M. Haralick, et al., "2D to 3D Interface Using Perspective Projection," Computer and Robot Vision, vol. 2, Ch. 13.4.15, Addison-Wesley (1993), pp. 85-91.

W.E. Lorensen, et al., "Marching Cubes: A High Resolution 3D Surface Construction Algorithm," Computer Graphics, SIGGRAPH 87 Proceedings, 21: 163-169 (Jul. 1987).

"Random Sample Consensus: A Paradigm for Model Fitting with Applications to Image Analysis and Automated Cartography", Martin A. Fischler and Robert C. Bolles, Communications of the ACM, Jun. 1981, vol. 24, No. 6, pp. 381 to 395, SRI International.

"Closed-Form Solution of Absolute Orientation Using Unit Quaternions", Berthold K. P. Horn, Department of Electrical Engineering, University of Hawaii at Manoa, Honolulu, 96720, vol. 4, No. 43/ Apr. 1987/J. Optical Society of America.

"Polynomial Expansion of Severely Aberrated Wave Fronts", J. Braat, J. Opt. Soc. Am. A, vol. 4, No. 4, pp. 643-650, Apr. 1987.

"An Implicit Surface Polygonizer", J. Bloomenthal, Graphics Gems IV.8, AP Professional, 1994, pp. 324-350, ISBN 0-12-336155-9.

"Calibrating a Multi-Camera System for 3D Modelling," C. Wiles, et al., 1999 IEEE Workshop on Multi-View Modelling and Analysis of Visual Scenes, pp. 29-36, ISBN 0-7695-0110-9.

"The Facet Model," R. M. Haralick, et al., Computer and Robot Vision, vol. 1, Ch. 8, Addison-Wesley (1992), pp. 371-452, ISBN 0-201-10877-1.

"2D to 3D Interface Using Perspective Projection," R. M. Haralick, et al., Computer and Robot Vision, vol. 2, Ch. 13.4.15, Addison-Wesley (1993), pp. 85-91.

"Marching Cubes: A High Resolution 3D Surface Construction Algorithm," W.E. Lorensen, et al., Computer Graphics, SIGGRAPH 87 Proceedings, 21: 163-169 (Jul. 1987).

"Epipolar Geometry in Stereo, Motion and Object Recognition", Gang Xu & Zhengyou Zhang, Camera Models and Epipolar Geometry, Chapter 2, pp. 7 to 37, 1996, Kluwer Academic Press.

"Plenoptic Image Editing", S. Seitz et al., Proc. 6th International Conf. On Computer Vision, pp. 17-24, 1998.

Package: ZoomText Xtra—see http://members.tripod.com/magnifiers/ztxtra/html, 2000-2005.

* cited by examiner

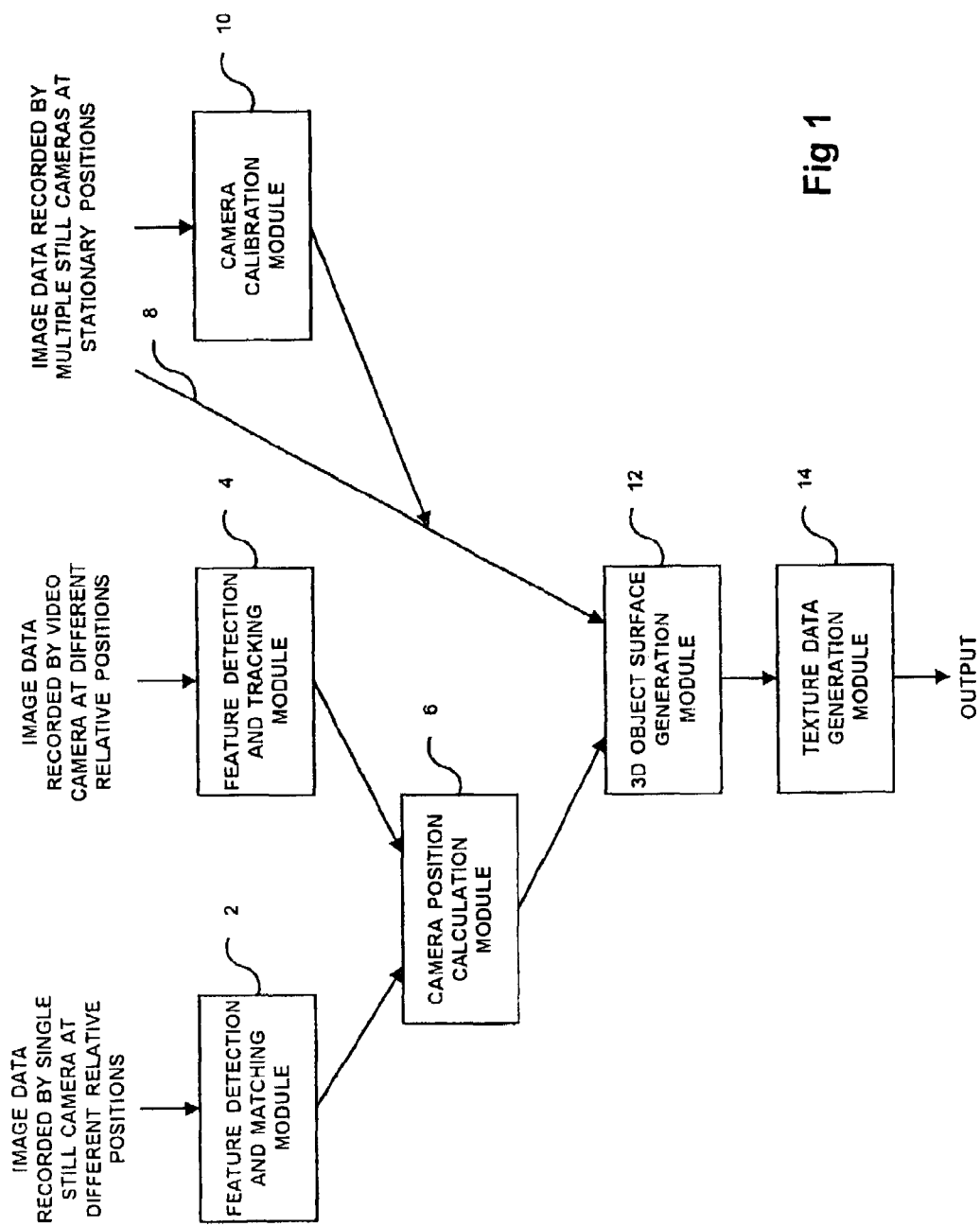

ACTUAL CAMERA POSITIONS RELATIVE TO THE OBJECT

VIRTUAL CAMERA POSITIONS RELATIVE TO THE MODEL

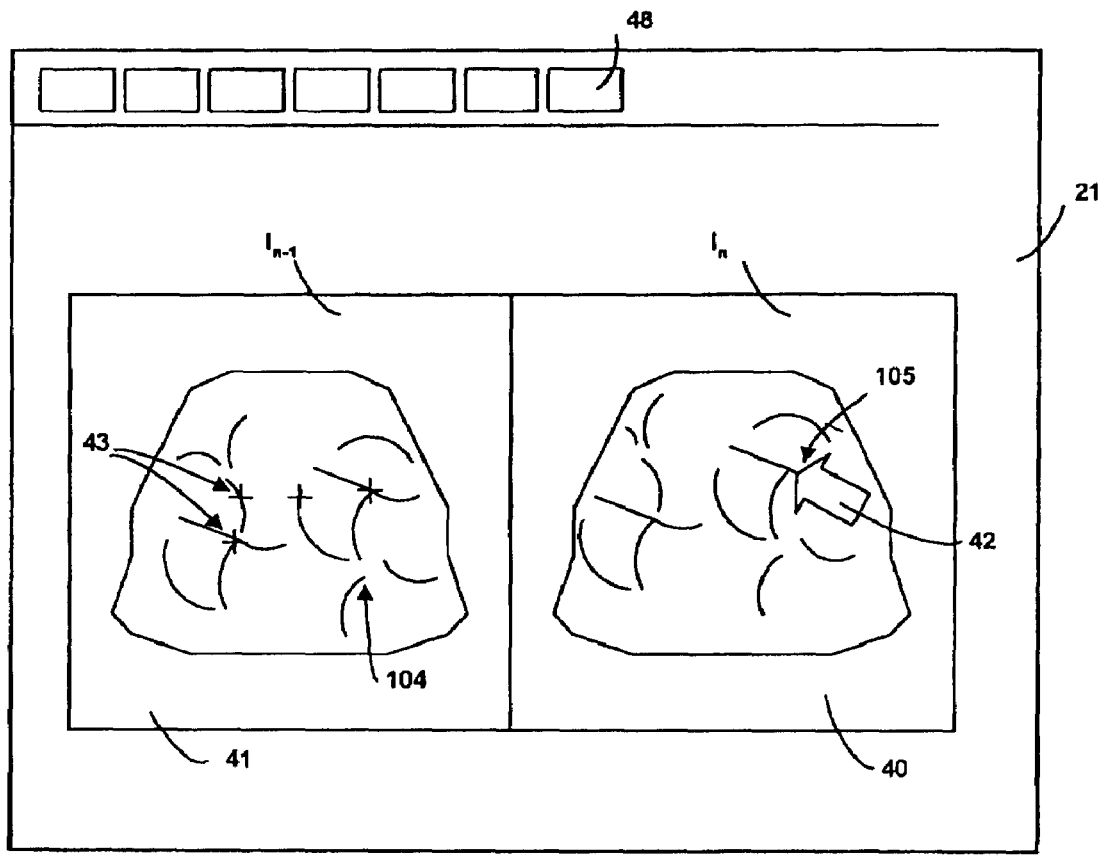

MAPPING EXISTING MODEL POINTS INTO THE VIRTUAL IMAGE PLANE AT THE VIRTUAL CAMERA POSITION OF THE NEW IMAGE USING THE PROVISIONAL CAMERA SOLUTION (STEP 67)

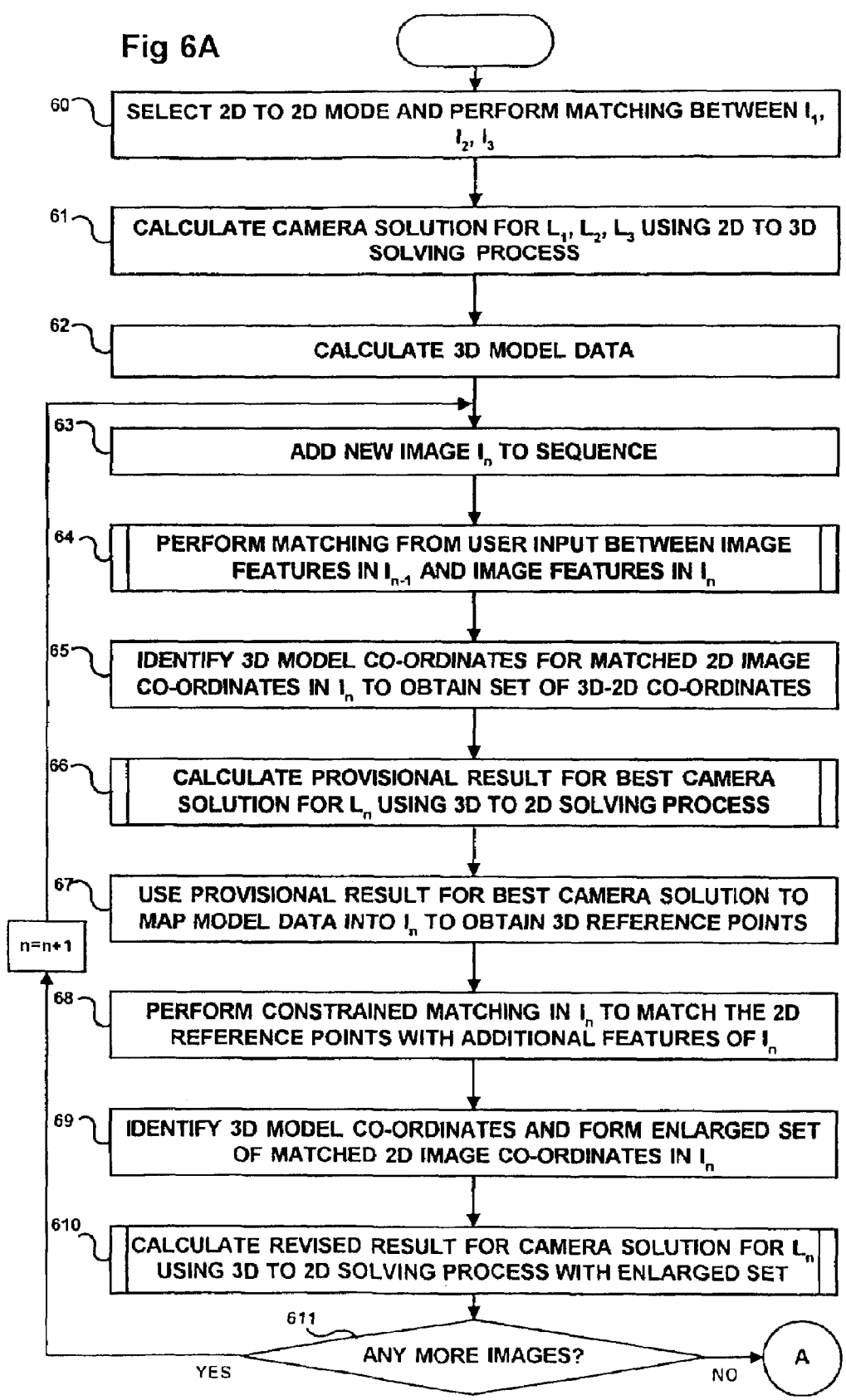

ADDITIONAL STEPS

CALCULATING CANDIDATE 3D - 2D CAMERA SOLUTION

MODEL WINDOW SHOWS FEATURE MISSING FROM MODEL IMAGE WHEN COMPARED WITH CAMERA IMAGE

IN CAMERA IMAGE WINDOW, USER SELECTS NEW IMAGE POINT FOR ADDITION TO MODEL

MODEL CALCULATES LOCUS OF NEW MODEL POINT

IN MODEL WINDOW, MODEL IMAGE IS DISPLAYED FROM A DIFFERENT VIEWING ANGLE AND USER MOVES NEW MODEL POINT TO REQUIRED POSITION, CONSTRAINED BY CALCULATED LOCUS

IN MODEL WINDOW, USER SELECTS EXISTING MODEL POINTS FOR CONNECTION TO NEW POINT

IN MODEL WINDOW, MODEL IMAGE NOW SHOWS NEW MODEL POINT AND FACETS

ADDING A NEW MODEL POINT

CAMERA SELECTION WINDOW WITH CAMERA ICONS

CAMERA SELECTION WINDOW WITH CAMERA IMAGES

CALCULATE FACET INTERSECTED BY RAY THROUGH
CAMERA POSITION AND ADDED MODEL POINT

SUBDIVIDE FACET TO INCLUDE ADDED MODEL POINT

DISPLAY NEW MODEL INCLUDING ADDED POINT AND NEW FACETS

IDENTIFY COORDINATES IN CAMERA IMAGE OF
FEATURE CORRESPONDING TO ADDED MODEL POINT

CALCULATE FACET INTERSECTED BY RAY THROUGH
CAMERA IMAGE POINT AND ADDED MODEL POINT

CAMERA POSITIONS IN RELATION TO OBJECT

Fig 37  FIRST PHASE
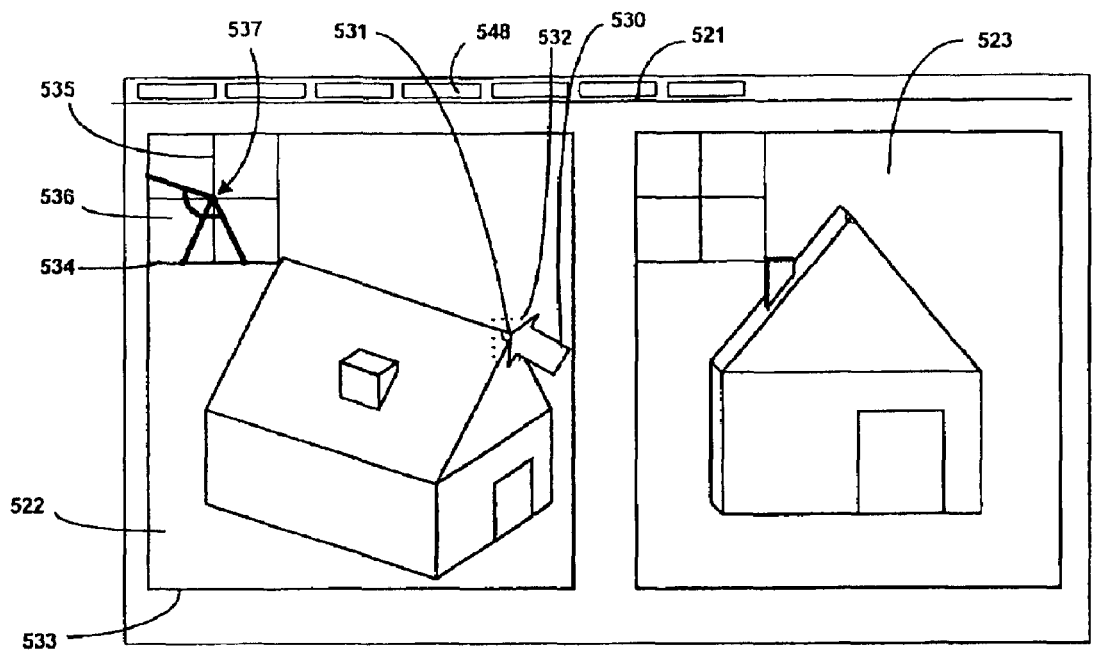
Fig 38  SECOND PHASE
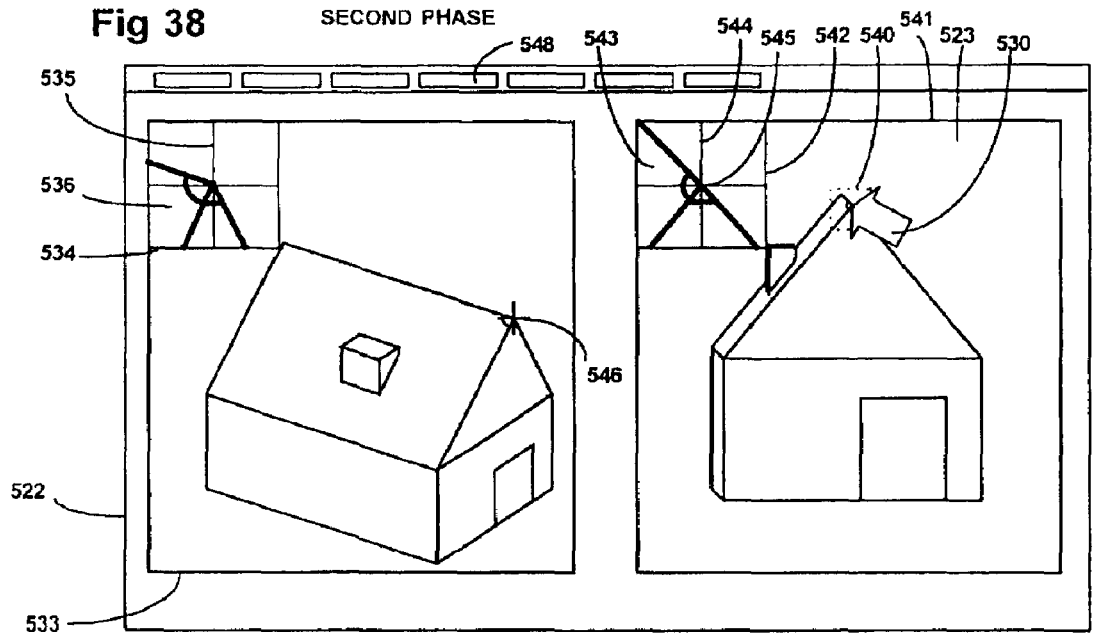

SELECTION OF MULTIPLE FACETS AND DISPLAY OF OPTIMUM AND COMPLEMENTARY CAMERA IMAGES

VIRTUAL CAMERA POSITIONS RELATIVE TO THE MODEL

UNIT VECTORS FOR ASPECT MEASUREMENT

VISIBLE AREA MEASUREMENT FOR A GIVEN FACET

HISTOGRAM OF ASPECT MEASUREMENT FOR A GIVEN FACET FOR EACH VIRTUAL CAMERA

HISTOGRAM SHOWING FREQUENCY WITH WHICH VIRTUAL CAMERAS ARE SELECTED AS CANDIDATE CAMERAS

MODEL POINT MOVED BY USING DRAG AND DROP METHOD

IMAGE PROCESSING APPARATUS

CROSS REFERENCE TO RELATED APPLICATION

This application is a division of application Ser. No. 09/718,342, filed Nov. 24, 2000, now U.S. Pat. No. 6,980, 690.

This invention relates to an apparatus and method of operation of a processor for generating model data for a model in a three-dimensional space from image data representative of a set of camera images of an object.

BACKGROUND OF THE INVENTION

It is known from EP-A-0898245 to process images of the object taken from different, unknown positions using a matching process in which points in different images which correspond to the same point of the actual object are matched, the matching points being used to determine the relative positions and orientations of cameras from which the images were taken and to then generate model data. This process of determining the camera positions is referred to as calculating a camera solution and EP-A-0898245 discloses a camera solution process relying upon epipolar geometry between virtual image planes of cameras at camera positions from which corresponding images were obtained.

Having solved the camera positions and orientations for an initial three cameras corresponding to an initial three images in a sequence of camera images using a first solution algorithm, EP-A-0898245 teaches that each new image of the sequence of images requires its camera solution to be obtained using a second camera solution algorithm which assumes the camera solution for the preceding image in the sequence to be accurately known from previous calculations. Matching points between the new image and the preceding images in the sequence may then be processed to accumulate further model data.

This known method of camera solution, referred to below as a 2-D to 2-D camera solution process, effectively takes as a starting point pairs of co-ordinates in virtual image planes of a pair of virtual cameras in the three-dimensional model space and calculates the parameters defining the position and orientation of each camera based on these pairs of two-dimensional image co-ordinates for matching points.

SUMMARY OF THE INVENTION

It is an object of the present invention to provide an apparatus and method for model generation in which the camera solution process relating to the addition of each new image is improved.

According to the present invention there is disclosed an apparatus and method for generating model data without relying solely upon the 2-D to 2-D camera solution process. Once an initial sequence of images is processed and initial model data generated, camera solutions for subsequent images are calculated by a different process which utilises the model data.

A further aspect of the present invention relates to an apparatus and method of operation thereof for generating model data of a model in a three-dimensional space from image data representative of a set of camera images of an object.

It is known to create three-dimensional computer models of real objects based on the input of image data in the form of a series of image frames which may be derived from a series of photographs taken from different camera positions or from a video recording taken from a moving camera.

Having generated a set of model data, a model image is displayed and may be compared with camera images of the object from which the existing model data has been derived.

One aspect of the present invention relates to refinement of the existing model data by allowing a user to identify an additional feature in one of the camera images, this feature being absent from the displayed model image, and which the user wishes to include in the model by the input of additional model data.

One method of refining the model in this respect requires the user to continue the process of entering matching points identified in successive image frames and the apparatus to then process the matching point data by re-running the model program to incorporate an expanded set of data. This process however requires a substantial amount of computer processing effort with consequent delay. In some instances, the additional feature may only be visible in a single frame, making it impossible to identify a matching point in a second frame.

The present invention seeks to provide an improved method and apparatus allowing an additional feature to be added as a result of user input based on a single frame.

According to the present invention there is disclosed a method of operating an apparatus for generating model data representative of a model in a three dimensional space from image data representative of a set of camera images of an object;

the apparatus performing the steps of;
displaying a model image based on an existing set of model data;
displaying one of the camera images of the object for selection by a user of an additional feature to be represented by additional model data;
receiving an image point selection signal responsive to user actuation of an input means and identifying co-ordinates of an image point in the camera image defining the selected additional feature;
calculating a locus in the three dimensional space defining positions of possible model points corresponding to the image point and consistent with the geometric relationship between the object and a camera position from which the displayed camera image was taken;
displaying a position indicator in the model image at co-ordinates in the model image corresponding to one of the possible model points on the locus;
receiving positioning signals responsive to user actuation of the input means and updating the co-ordinates of the position indicator such that movement of the position indicator is constrained to follow a trajectory in the model image corresponding to the locus;
receiving a model point selecting signal responsive to user actuation of the input means and determining selected co-ordinates of the position indicator to be the position indicator co-ordinates at the time of receiving the model point selecting signal; and
determining co-ordinates of the additional model point in the three dimensional space corresponding to the selected co-ordinates of the position indicator.

In a preferred embodiment, the locus is a straight line in the three-dimensional model space, the straight line being displayed in the model image as a visual aid to the user in editing the position of the new model point.

After finalising the position of the new model point, a model generating process is initiated to incorporate the additional model point into the model data and to generate surface elements of the model, allowing the new model image to be displayed including the surface elements for comparison with the camera image.

A further aspect of the present invention relates to the manner in which the model data is edited when a new model point is added to the existing set of model data, either using the above disclosed method or by other methods. Incorporation of an additional model point generally requires the surface elements of the existing model to be modified, at least one of the surface elements being replaced by a plurality of new elements which include the new model point. This aspect of the invention addresses the problem of selecting the surface element to be modified or replaced in a manner which is simple for the user to implement.

According to this aspect of the present invention there is disclosed a method of operating an apparatus for generating model data defining a model in a three dimensional space, the model data comprising co-ordinates defining model points and surface elements generated with reference to the model points; the method comprising editing an existing set of model data by the steps of;

adding a new model point to the existing set of model data;

projecting the new model point onto the model and identifying a selected one of the surface elements onto which the new model point is projected;

identifying a subset of the model points which define the generation of the selected surface element;

adding the new model point to the subset to form an edited subset of model points; and generating one or more edited surface elements from the edited subset of model points to replace the selected surface element.

The identification of the surface element to be replaced is thereby automatically implemented by the apparatus, by operating a computer program selected by the user.

In a preferred embodiment, the projection of the new model point onto the model is processed by defining a centre of projection corresponding to one of the camera positions from which frames of the camera image data were obtained. An interface allowing the user to select an appropriate camera position may comprise a display of a pictorial representation showing the relative positions of the object and the cameras, the camera positions being represented by icons which may be selected by clicking a computer mouse or other input device.

A further embodiment provides an alternative interface in which thumbnail images of the camera image frames are presented to the user, each thumbnail image constituting an icon allowing selection using a pointing device such as a computer mouse in conjunction with a moveable cursor on the display screen.

A further aspect of the present invention relates to the need to enable the user to evaluate the quality of a model in order to judge whether further refinement of the model data is required and to judge whether any editing procedure has been correctly effected or requires further editing.

This aspect of the invention seeks to provide the user with an interface allowing the user to view a model image for comparison with a camera image, it being advantageous to present the user with compatible views for ease of comparison. The selection of the appropriate model image for comparison with a specific camera image may be time consuming and complex to the user.

According to the present invention there is disclosed a method of operating an apparatus for generating model data representative of a three dimensional model of an object from input signals representative of a set of camera images of the object taken from a plurality of camera positions, the method comprising;

displaying a set of icons, each being associated with a respective one of the camera images of the object;

receiving a selection signal responsive to user actuation of an input means whereby the selection signal identifies a selected one of the icons;

determining a selected camera image from the set of camera images corresponding to the selected icon;

displaying the selected image;

determining position data representative of a selected camera position from which the selected image was taken;

generating in accordance with said model a model image representative of a view of the model from a viewpoint corresponding to the position data; and displaying the model image for visual comparison with the selected image by the user.

This method therefore allows the user to simply select a camera image using a set of icons and provides automatic processing using a computer program to generate a model image representative of a view of the model from a viewpoint corresponding to position data determined when the user selects a particular icon.

The icons may be representations of camera positions relative to a representation of the object being modelled or alternatively the icons may be thumbnail images of the frames of camera image data.

The user is thereby presented with a computer interface allowing correctly comparable model and camera images to be rapidly selected for evaluation. The selection process may thereby be repeated to view the images from different viewpoints in order to rapidly gain an overview of the quality of the model data as a basis for deciding whether further editing is required.

A further aspect of the present invention relates to an image processing apparatus and method.

It is known to create three dimensional computer models of real objects based on the input of image data in the form of a series of image frames which may be derived from a series of photographs taken from different camera positions or from a video recording taken from a moving camera. It is also known for such modelling techniques to require a user to identify coordinates in successive images of matching points, the input coordinates of matching points then being processed to create or refine the model, for example by calculating the positions in the coordinate system of the model from which the successive images were viewed by the camera and the three dimensional positions of the model points corresponding to the matched points.

This matching process of entering coordinates typically involves the user being presented on a display screen with a pair of successive images, for example in side by side relationship, and the user then being prompted to use a pointing device such as a computer mouse to move a cursor onto each selected image point and enter the coordinates of the point simply by actuating the pointing device, i.e. clicking the mouse, when the cursor is judged visually to be at the precise location of the image point selected.

It is also known to provide variable magnification of the displayed image as a whole in order to enable a user to zoom in on a portion of a displayed image of interest, thereby improving the accuracy with which the cursor position can be located prior to clicking the mouse.

It is also known to provide a portion of the display area with an enhanced magnification, typically referred to as a magnifying glass window, which can be moved under user actuation or selected by user actuation to provide localised enhanced magnification of the area of interest.

A problem exists in such known systems in that selection and control of the variable magnification facility requires additional actuation by the user of a keyboard or of the pointing device, thereby increasing complexity of operation and the amount of time required to complete the matching process.

Similar problems exist in processing image data for other purposes where it is required to repeatedly select a point within one frame and then, select an associated point in a second frame with as much accuracy as possible in positioning the cursor in each case over the selected point.

One aspect of the present invention seeks to provide an improved apparatus and method of processing such image data.

A further aspect of the present invention is concerned with the manner in which frames of the image data are selected when a user decides that it is necessary to update model data, either by adding further detail or correcting existing data, usually in respect of a particular localised feature of the model. If for example the model is to be updated by entering matching points between two frames of image data, the user must locate a pair of suitable image frames which present the relevant feature to the best advantage. Similarly, if data is to be corrected, the best view of the feature needs to be presented to the user in a frame of the image data for comparison with the model image.

A further aspect of the present invention therefore seeks to provide an improved method and apparatus allowing the most appropriate camera images to be selected and displayed for use in the updating procedure.

According to the present invention there is disclosed a method of operating an apparatus for processing image data in accordance with user selected co-ordinates of displayed images representative of said image data; the apparatus performing the steps of;

displaying a first image representative of a first frame selected from said image data;

receiving pointing signals responsive to user actuation of a pointing device and displaying a cursor in the first image indicating an image point at a cursor position controlled by the pointing signals such that the cursor position is updated to track movement of the pointing device;

generating magnified image data representative of a first magnified image of a portion of the first image local to the cursor position and in fixed relationship thereto, and continuously updating the magnified image data in response to changes in the cursor position;

displaying the first magnified image simultaneously with the first image together with fiducial means indicating an image point in the first magnified image corresponding to the image point indicated in the first image at the cursor position; and receiving a selection signal responsive to user actuation of said pointing device and representative of co-ordinates of a first selected point in the first image indicated by the current cursor position.

Preferably the method further includes the step of displaying a second image representative of a second frame of said image data;

receiving pointing signals responsive to user actuation of the pointing device and displaying the cursor in the second image indicating an image point at a cursor position controlled by the pointing signals such that the cursor position is updated to track movement of the pointing device;

generating magnified image data representative of a second magnified image of a portion of the second image local to the cursor position and in fixed relationship thereto, and continuously updating the magnified image data in response to changes in the cursor position;

displaying the second magnified image simultaneously with the second image with second fiducial means indicating an image point in the second magnified image corresponding to the image point indicated in the second image at the cursor position; and receiving a selection signal responsive to user actuation of said pointing device and representative of co-ordinates of a second selected point in the second image indicated by the current cursor position.

According to a further aspect of the present invention there is disclosed a method of operating an apparatus for generating model data representative of a model in a three dimensional space of an object from input signals representative of a set of images of the object taken from a plurality of respective camera positions, the apparatus performing the steps of;

displaying a model image derived from the model data and comprising a plurality of primitives for viewing by a user;

receiving at least one primitive selection signal responsive to user actuation of an input means whereby each primitive selection signal identifies a respective selected primitive of the model;

defining a plurality of virtual cameras in the three dimensional space having positions and look directions relative to the model which correspond substantially to those of the respective actual cameras relative to the object;

evaluating which of the virtual cameras is an optimum virtual camera for generating a view of the selected primitives;

identifying from the camera images a first camera image of the plurality of camera images taken from a camera position corresponding to the optimum viewpoint.

In a preferred embodiment, the primitives are facets and the evaluating step calculates aspect measurements representative of the visibility of the facet when viewed in the look direction of each virtual camera. An alternative evaluating step calculates areas of the facet when viewed in projection in the look direction of each of the virtual cameras. In each case, the results of calculation are analysed to determine an optimum virtual camera and a complementary virtual camera so that a pair of camera images may be selected for display.

BRIEF DESCRIPTION OF THE DRAWINGS

Preferred embodiments of the present invention will now be described by way of example only and with reference to the accompanying drawings of which;

FIG. 1 schematically shows the components of a modular system in which the present invention may be embodied;

FIG. 4 is a diagram illustrating a display screen in which camera images are displayed for matching;

FIGS. 6A and 6B is a schematic flowchart illustrating the overall process for generating model data and calculating camera solutions;

FIG. 32 illustrates a display screen of a computer interface allowing viewpoints to be selected by a user for selecting both camera image and model image;

FIG. 33 is a flowchart illustrating the method of implementing the interface of FIG. 32;

FIG. 34 illustrates an alternative interface display allowing image selection using camera position icons;

FIG. 35 is a flowchart illustrating the operation of the interface of FIG. 34;

FIG. 37 is a schematic representation of images displayed in the display screen of FIG. 36 in accordance with one aspect of the present invention, showing a first phase of operation in which a cursor is positioned in a first image;

FIG. 38 is a further view of the display of FIG. 37 showing a second phase in which the cursor is positioned in a second image;

DETAILED DESCRIPTION OF THE PREFERRED EMBODIMENTS

Figure 2A:
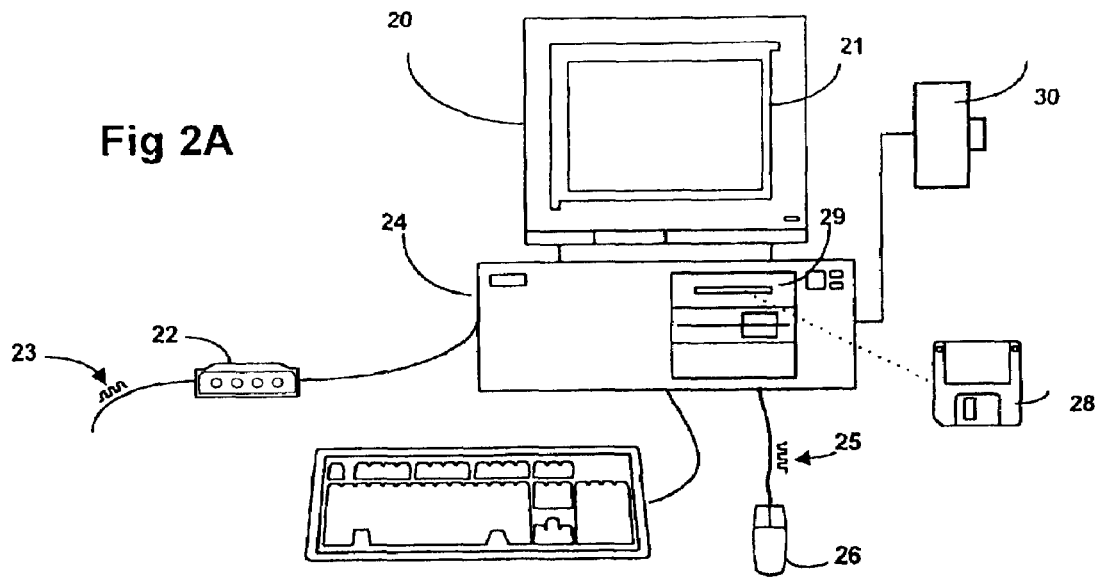
FIG. 2A is a schematic illustration of apparatus in accordance with the present invention.

FIG. 1 schematically shows the components of a modular system in which the present invention may be embodied.

These components can be effected as processor-implemented instructions, hardware or a combination thereof.

Referring to FIG. 1, the components are arranged to process data defining images (still or moving) of one or more objects in order to generate data defining a three-dimensional computer model of the object(s).

The input image data may be received in a variety of ways, such as directly from one or more digital cameras, via a storage device such as a disk or CD ROM, by digitisation of photographs using a scanner, or by downloading image data from a database, for example via a datalink such as the Internet, etc.

The generated 3D model data may be used to: display an image of the object(s) from a desired viewing position; control manufacturing equipment to manufacture a model of the object(s), for example by controlling cutting apparatus to cut material to the appropriate dimensions; perform processing to recognise the object(s), for example by comparing it to data stored in a database; carry out processing to measure the object(s), for example by taking absolute measurements to record the size of the object(s), or by comparing the model with models of the object(s) previously generated to determine changes therebetween; carry out processing so as to control a robot to navigate around the object(s); store information in a geographic information system (GIS) or other topographic database; or transmit the object data representing the model to a remote processing device for any such processing, either on a storage device or as a signal (for example, the data may be transmitted in virtual reality modelling language (VRML) format over the Internet, enabling it to be processed by a WWW browser); etc.

The feature detection and matching module 2 is arranged to receive image data recorded by a still camera from different positions relative to the object(s) (the different positions being achieved by moving the camera and/or the object(s)). The received data is then processed in order to match features within the different images (that is, to identify points in the images which correspond to the same physical point on the object(s)).

The feature detection and tracking module 4 is arranged to receive image data recorded by a video camera as the relative positions of the camera and object(s) are changed (by moving the video camera and/or the object(s)). As in the feature detection and matching module 2, the feature detection and tracking module 4 detects features, such as corners, in the images. However, the feature detection and tracking module 4 then tracks the detected features between frames of image data in order to determine the positions of the features in other images.

The camera position calculation module 6 is arranged to use the features matched across images by the feature detection and matching module 2 or the feature detection and tracking module 4 to calculate the transformation between the camera positions at which the images were recorded and hence determine the orientation and position of the camera focal plane when each image was recorded.

The feature detection and matching module 2 and the camera position calculation module 6 may be arranged to perform processing in an iterative manner. That is, using camera positions and orientations calculated by the camera position calculation module 6, the feature detection and matching module 2 may detect and match further features in the images using epipolar geometry in a conventional manner, and the further matched features may then be used by the camera position calculation module 6 to recalculate the camera positions and orientations.

If the positions at which the images were recorded are already known, then, as indicated by arrow 8 in FIG. 1, the image data need not be processed by the feature detection and matching module 2, the feature detection and tracking module 4, or the camera position calculation module 6. For example, the images may be recorded by mounting a number of cameras on a calibrated rig arranged to hold the cameras in known positions relative to the object(s).

Alternatively, it is possible to determine the positions of a plurality of cameras relative to the object(s) by adding calibration markers to the object(s) and calculating the positions of the cameras from the positions of the calibration markers in images recorded by the cameras. The calibration markers may comprise patterns of light projected onto the object(s). Camera calibration module 10 is therefore provided to receive image data from a plurality of cameras at fixed positions showing the object(s) together with calibration markers, and to process the data to determine the positions of the cameras. A preferred method of calculating the positions of the cameras (and also internal parameters of each camera, such as the focal length etc) is described in "Calibrating and 3D Modelling with a Multi-Camera System" by Wiles and Davison in 1999 IEEE Workshop on Multi-View Modelling and Analysis of Visual Scenes, ISBN 0769501109.

The 3D object surface generation module 12 is arranged to receive image data showing the object(s) and data defining the positions at which the images were recorded, and to process the data to generate a 3D computer model representing the actual surface(s) of the object(s), such as a polygon mesh model.

The texture data generation module 14 is arranged to generate texture data for rendering onto the surface model produced by the 3D object surface generation module 12. The texture data is generated from the input image data showing the object(s).

Techniques that can be used to perform the processing in the modules shown in FIG. 1 are described in EP-A-0898245, EP-A-0901105, pending U.S. application Ser. Nos. 09/129,077, 09/129,079 and 09/129,080, the full contents of which are incorporated herein by cross-reference, and also Annex A.

The following embodiments of the present invention described with reference to FIGS. 1 to 35 may be embodied in particular as part of the camera position calculation module 6.

Figure 2B:
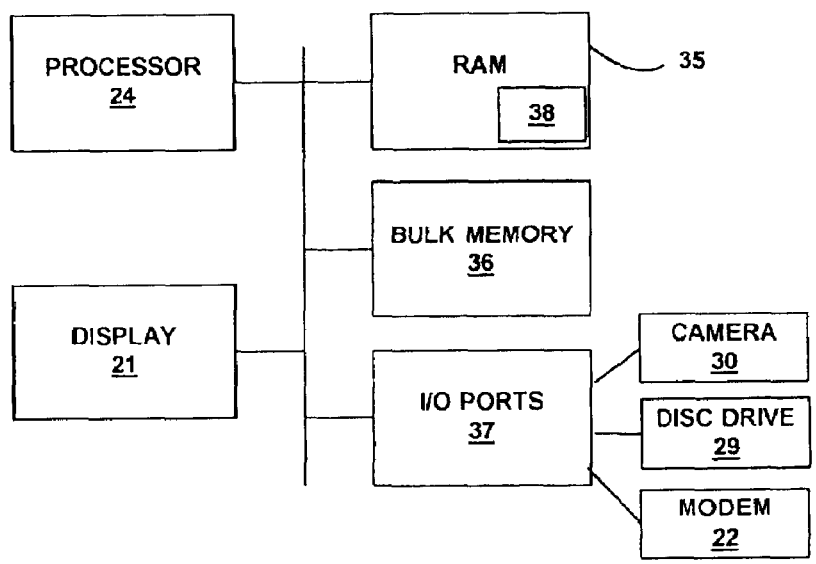
FIG. 2B is a schematic diagram showing the functional components of the apparatus of FIG. 2A.

FIGS. 2A and 2B illustrate apparatus for use in carrying out the present invention, the apparatus being in the form of a desk top computer having a processor 24 with associated random access memory 35 and mass storage memory 36. FIG. 2A illustrates a display monitor 20 which is controlled by the processor 24 and comprises a display screen 21 for the display of images and for use in interactively controlling the processor in generating the model as described below. The random access memory 35 includes a concordance table 38 described below.

A computer mouse 26 used in conjunction with a displayed cursor provides pointing signals 25 in a conventional manner and a keyboard 27 is also provided for the input of user data.

Software for operating the processor 24 may be input to the processor 24 from a portable storage medium in the form of a floppy disc 28 via a disc drive 29.

A modem 22 is also connected to the processor 24 for the input of signals 23 carrying program code or data transmitted over a network such as the internet.

Images $I_n$ (n=1 to N) in the form of files of image data are input to the processor 24 by connecting a digital camera 30 to an input port 37 of the processor 24.

Figure 3A:
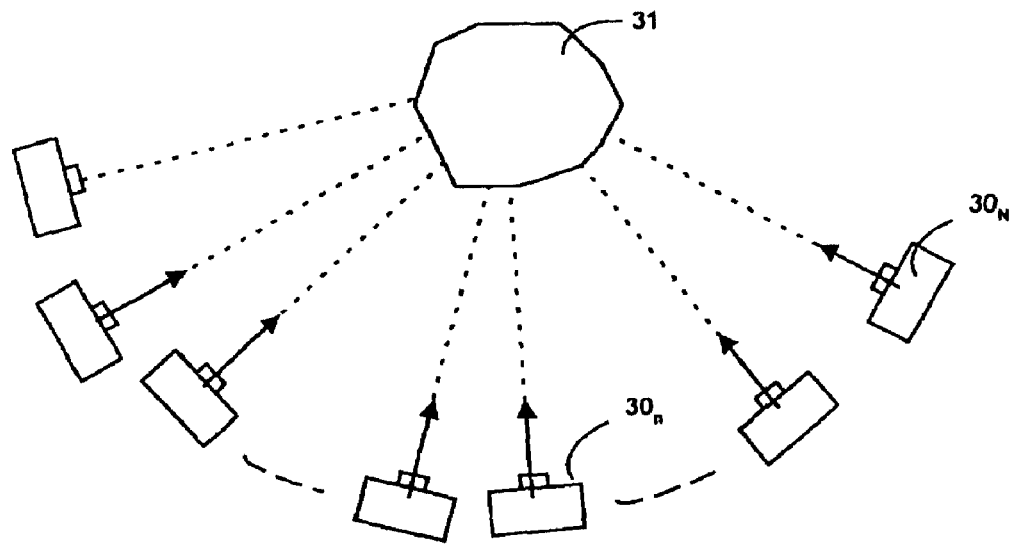
FIG. 3A is a schematic diagram showing actual camera positions relative to the object.

FIG. 3A illustrates the actual positions 30, of the camera 30 at which successive images in an ordered sequence (n=1 to N) are taken of an object 31. The sequence is ordered such that, when viewed in plan view from above, the successive positions of the camera 30 move in a progressively anticlockwise direction relative to the object 31.

Figure 3B:
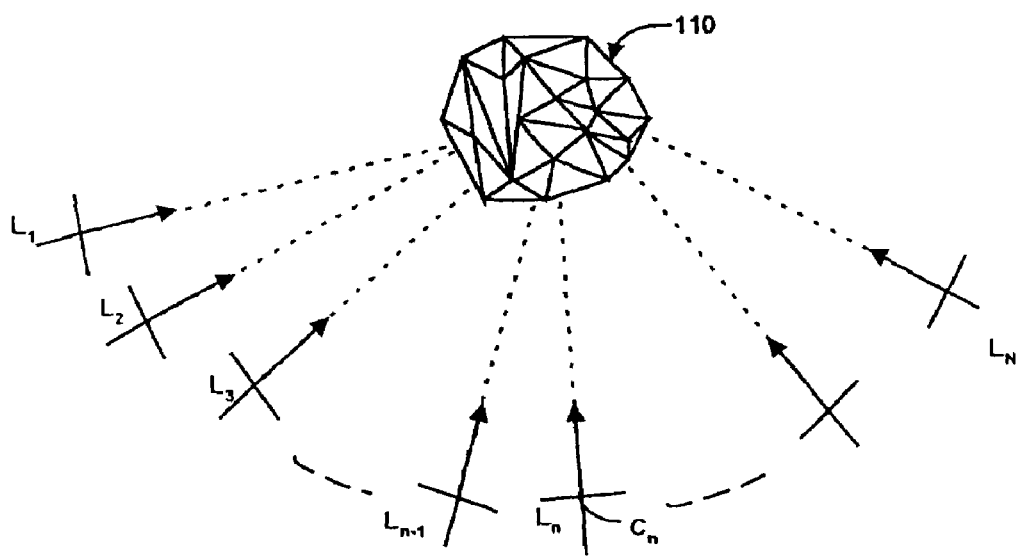
FIG. 3B is a schematic diagram showing virtual camera positions relative to the model.

FIG. 3B shows the model 110 in the three-dimensional space of the model and virtual cameras $L_n$ (n=1 to N), each virtual camera $L_n$ being represented by a respective centre of projection $C_n$ and a virtual image plane 32 spaced from the centre of projection by the focal length of the camera.

The actual positions 30n of the camera 30 in FIG. 3A will not in general be known and are therefore calculated by the camera position calculation module 6 from an analysis of the images themselves. An initial camera solution, i.e. calculation of the position and orientation of the virtual cameras $L_n$ relative to the model 110 in the co-ordinate system of the model as shown in FIG. 3B, is performed for the initial three camera images $I_1, I_2, I_3$ to obtain solutions for virtual cameras $L_1, L_2$ and $L_3$. To perform the calculation, it is necessary to identify matching points in images $I_1$ and $I_2$ and to identify corresponding pairs of matching points in images $I_2$ and $I_3$, thereby establishing data in the concordance table 38 of matching points across three images. The camera solution is then calculated using a process hereafter referred to as a 2-D to 2-D process which utilises epipolar geometry, i.e. based on the positions of the matched points in the two-dimensional images when mapped onto the virtual image planes 32 in order to deduce the camera transformation.

A set of model coordinates representative of model points correspond to image points for the matched two dimensional coordinates is then calculated on the basis of the camera solution and entered in the concordance table 38.

Once an initial camera solution from the first triplet of images $I_1, I_2, I_3$ has been calculated, a different solving process is adopted for subsequent virtual cameras $L_n$ (n>3) derived from subsequent images $I_n$ in the sequence. This process utilises the information in the concordance table 38 to identify new matching points found in each new image with coordinates of the existing model data. The camera solution for the new camera is then calculated based on a set of three dimensional model coordinates and corresponding two dimensional image coordinates in the new image. This process is referred to below as a 3-D to 2-D process.

In the solving process, the assumption is made of the camera being representable by a pinhole camera model and that the internal camera parameters of the camera are known.

The overall process of building the model data and performing the camera solutions for a set of images will now be described with reference to the flowchart, of FIGS. 6A and 6B. At step 60, the user selects the 2-D to 2-D camera solution process by selecting the appropriate mode selecting icon 48 as illustrated in FIG. 4 and performs matching between the first triplet of images, $I_1, I_2$ and $I_3$. This matching process involves the display of pairs of images for inspection by the user who then selects matching pairs by using the mouse 26 and cursor 42 to select matching features in each of the pair of images. When the user has finished matching, the user terminates the matching step by the input of a predetermined control command.

At step 61, the processor 24 calculates the camera solution for the triplet of initial virtual cameras $L_1, L_2$ and $L_3$, using the 2-D to 2-D solving process, thereby calculating the position of the respective image plane and look direction for each of the three virtual cameras in the three dimensional space of the model.

At step 62, the processor 24 calculates model data in three dimensions from the measured co-ordinates of matching features established for the initial triplet of images and stores the results with the matching feature data in the concordance table 38. The concordance table then contains an accumulation of data in which the two dimensional coordinates of matching image points are related to the three dimensional co-ordinates of model points.

At step 63, the processor 24 displays a new image $I_n$ (in this case n=4) for matching with the preceding image $I_{n-1}$ and prompts the user to perform matching at step 64 between the new image $I_n$ and the preceding image $I_{n-1}$. This matching process is illustrated in FIG. 4 which illustrates the display screen 21 where images $I_n$ and $I_{n-1}$ are displayed for comparison in respective image windows 40 and 41.

FIG. 4 also illustrates a row of mode selecting icons 48 which, as mentioned above, may be selected using the cursor 42 and mouse 26 in order to select the various modes of operation adopted by the processor 24 in the modelling and camera solving processes.

Figure 7:
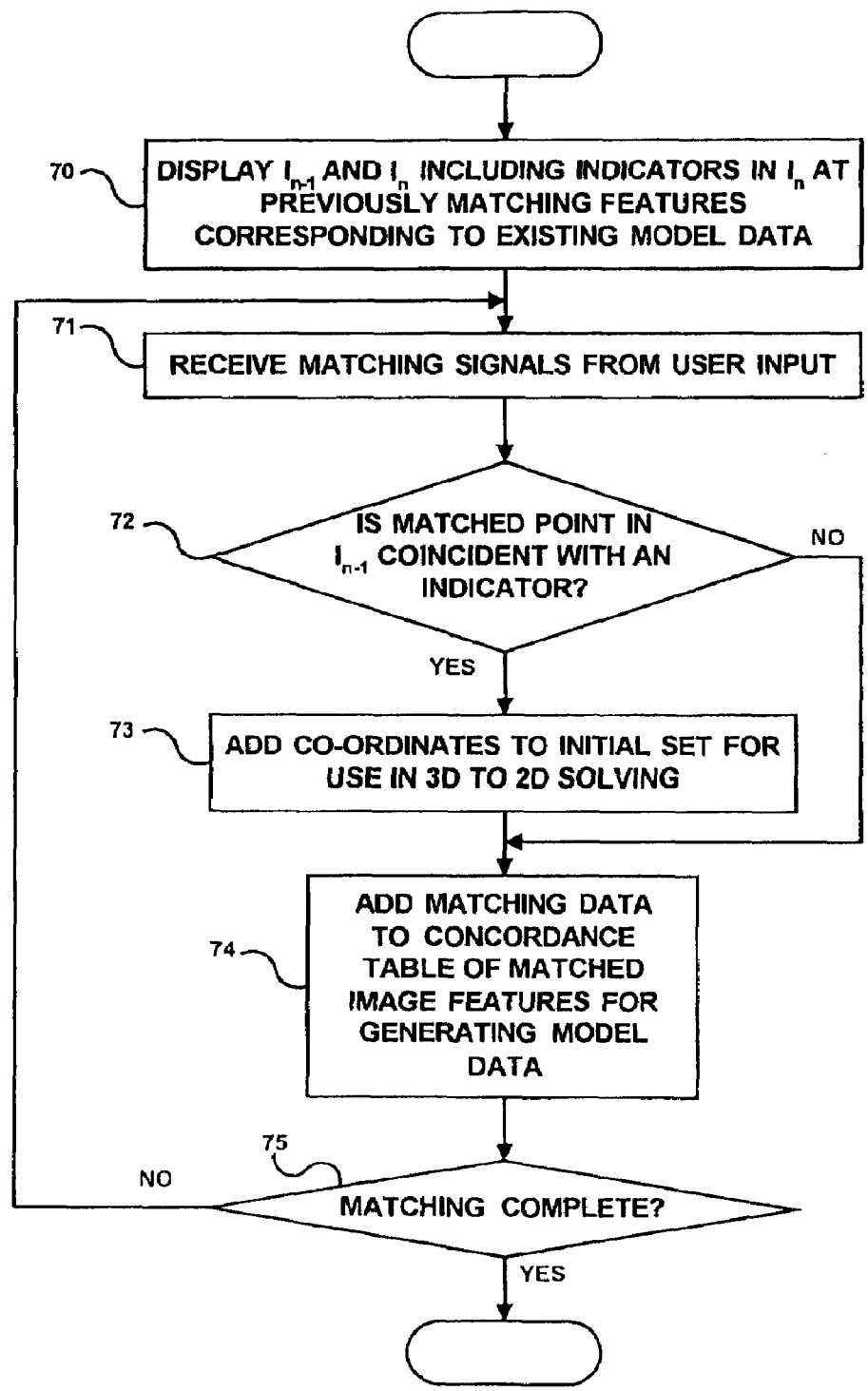
FIG. 7 is a flowchart illustrating the matching process enabling a provisional camera solution for a new image to be performed.

At step 64, the user enters co-ordinates of pairs of matching image points and the processor 24 performs matching between the new image $I_n$ and previous image $I_{n-1}$ in a manner which is shown in greater detail in the flowchart of FIG. 7. At step 70 of FIG. 7, the processor 24 controls the display 20 to display the images $I_n$ and $I_{n-1}$ including indicators 43 in the image $I_{n-1}$ which identify previously matched image points for which existing model data is stored in the concordance table. The user enters co-ordinates of matching image points by using the mouse 26 to move the cursor 42 between the displayed images and select matching features. In some cases, the resulting selection signals 25 received by the processor 24 at step 71 will be determined at step 72 to define a matching pair of points which include a point in $I_{n-1}$ coincident with one of the indicators 43, such matching points being entered at step 73 into an initial set of two dimensional coordinate data to be used in the 3-D to 2-D solving process. The matching data obtained in the matching step 71 is entered at step 74 into the concordance table 38 for use in generating further model data.

The remaining matched points which at step 72 are determined to relate to features in $I_{n-1}$ not previously matched are also added at step 74 as new entries in the concordance table of matched image features to be available for subsequent use in generating further model data.

When at step 75 the matching process is determined to have been terminated by the user inputting a predetermined control command, the processor 24 then begins to process the initial set of two dimensional coordinate data. Referring to FIG. 6A, the processor 24 at step 65 begins by identifying the three dimensional model coordinates corresponding to each of the two dimensional image coordinates for the new image $I_n$ in the initial set by referring to the concordance table 38 of matched image features and model data.

The camera solution for the virtual camera $L_n$ is then calculated at step 66 using the 3-D to 2-D solving process, the result being regarded as a provisional result since it is based on the initial set of data which is limited in size by the number of indicators displayed in the previous image $I_{n-1}$. In order to make full use of all of the existing three dimensional model data, the processor 24 at step 67 maps the three dimensional model points represented by the remainder of the set of model data into the two dimensional virtual image plane of the virtual camera $L_n$, thereby obtaining a set of two dimensional reference points in the image plane 52.

Figure 5:
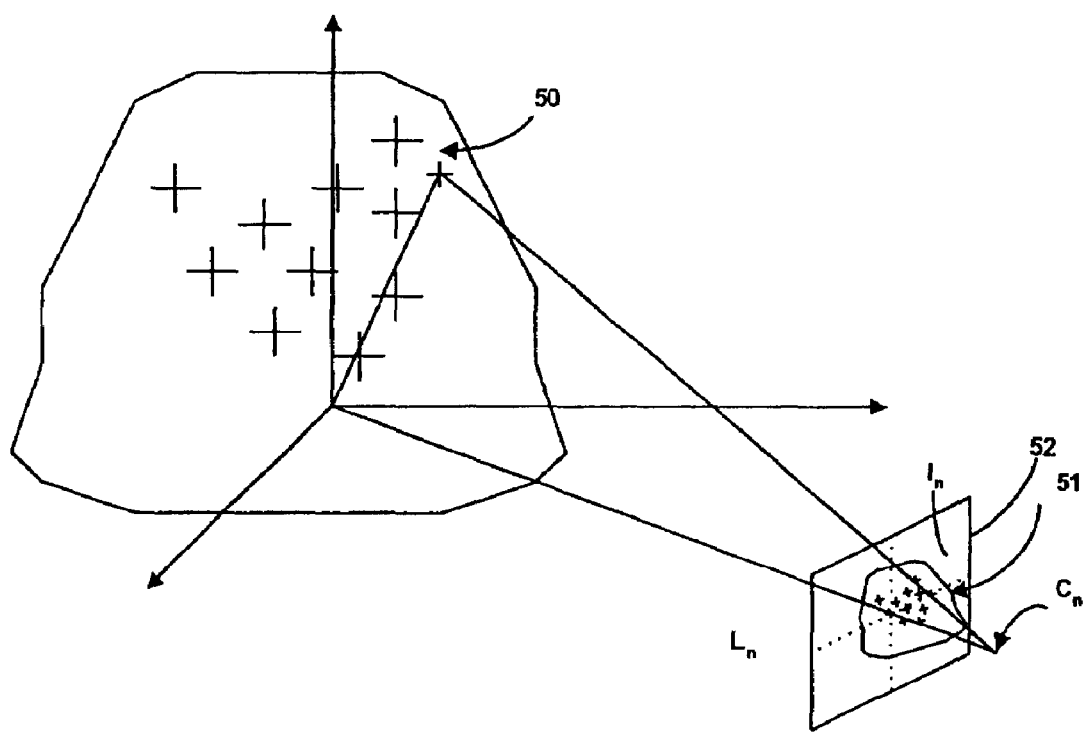
FIG. 5 is a schematic diagram illustrating the mapping of model points into a virtual image plane of a camera.

FIG. 5 illustrates this mapping process schematically where a small set of three dimensional model coordinates 50 are illustrated as being mapped into a corresponding set of two-dimensional reference points 51 in the image plane 52 of camera $L_n$.

At step 68, the processor 24 performs automatic matching of features in the new image $I_n$ with the reference points 51 obtained in step 67 using a constrained matching technique in which the search for a matching feature to each of the reference points is confined to a localised area proximate to the reference point in the new image.

After completing the constrained matching process, the processor 24 at step 69 is then able to identify an enlarged set of two dimensional image coordinates in the new image $I_n$ for which correspondence is matched with three dimensional model coordinates, including the results of both step 68 and step 65.

A revised result for the camera solution for the virtual camera $L_n$ is then calculated by again using the 3-D to 2-D solving process but based on the enlarged set of 2-D matched coordinates and corresponding 3-D model data at step 610.

If at step 611 the processor 24 determines that there are more images to be processed, the process repeats from step 63 for a new image $I_n$ for which the value of n is incremented by 1.

Figure 6B:
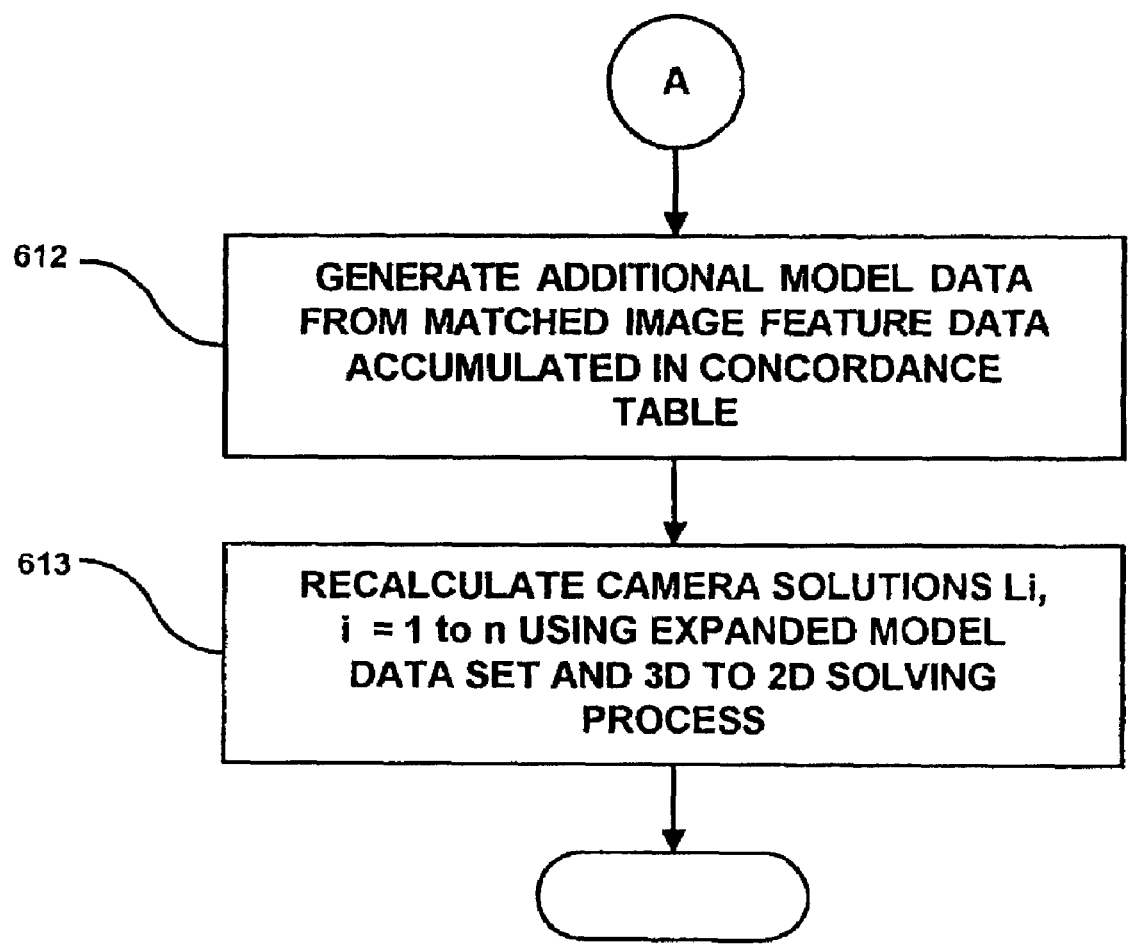

When all of the images have been processed, additional model data is calculated at step 612 of FIG. 6B using all of the matched image feature data accumulated during each performance of the matching process of step 64 and the automatic matching process of step 68 for all of the images, provided that matching of a feature in at least three images is required before a new model data point can be determined.

Using the expanded model data set established in step 612, the processor 24 at step 613 applies the 3-D to 2-D solving process to each of the virtual cameras $L_n$ in order to refine the camera solutions for use in any subsequent processing.

The 3D to 2D solving process used in steps 66 and 610 will now be described with reference to FIG. 8. For this example, the use of the 3D to 2D process of step 66 is described for camera $L_n$ where n is greater than 3. As shown in FIG. 9, the solution for camera $L_n$ requires a set of coordinates for matching points in each of cameras $L_n$, $L_{n-1}$ and $L_{n-2}$ where cameras $L_{n-1}$ and $L_{n-2}$ already have known position and orientation as a result of earlier solving processes.

Each pair of matching points in $L_{n-1}$ and $L_{n-2}$ has a corresponding three-dimensional model point in the existing model data, the association between these sets of data being defined in the concordance table 38.

For each pair of matching image points represented in the image data for $L_{n-1}$ and $L_{n-2}$ there is a matching image point represented in the image data for camera $L_n$ as a result of the matching process performed in step 64 referred to above.

Reference will be made to the method steps of FIG. 8 as well as the diagram of FIG. 9 in the following description. The processor in implementing the steps of FIG. 8 uses a RANSAC (random sampling and consensus) algorithm. At step 80, the processor 24 selects at random three matches between images $I_n$, $I_{n-1}$ and $I_{n-2}$, such that each match comprises sets of two-dimensional image coordinates expressed in pixel numbers. These three matches have coordinates which define the apices of respective imaginary triangles 90, 91 and 92 as shown in FIG. 9. The corresponding three-dimensional co-ordinates in the model data define model points at apices of a further imaginary triangle 93 whose positions are known in "world coordinates" or in other words relative to the frame of reference with which the model data is defined. The triangle 92 of image points in the new image $I_n$ may therefore be regarded as a two-dimensional projection of the triangle 93 of model points onto the virtual image plane 52 of the camera $L_n$ so that the position and orientation of the image plane 52 can be calculated using a standard geometrical transformation represented in FIG. 9 by arrow T.

The result of this calculation will be a set of values defining the position in world coordinates and the orientation relative to the model frame of reference of the image plane 52 and constitutes a first candidate solution for the required camera solution for $L_n$.

Figure 8:
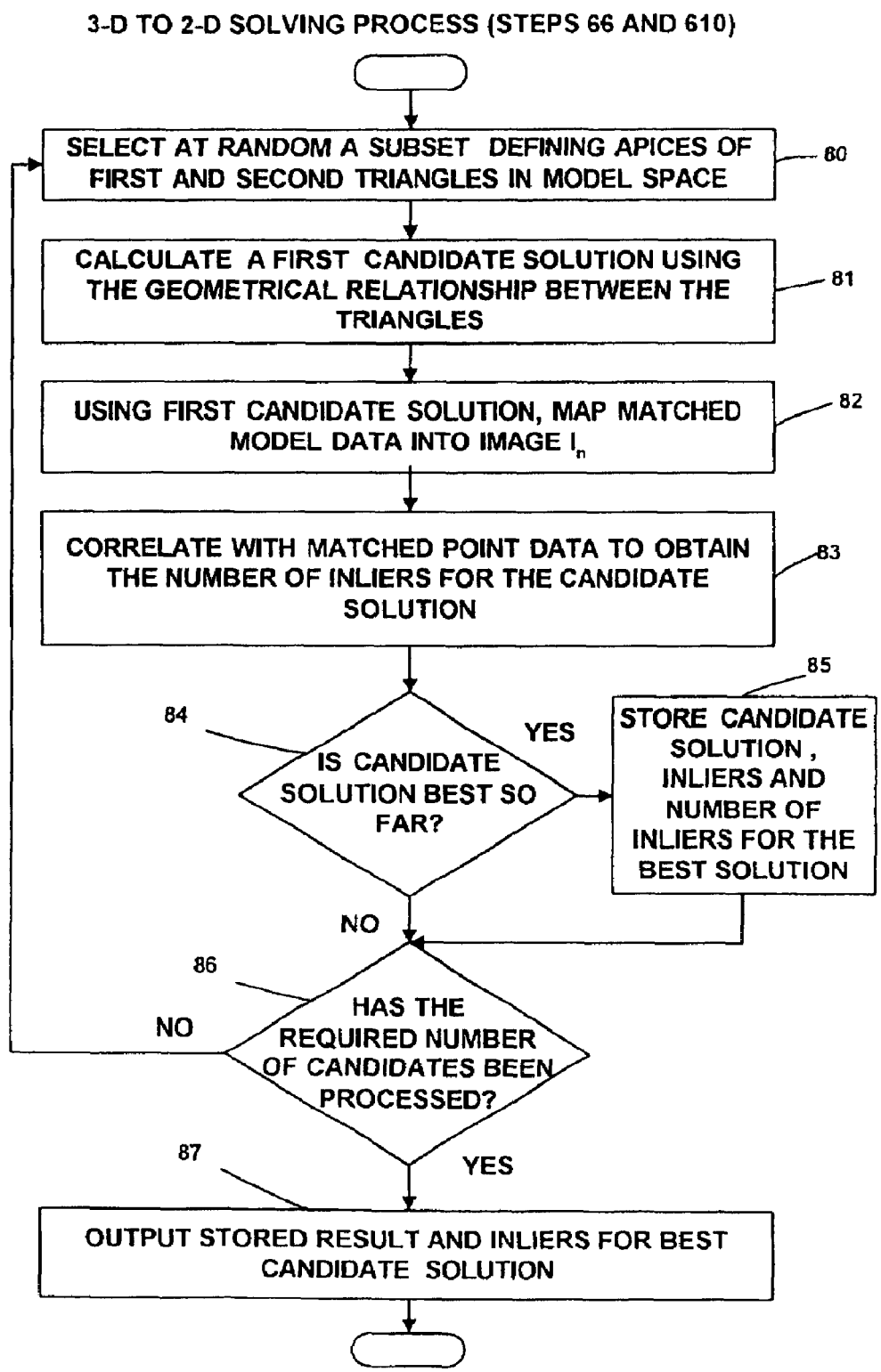
FIG. 8 is a flowchart illustrating operation of a 3D to 2D solving process.
Figure 9:
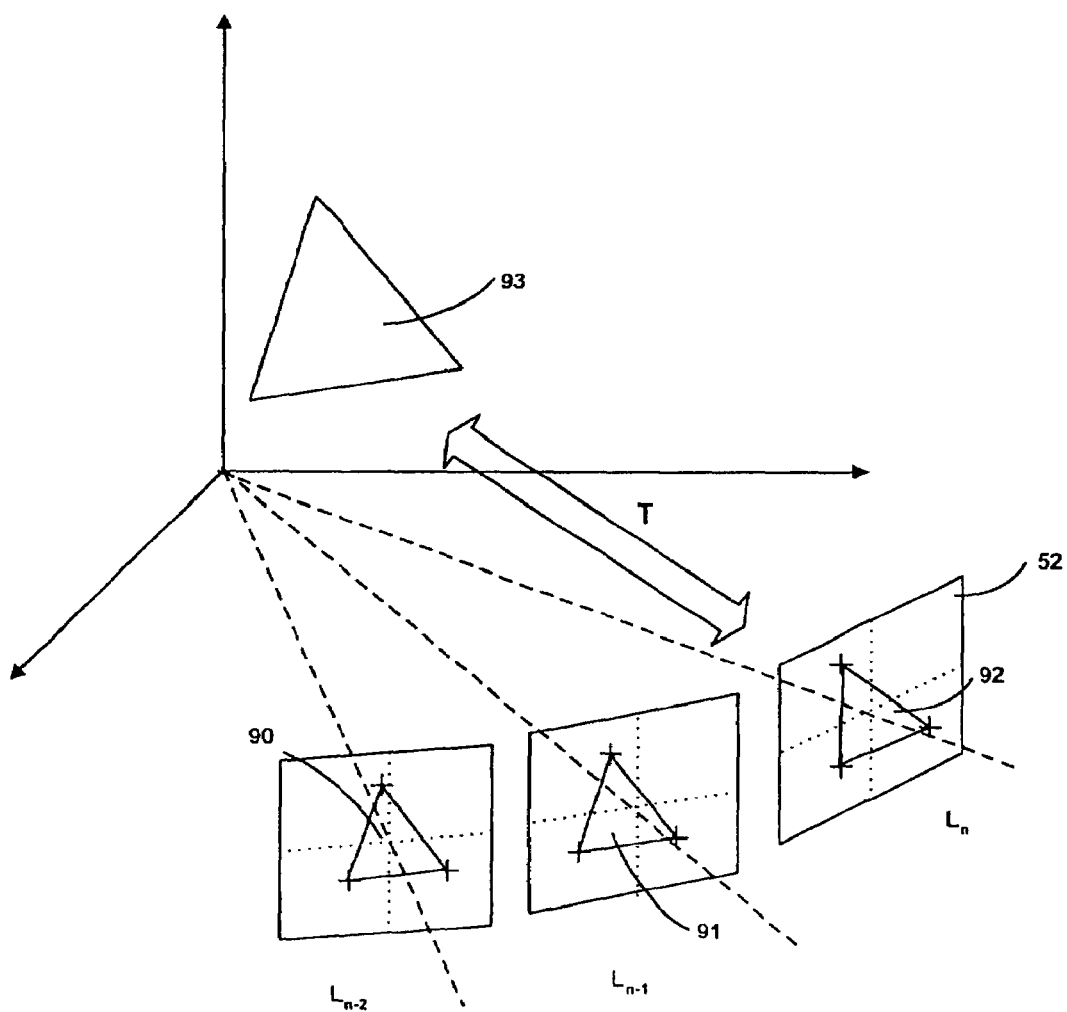
FIG. 9 is a schematic diagram of triangles of selected points used in calculating candidate camera solutions in the process of FIG. 8.

As shown in FIG. 8, step 81 of calculating this first candidate solution is followed by step 82 of using the first candidate solution to map all of the model points corresponding to the initial set of image points into the image plane $I_n$. If the first candidate solution were in fact a perfect solution, the mapped points would be expected to substantially coincide with the user entered matched image points. In practice, however, the mapped points will be displaced relative to the matched image points by a number of pixels which provides a measure of the degree of correlation between the mapped points and matched image points.

At step 83, a correlation calculation is performed between the mapped points and the matched image points by counting the number of mapped points which fall within a predetermined number of pixels radius of the matched image points. In this example, the predetermined number of pixels is three.

The number of matching pairs of mapped points and matched image points in the image is equal to the number of inliers for this candidate solution, each inlier comprising data defining co-ordinates of a model point together with co-ordinates of corresponding image points in each of at least three images.

The above calculation is repeated for a number of further candidate solutions and at step 84 the processor 24 determines whether the current candidate solution produces the best result so far in terms of a number of inliers. If so, the candidate solution and number of inliers is stored in step 85 as the result of the process.

At step 86, it is determined whether the required number of candidate solutions has yet been processed, and if not, the process repeats from step 80 where a new set of three matches are selected at random and the above described steps repeated.

When the required number of candidate solutions has been processed, the processor outputs at step 87 the stored result in terms of the candidate solution and number of inliers stored in step 85 for the optimum candidate solution. Also output are the inliers for the candidate solution in terms of the set of point matches verified by the solving process to represent consistent matched data across the three images $I_n$, $I_{n-1}$ and $I_{n-2}$.

The calculation referred to above at step 81 makes use of the well-known projection geometry described for example in "Computer and Robot Vision, Volume 2" by Robert M Haralick and Linda G Shapiro, 1993, Addison Wesley, pages 85 to 91. This publication describes in this passage a transformation which may readily be inverted to suit the calculation required for the present context and defining thereby the transformation T referred to above.

Figure 10:
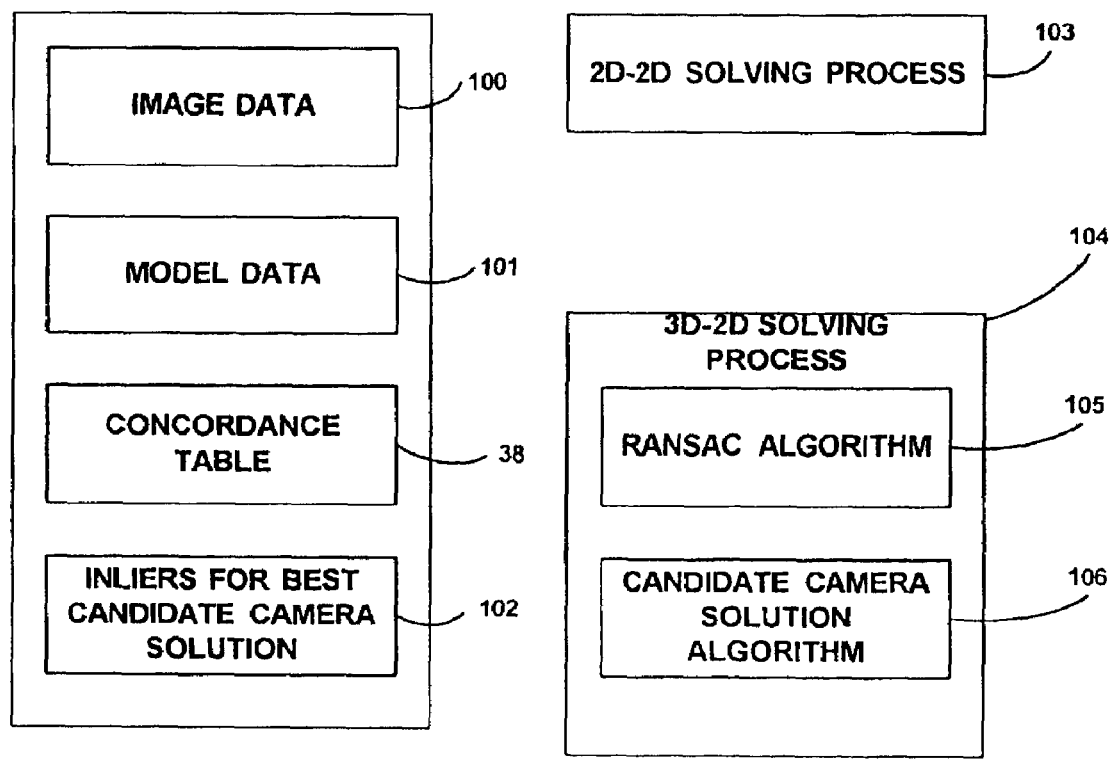
FIG. 10 is a schematic diagram of software modules.

FIG. 10 shows schematically some of the software modules utilised in the above process. An image data file 100 contains image data input from a camera or the like and a model data file 101 contains the model data generated from the image data.

Concordance table 38 referred to above includes related entries identifying the correspondence between matched image data in two or more images and the corresponding model data co-ordinates.

An inliers file 102 contains information defining the inliers found in each of the best candidate camera solutions and represents a set of point matches which are correct and verified to be consistent across three or more images.

The data files 100, 101, 38 and 102 are typically held in random access memory 35 during processing and ultimately stored in mass storage memory 36 of FIG. 2.

Also shown in FIG. 10 are the processing elements including the 2-D to 2-D solving process 103 and the 3-D to 2-D solving process 104 which includes both the RANSAC algorithm 105 and the candidate camera solution 1 algorithm 106.

The RANSAC algorithm 105 and candidate camera solution algorithm 106 constitute computer programs comprising processor implementable instructions which may be stored in a storage medium such as floppy disc 28 or may be downloaded as signals 23 from a network such as the internet. Such signals and storage mediums embodying these instructions therefore constitute aspects of the present invention. Similarly, other programs for carrying out the above described embodiments including control software for controlling operation of the above software modules may be stored in the storage medium or transmitted as a signal, thereby constituting further aspects of the present invention.

The following embodiments of the present invention may be embodied in particular as part of the feature detection and matching module 2 (although it has applicability in other applications, as will be described later).

Figure 19:
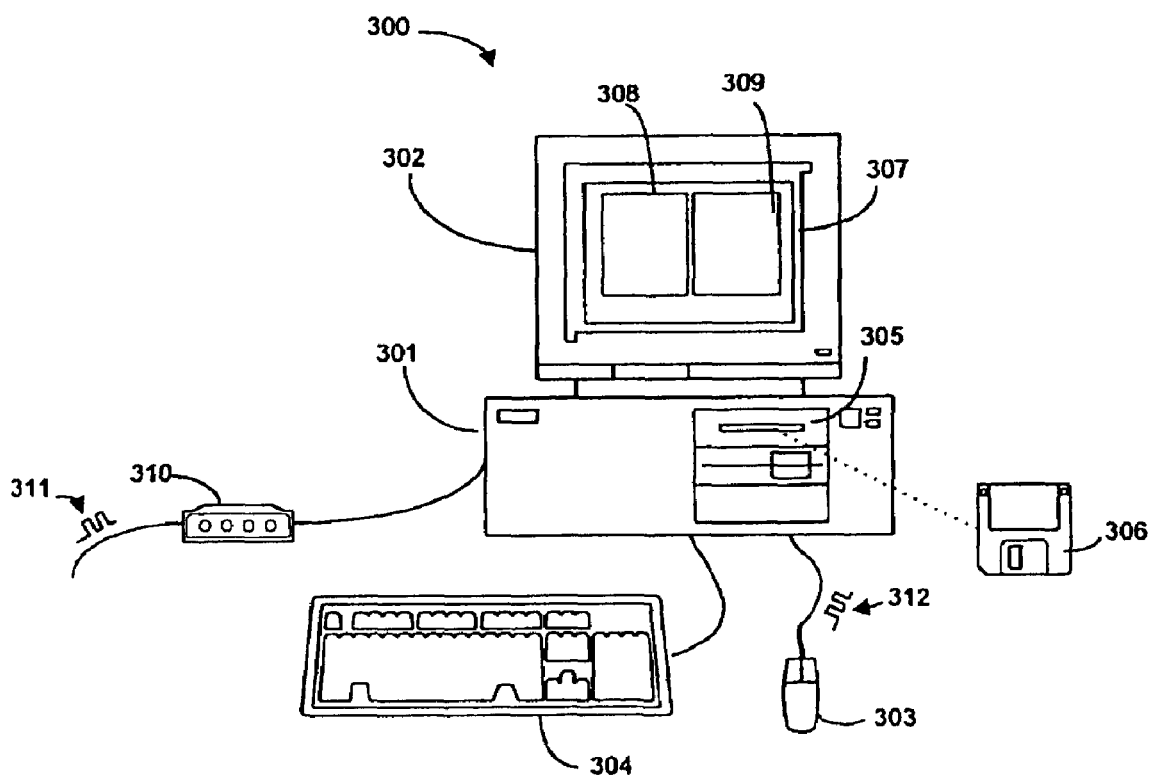
FIG. 19 is a further general illustration of the apparatus including a display screen.

FIG. 19 illustrates generally the apparatus 300 of the present embodiment, comprising a processor 301, display monitor 302, and input devices including a computer mouse 303 and keyboard 304. The mouse 303 enables signals such as an image point selection signal 312 (described below) to be input to the processor.

A disc drive 305 also receives a floppy disc 306 carrying program code and/or image data for use by the processor 301 in implementing the method steps of the present invention.

The display monitor 302 has a display screen 307 which, in the present mode of operation of the program, displays a model window 308 and a camera image window 309.

The processor 301 is connected to a modem 310 enabling program code or image data to be alternatively downloaded via the internet as an electronic signal 311.

Figure 18:
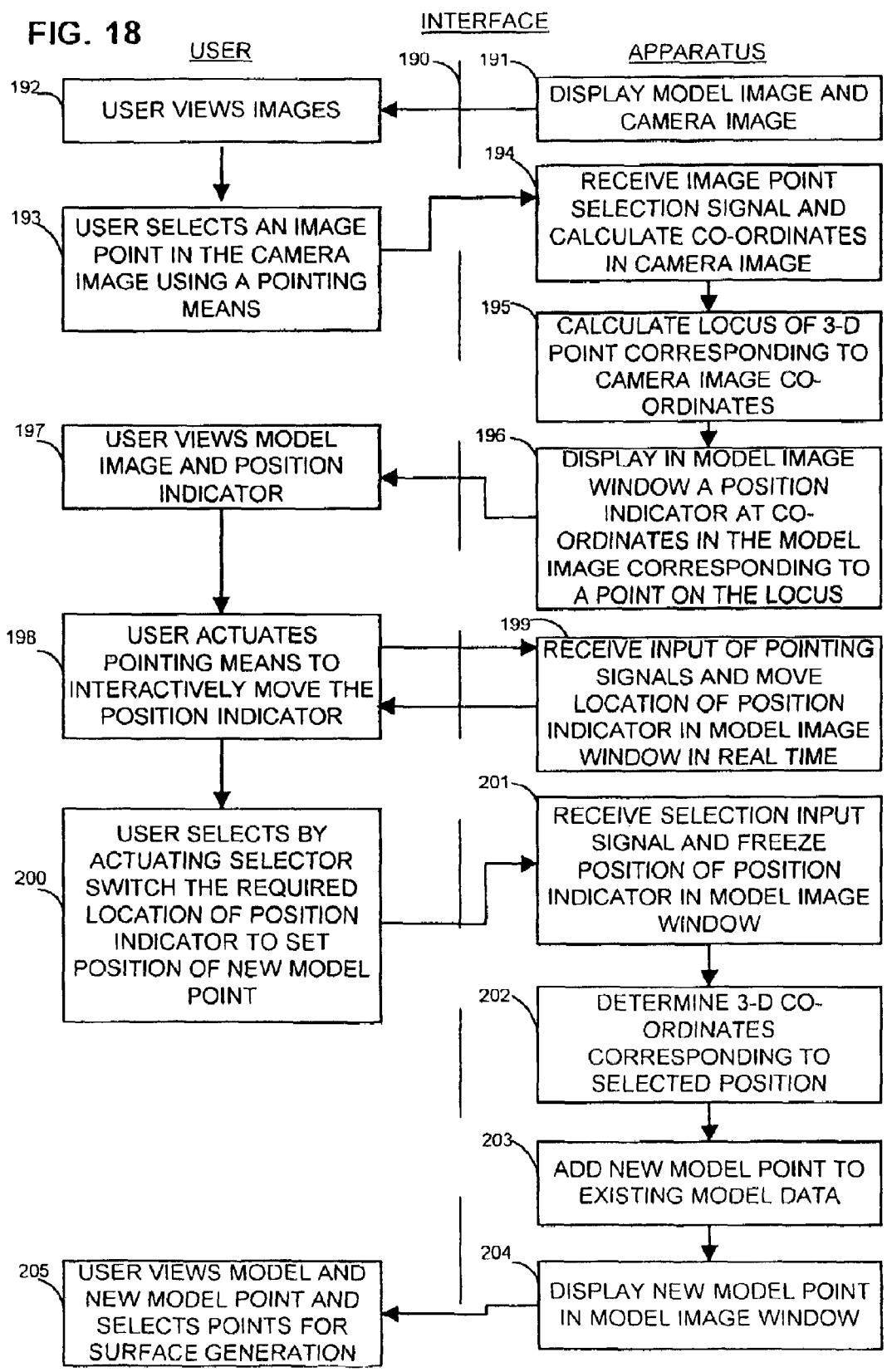
FIG. 18 is a schematic flowchart showing the method steps for adding the new model data.

The method steps according to one embodiment of the present embodiment are illustrated in FIG. 18 in which steps performed by the user and by the apparatus are separated by a broken line 190 representing the interface provided by the display screen 307 and input devices 303,304.

The method begins from a starting point at which the apparatus has already acquired a set of existing model data derived for example using the components in FIG. 1 to process input image data in the form of a series of image frames obtained from a camera at respective different camera positions. The model data includes a set of model points and surface elements and estimates of the camera positions in the form of model co-ordinates for camera centres and look-directions derived for example by operation of camera position calculation module 6 to calculate camera positions based on the image data.

Figure 11:
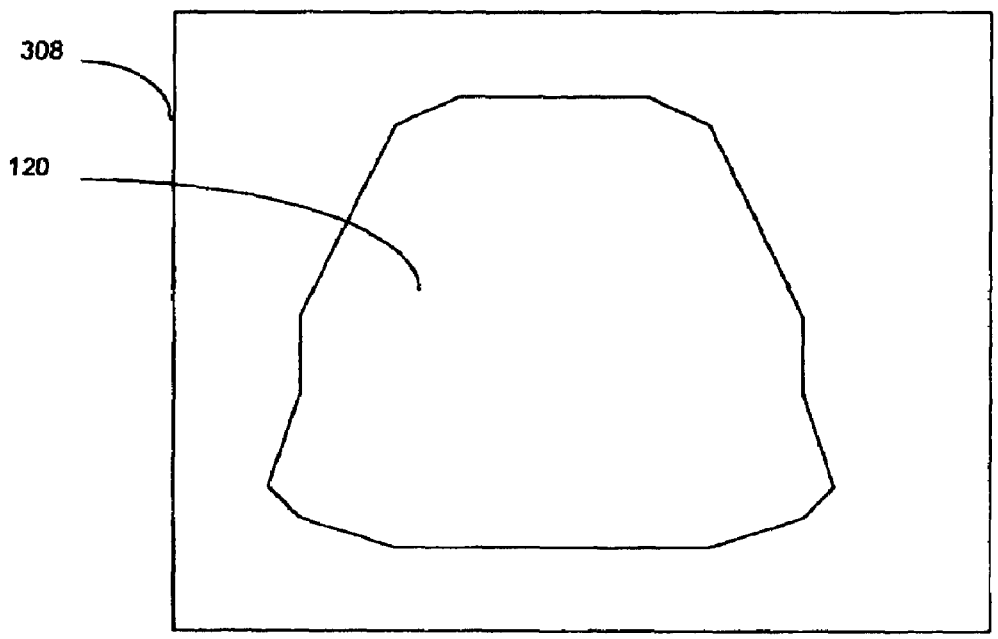
FIG. 11 is a schematic representation of a model window.

At step 191, the apparatus displays in the display screen 307 a model image 120, in the model window 308 as illustrated in FIG. 11. Also displayed for side by side comparison is a camera image 130 in the camera image window 309 as illustrated in FIG. 12.

Figure 12:
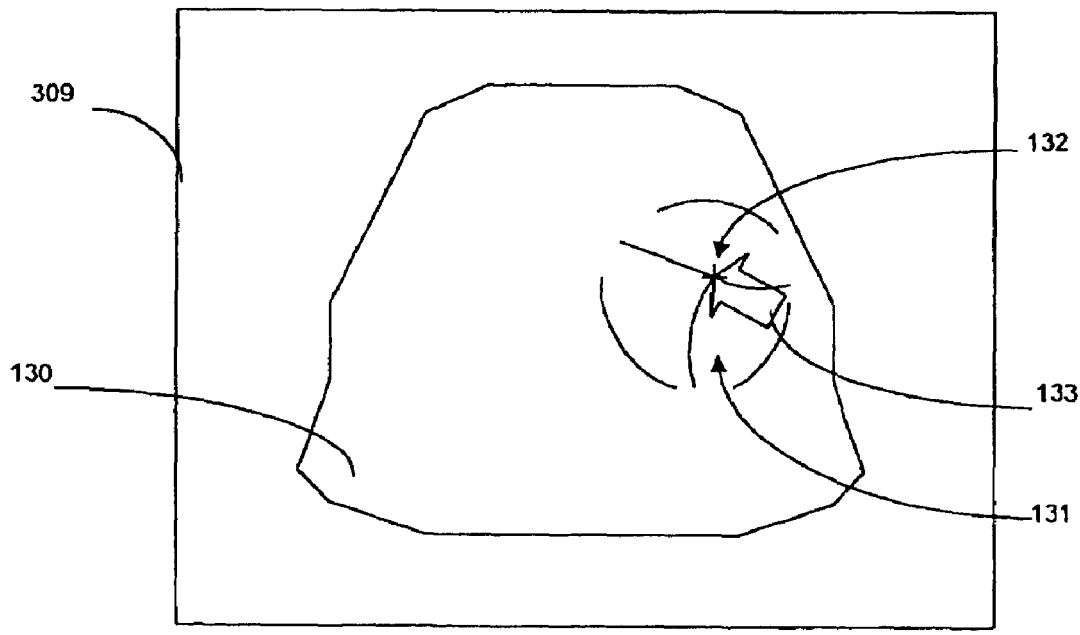
FIG. 12 is a schematic representation of a camera image window in which a displayed camera image includes an additional feature which is not represented in the model image of FIG. 11.

The model image 120 of FIG. 11 is rendered using existing model data which the user wishes to update in order to add additional model data representing an additional feature 131 which is visible in the camera image of FIG. 12 but which has no equivalent in the model image 120 of FIG. 11. The model image 120 and camera image 130 as shown in FIGS. 11 and 12 are generated as views from substantially the same viewing direction.

At step 192, the user views the model image 120 and the camera image 130 and selects an image point 132 in the camera image 130 by using the computer mouse 303 to align a cursor 133 with the selected additional feature 131 and then clicking the mouse to generate an image point selection signal at step 193.

At step 194, the apparatus receives the image point selection signal and processes the signal to identify co-ordinates of the image point in the camera image 130.

Since the camera image 130 is a two-dimensional projection of the object from which the model is derived, the two-dimensional co-ordinates obtained by user selection of the image point 132 do not specify, uniquely a position in three dimensions at which the new model point is to be added. At step 195, the apparatus calculates the locus in three dimensions of the positions of possible model points corresponding to the selected image point 132 which are consistent with the geometric relationship between the object and the camera position from which the displayed camera image 130 was taken. This is illustrated in FIG. 13 in which the model is viewed from a different viewpoint from that of FIG. 11 and in which the locus is a straight line extending in the three dimensional space of the model from the model co-ordinates of the camera centre 140 and through the co-ordinates of the image point 132 in the camera image plane 141.

Figure 13:
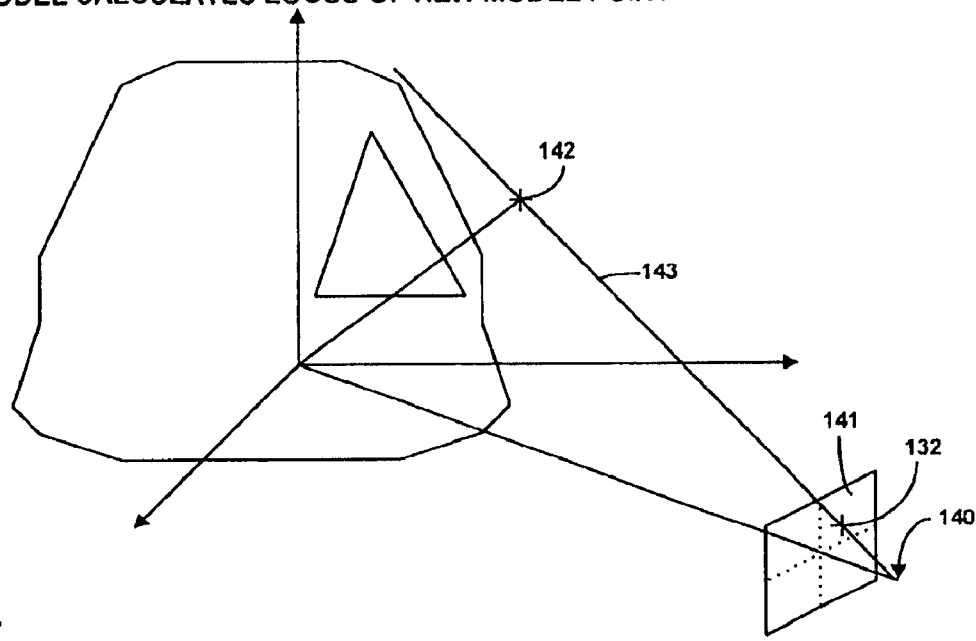
FIG. 13 is a schematic representation of a calculated locus in the 3-D model space for a new model point.

An exemplary model point 142 lying on the locus 143 is illustrated in FIG. 13 at one of the possible positions at which the new model point could be added.

Figure 14:
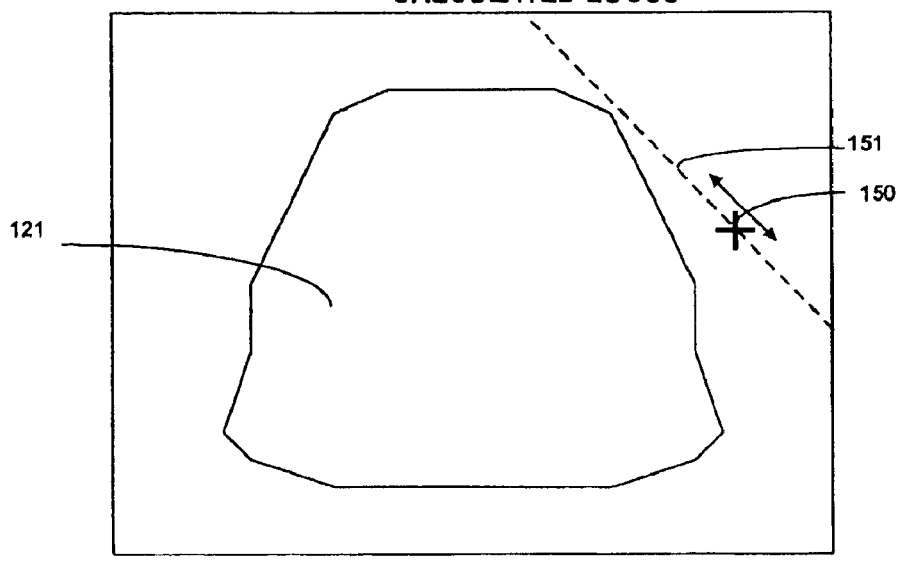
FIG. 14 is a schematic representation of a model window including a new point moved by the user to positions constrained by the calculated locus.

At step 196, the apparatus displays in the model window a new model image 121 as shown in FIG. 14 in which a position indicator 150 lies on the locus 143 and is movable in response to movement of the computer mouse by the user so as to be constrained to follow a trajectory 151 corresponding to the locus when projected into the plane of the model image 121. The new model image 121 of FIG. 14 is generated as a view of the model from a different viewpoint selected to clearly display the locus. Such different viewpoints are selected by the user by temporarily selecting a different mode of operation from a menu of available modes, the viewpoint selecting mode providing rotation of the model image in latitude and longitude in response to sideways and forward/reverse movement of the mouse respectively.

At step 197, the user views the model image 121 and the position indicator 150 and decides upon an appropriate position of the position indicator 150 to represent the additional feature 131. At step 198, the user actuates the mouse to move the position indicator 150 to the selected position, the apparatus updating the position of the position indicator appropriately at step 199, and at step 200 the user clicks the mouse, thereby selecting the desired position to set the position of the new model point. At step 201, the apparatus receives a selection input signal corresponding to the mouse click and freezes the position at which the position indicator 150 is displayed in the model image window. At step 202, the apparatus determines the three-dimensional co-ordinates corresponding to the selected position of the additional model point, the coordinates being uniquely identified in three-dimensions from the known geometry of the locus and the selected position in the two-dimensional projection forming the model image 121 of FIG. 14.

Figure 15:
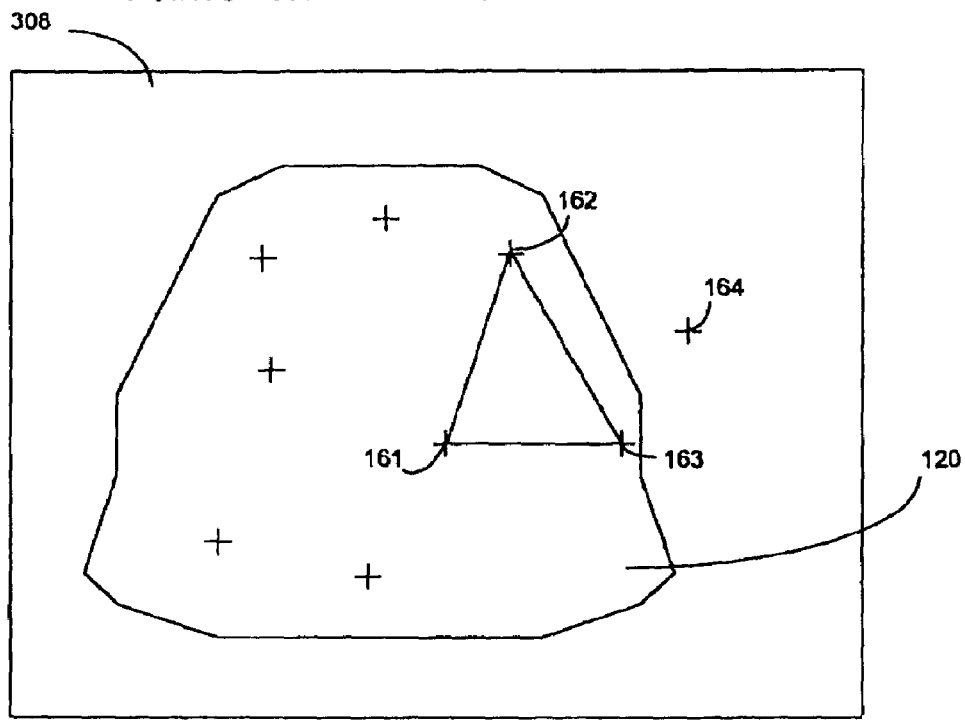
FIG. 15 is a schematic representation of a model window during user selection of points for connection to the new model point.
Figure 16:
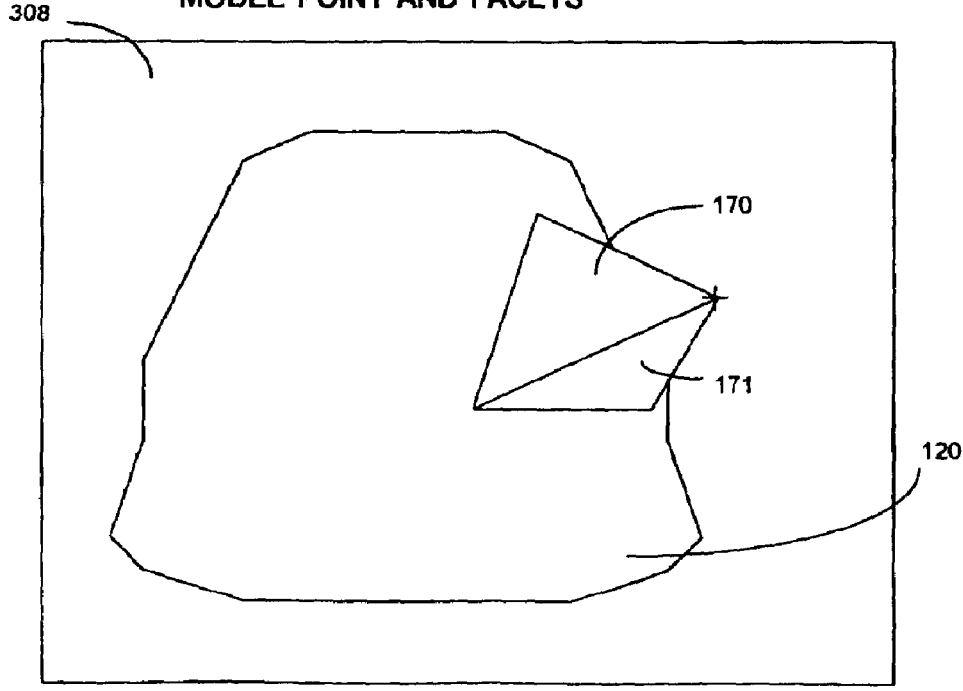
FIG. 16 is a schematic representation of the model window in which the displayed model image shows the new model point and facets.

At step 203, the apparatus adds the new model point to the existing model data and at step 204 displays the new model point 164 in the model window 308 together with existing model points, superimposed on the model image 120 as shown in FIG. 15.

At step 202, the user views the model image and the new model point and selects a set of existing model points, 161, 162 and 163 for combining with the new model point 164 to form a new subset of points to be used in the generation of surface elements of the model. The apparatus then generates the additional surface elements shown as elements 170 and 171 in FIG. 16. Texture data may then be rendered onto the resulting surface model using a texture data generation module 14 as described above with reference to FIG. 1.

Figure 17:
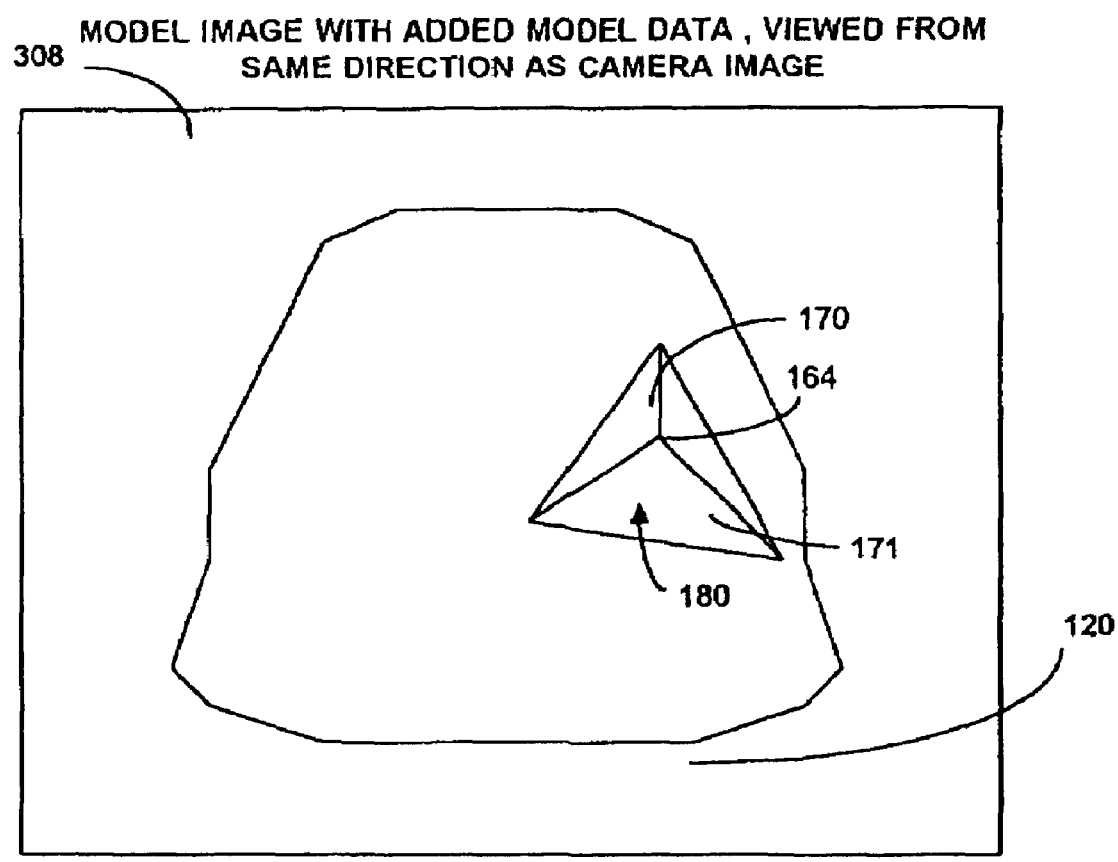
FIG. 17 is a schematic representation of the model window showing the model image including the added model data, viewed from the same direction as the camera image of FIG. 3.

FIG. 17 illustrates the model image incorporating the added model data when viewed from the same direction as the original camera image of FIG. 12. In the model image of FIG. 17, the additional feature 131 of the camera image 130 is represented by added model feature 180.

The user may decide that the added model feature 180 does not adequately represent the additional feature 131 and, if so, may select an editing mode in which the position of the position indicator 150 may be adjusted and the resulting facetted model reviewed until the added model feature is judged to be correct, this further step requiring the input of further positioning signals and model point selecting signals responsive to user actuation of the mouse.

Figure 20:
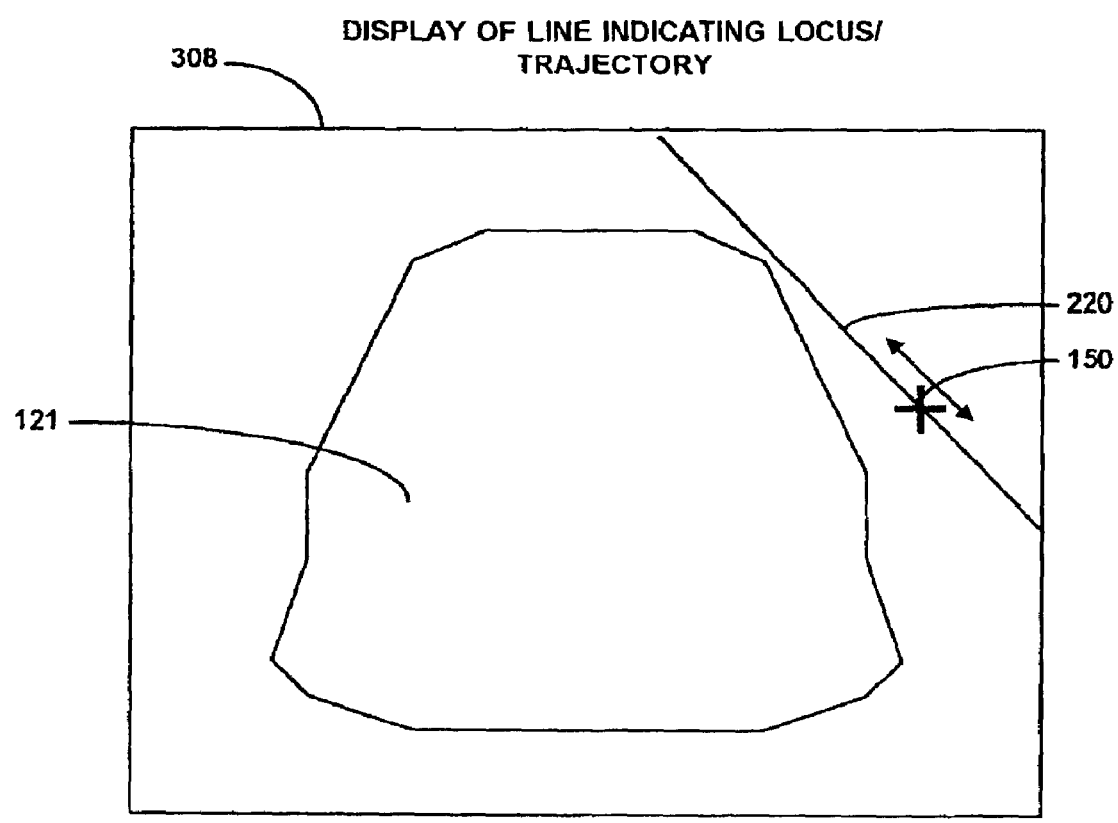
FIG. 20 is a representation of a model window including a display of a line representing the calculated trajectory.

In an alternative embodiment illustrated in FIG. 20, the step 196 of displaying in the model window 308 the new model image 121 together with the indicator 150 may also include displaying a line 220 indicating the path of the trajectory 150.

Alternative embodiments are envisaged in which for example non-linear locus calculation is effected, for example to take account of image distortion known to be present in the camera optics. Alternative means may be utilised for the input of data in place of a computer mouse, alternative forms of pointing device such as touch screen and touch pad devices being usable, or alternatively conventional keyboard devices may be used to input co-ordinates.

In a further alternative embodiment, the step 205 in which the user selects existing model points for surface generation may be replaced by a step carried out by the apparatus to automatically select existing model points to be used in combination with the new model point as a basis for re-facetting the model.

A preferred method of performing such automatic facetting will be described below.

The method of the present invention can be implemented by a computer program operating on the computer apparatus 300, the program comprising processor implementable instructions for controlling the processor 301. The program may be stored in a storage medium such as floppy disk 306. An aspect of the present invention thus provides a storage medium storing processor implementable instructions for carrying out the above described method.

Further, the computer program may be obtained in electronic form for example by downloading the program code in the form of a signal 311 over a network such as the internet via the modem 310.

Alternative embodiments of the present invention are envisaged in which for example the above described method and apparatus are used to process camera images obtained by selecting frames from a video camera recording, the frames representing different views of the object. The displayed images may additionally be modified to include dimensional information as a guide to the user in determining the optimum position of the new model point.

A further aspect of the present embodiment will now be described, relating to the automatic re-facetting of the model when a new model point is added to a set of existing model points. Corresponding reference numerals to those of preceding figures will be used where appropriate for corresponding elements.

Figure 21:
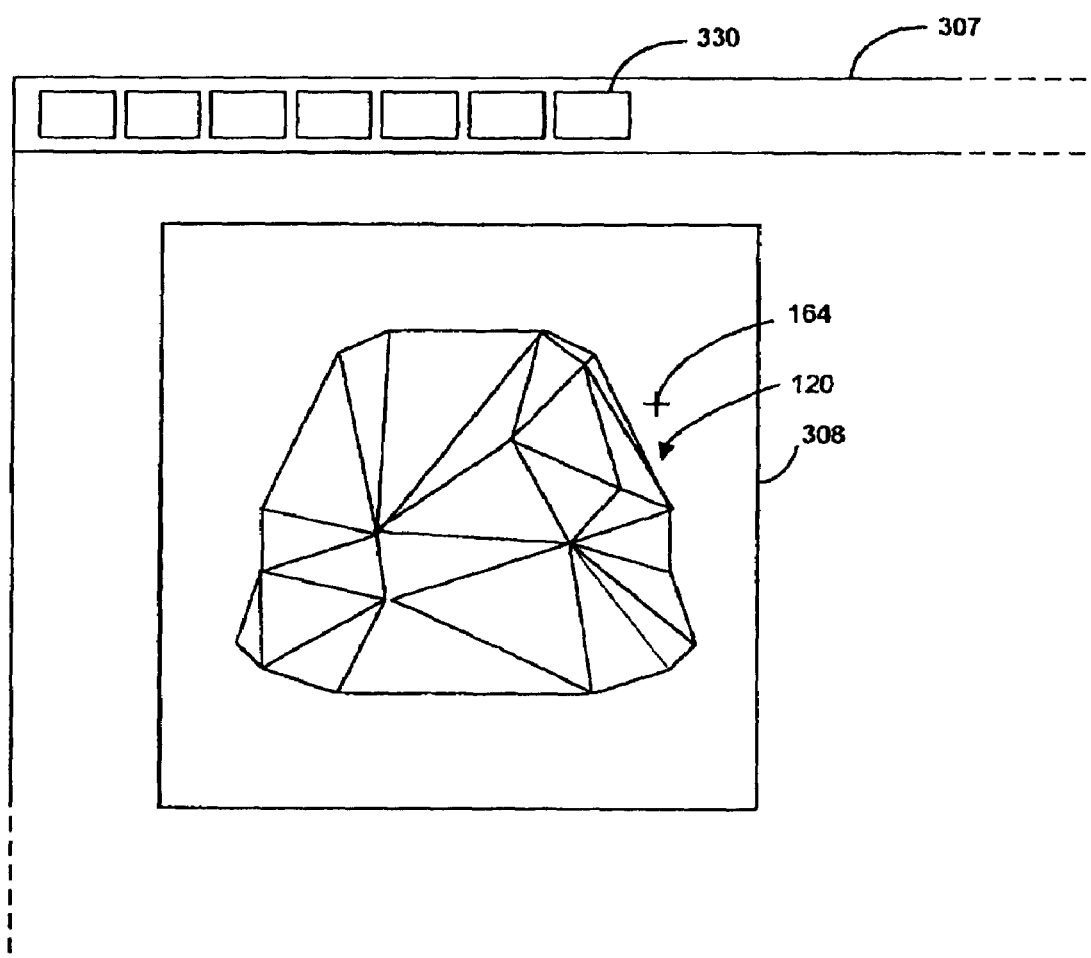
FIG. 21 is a schematic representation of the addition of a new model point to an existing model according to a second aspect of the present invention.

FIG. 21 illustrates a new model point 164 which has been added to the data used to derive a model image 120 displayed in a model window 308 in a display screen 307 of a processor controlled apparatus 300 of the type illustrated in FIG. 19 and functioning as a system in the manner described above with reference to FIG. 1.

The addition of the new model point 164 may be the result of a process using selection of a camera image point and generating a locus in the model space as described above with reference to FIGS. 11 to 20 or may be the result of a different process, such as for example the input via a keyboard of numerals representing co-ordinates in the three-dimensional model space.

In FIG. 21, the model image 120 is representative of an irregularly shaped object represented schematically by a multi-facetted image in which the surface is comprised of a large number of triangular facets. In practice, the number of facets is likely to be greatly increased beyond the relatively small number illustrated in FIG. 21 so that FIG. 21 should therefore be regarded as schematic for the purpose of simplicity of representation in this respect.

Figure 26:
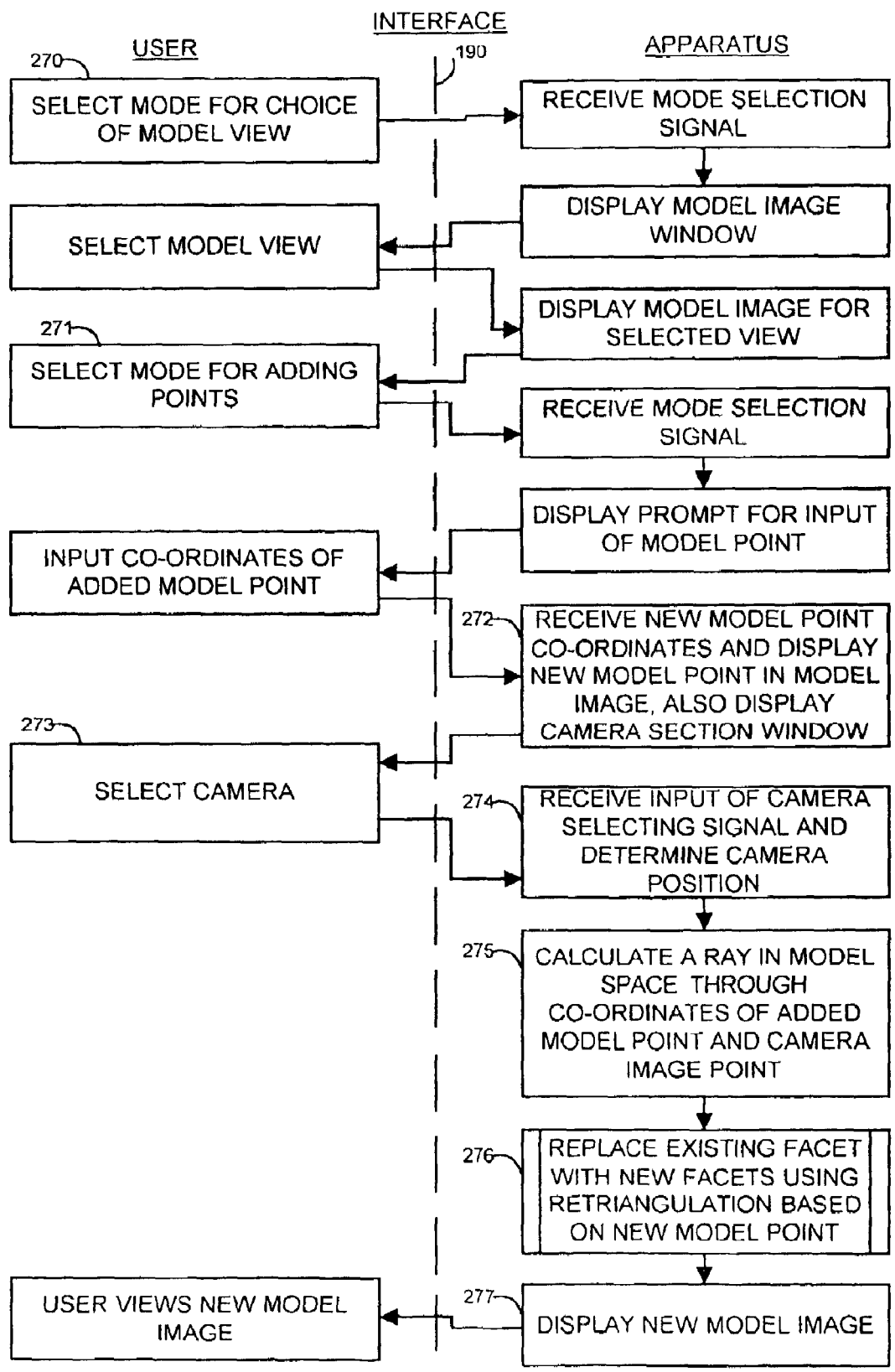
FIG. 26 is a flowchart illustrating the method described with reference to FIGS. 21 to 25.

The method steps required to implement the method are illustrated in the flowchart of FIG. 26 in which steps performed by the user are illustrated in the left-hand portion of the flowchart, steps implemented by the apparatus are shown in the right-hand portion of the flowchart and an interface between the user and the apparatus is represented as a broken line 190. In practice, the interface is comprised of the display screen 307 and the computer mouse 306 allowing the input of pointing signals in conjunction with the display of a cursor 133 on the display screen 307.

The following method steps illustrated in FIG. 26 will be described with reference to FIGS. 21 to 25. At step 270, the user selects via mode icons 330 a mode of operation of the apparatus for choosing a view of the model and the apparatus responds by displaying the model image 120 in the model image window 308. The user actuates the mouse 303 to orient the model view to a position which is judged to be appropriate.

Figure 22A:
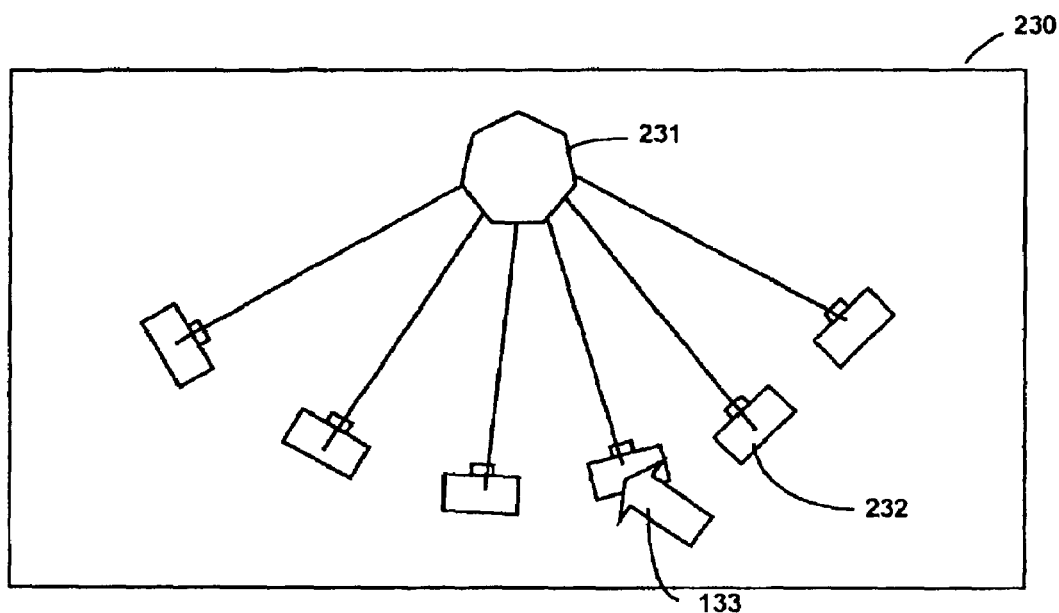
FIG. 22A is a schematic representation of a camera selection window using camera icons.

At step 271, the user selects a mode of operation for the addition of model points and the apparatus responds by displaying a prompt for the input of the model point information. The user inputs co-ordinates of the added model point and, at step 272, the apparatus displays the new model point in the model image window 308 as illustrated in FIG. 21. The apparatus also displays on the display screen 307 a camera selection window 230 as illustrated in FIG. 22A in which the camera positions relative to the object represented by the model image are graphically represented in a manner which enables the user to choose one of the cameras as being appropriately located for the purpose of defining a centre of projection to allow the new model point 164 to be projected onto the existing model. The user may for example already have knowledge of the object being modelled and a general indication of the required camera view.

In the camera selection window 230, the cameras are represented at their positions relative to a representation of the object 231 by respective camera icons 232 such that the user is able to select one of the cameras by use of the mouse, the user aligning the cursor 133 onto a selected one of the camera icons and clicking the mouse 303 to effect selection.

At step 274, the apparatus receives the camera selecting signal and determines the position of the camera centre 247 in the three-dimensional co-ordinate system of the model.

Figure 23:
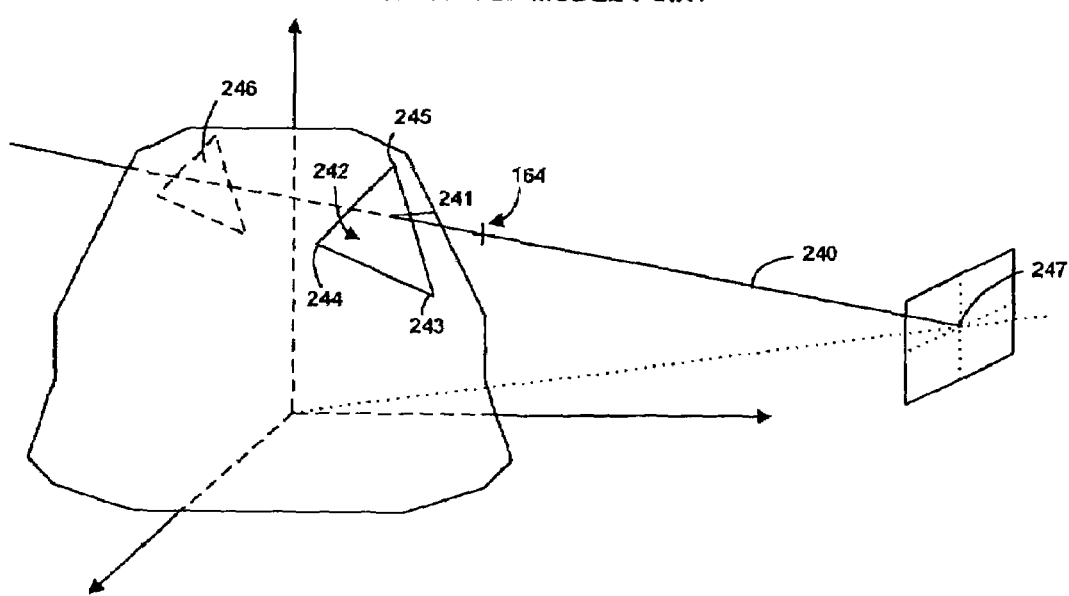
FIG. 23 is a diagram illustrating the calculation of a ray intersecting a facet of the model.

At step 275, the apparatus calculates the manner in which the new model point 164 is projected onto the surface of the model by calculating a ray in the model space through the position of the camera centre and the co-ordinates of the new model point. As shown in FIG. 23, a ray 240 defined in the above manner intersects the surface of the model at a point of intersection 241 which lies within a facet 242 defined by apices 243, 244 and 245 and also intersects a second facet 246 on exiting the model surface.

Figure 24:
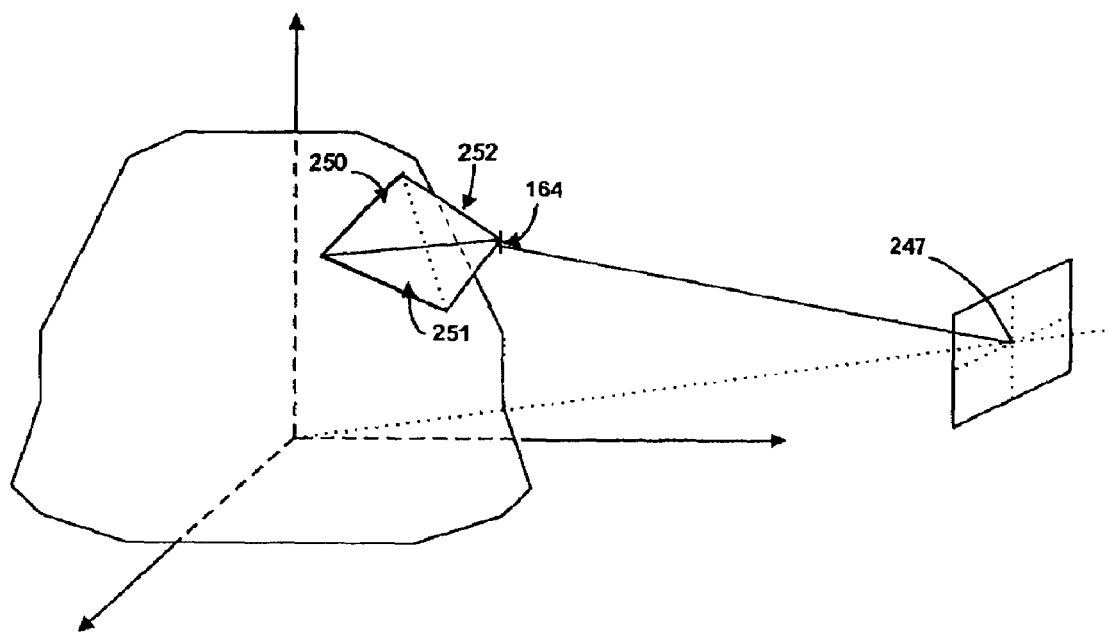
FIG. 24 is a diagram illustrating the subdivision of a facet to include the added model point.
Figure 25:
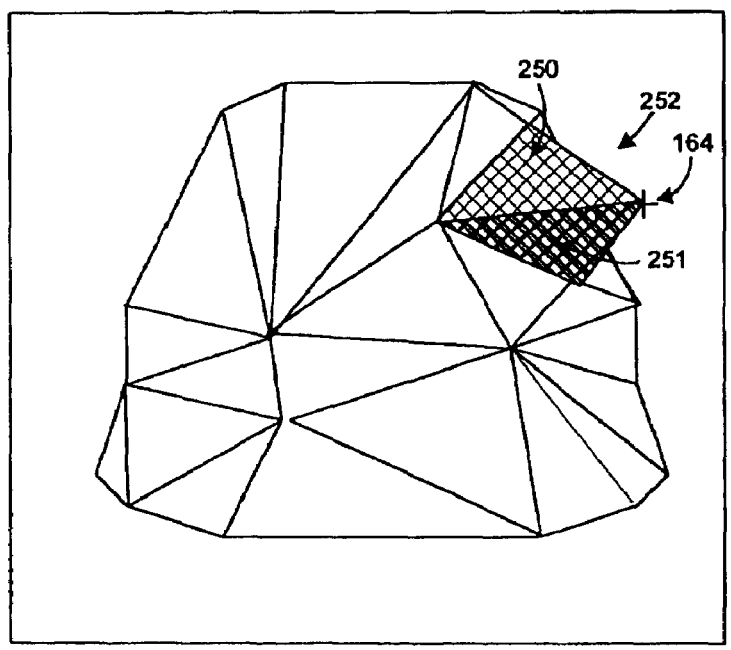
FIG. 25 is a diagram illustrating the display of a new model including the added point and new facets.

At step 276, the apparatus replaces the existing facet 242 with new facets 250, 251 and 252 as illustrated in FIG. 24, each of which includes the new model point 164 as a respective apex. At step 277, the apparatus displays the new model image including the added point 164 and the new facets 250, 251 and 252 as illustrated in FIG. 25 in which the new facets are highlighted by being cross-hatched (facet 252 is hidden from view).

Figure 27:
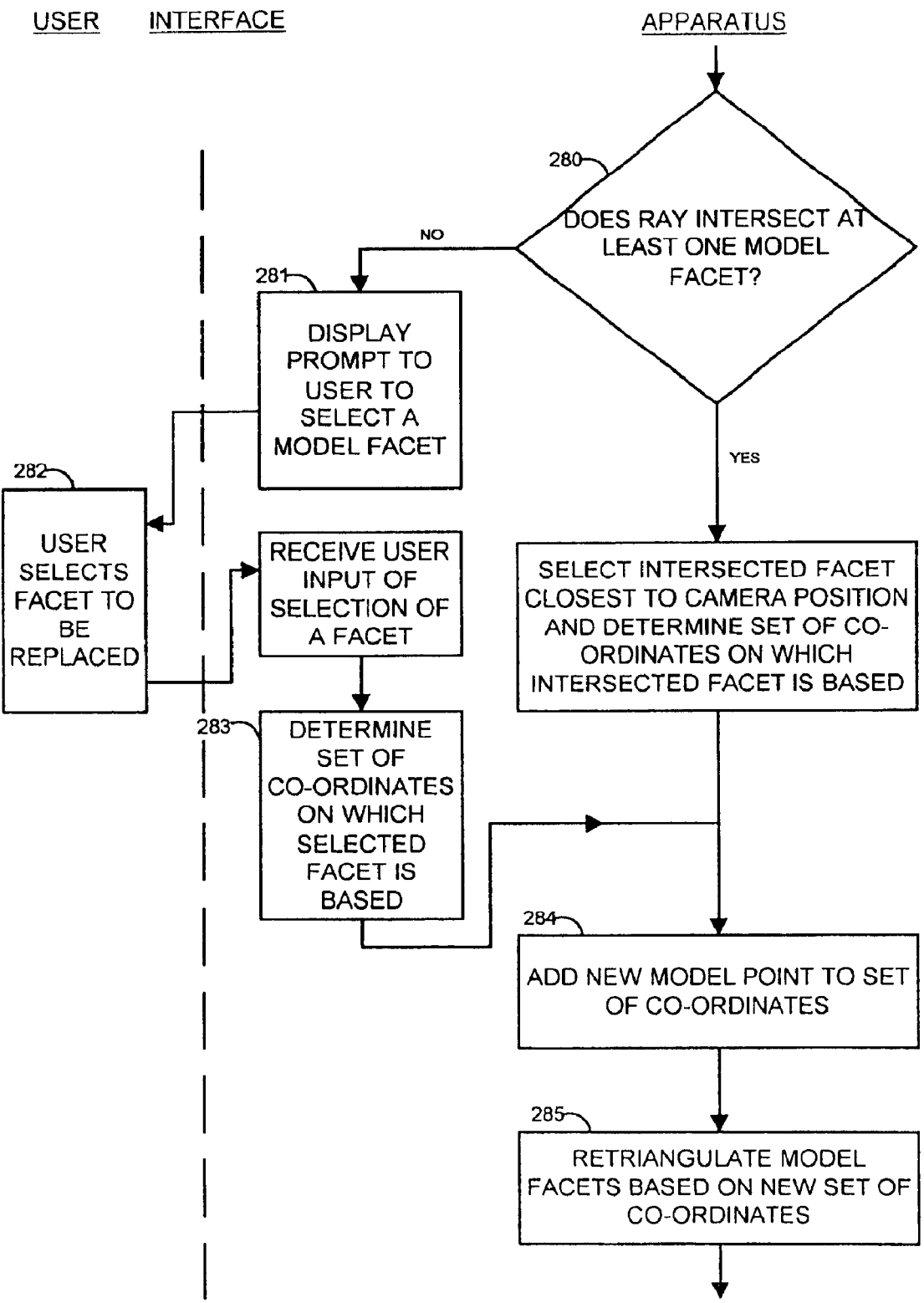
FIG. 27 is a flowchart illustrating the step of replacing the existing facets with new facets using re-triangulation.
Figure 28:
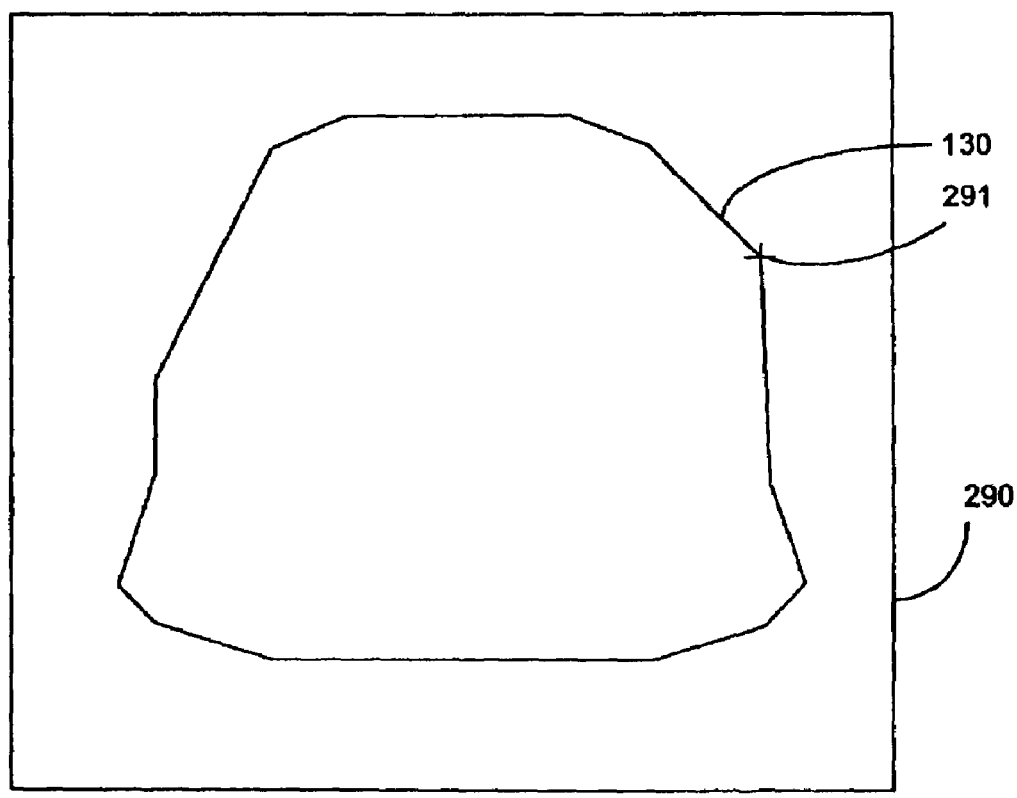
FIG. 28 is a diagram illustrating the identification of co-ordinates in a camera image of a feature corresponding to the added model point.

Step 276 of replacing the existing facet with new facets is illustrated in greater detail in the flowchart of FIG. 27. At step 280, the apparatus determines whether the ray 240 intersect one of the model facets. If no intersection occurs, the apparatus displays a prompt to the user to select a model facet at step 281 and at step 282 the user responds by selecting a facet to be replaced, selection being carried out using the mouse and cursor. At step 283, the apparatus determines the set of co-ordinates upon which the selected facet is based and, at step 284, adds the new model point to this set of co-ordinates. In this example, since the facet being replaced is triangular, the set of co-ordinates on which the facet is based consists of three model points. When the new model point is added, there are four model points as a basis for re-triangulation. At step 285, the apparatus performs re-triangulation to define three triangular facets which connect the set of four points to form part of the surface of the model as illustrated in FIG. 24.

If at step 280, the apparatus determines that the ray does in fact intersect a model facet 242 as shown in FIG. 23, the point of intersection 241 is determined, thereby defining the facet 242 which is intersected by the ray, and the set of co-ordinates of the intersected facet are then used in combination with the new model point at step 284 to define the set of new co-ordinates. If, as in the case of FIG. 23, more than one facet is intersected by the ray 240, the apparatus determines at step 285 which of the facets is closest to the new model point 164 as a subject for re-triangulation. In the example of FIG. 23, the facet 242 is therefore selected in preference to facet 246 since it is closer to the new model point 164.

Figure 22B:
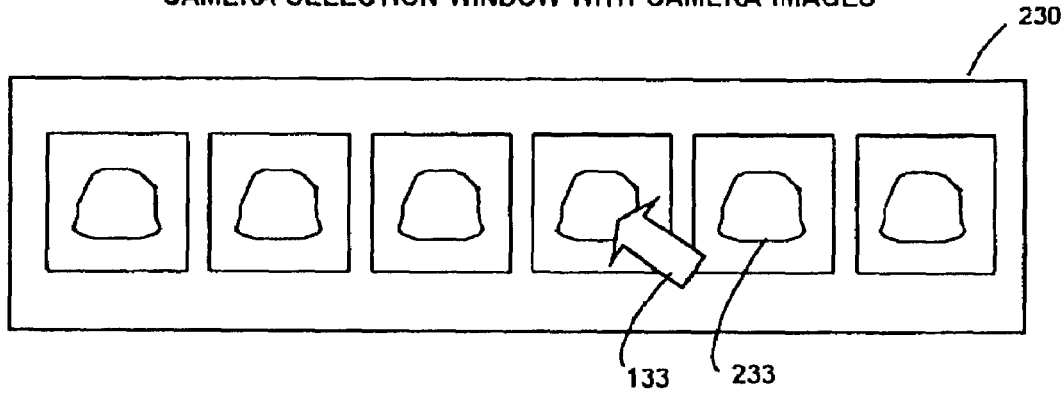
FIG. 22B illustrates an alternative camera selection window using thumbnail icons.

FIG. 22B illustrates an alternative method of selecting the camera position by using a camera selection window 230 which includes a series of thumbnail icons 233, each thumbnail icon comprising a thumbnail image derived from the image data obtained from a respective camera position. The user may thereby select from the displayed thumbnail images the appropriate camera position for viewing the required aspect of the object represented by the model image and by clicking the mouse 303 when cursor 133 is on the thumbnail icon 233, generates a pointing signal 312 received at step 274 of FIG. 26 by the apparatus, thereby enabling the required camera position to be determined as a centre of projection.

Figure 29:
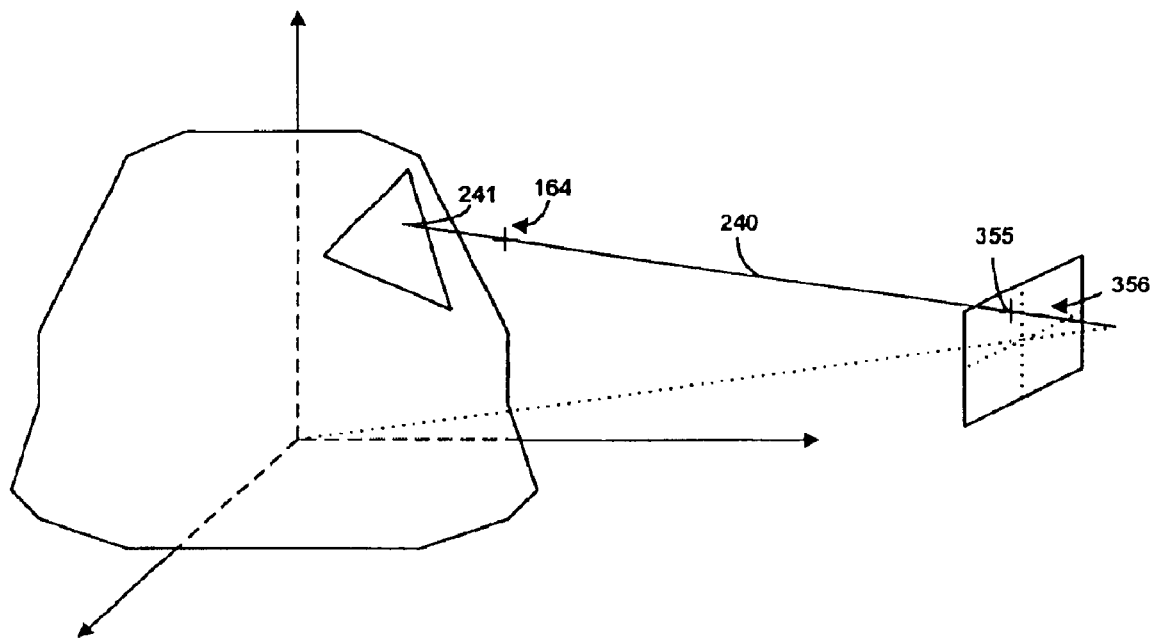
FIG. 29 is a diagram illustrating the calculation of the intersection with the facet of a ray through the camera image point and the added model point.
Figure 30:
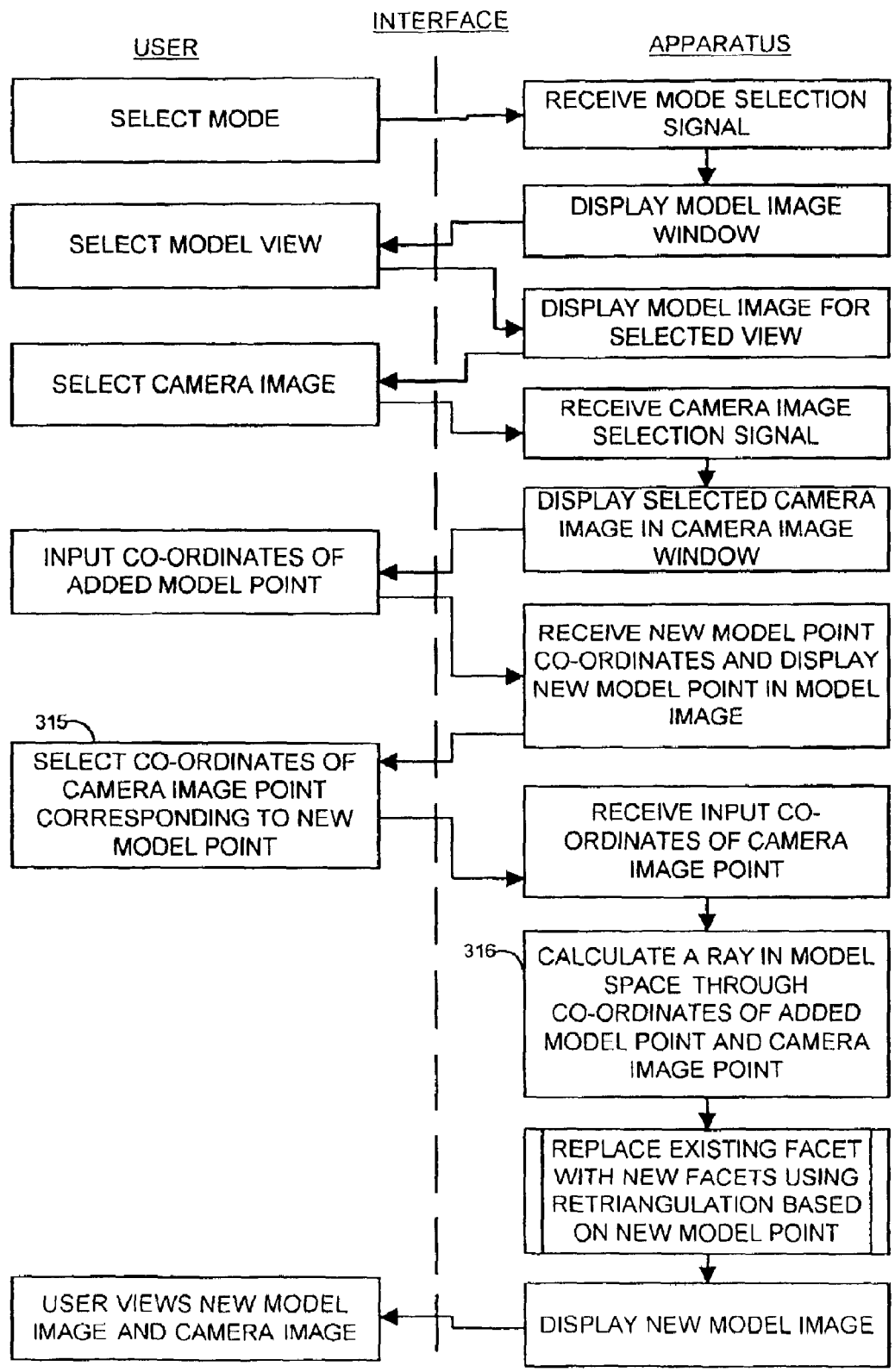
FIG. 30 is a flowchart illustrating the method described with reference to FIGS. 18 to 20.

In the above described example, the centre of projection for projecting the new model point onto the surface of the model is defined as being the centre of the camera. The centre of projection may alternatively be defined in terms of the point in the image plane of the camera corresponding to the location of the image point corresponding to the new model point. For example, in FIG. 28, a camera image 130 is displayed in a camera image window 290 to allow the user to select a camera image point 291 determined by the user to correspond to the new model point 164. As illustrated in the flowchart of FIG. 30, the co-ordinates of the camera image point are input at step 315 to enable the apparatus to calculate at step 316 the ray in the model space through the co-ordinates of the added model point and camera image point as illustrated in FIG. 29 where the position 355 of the camera image point in the camera plane 356 is used to determine the trajectory of the ray 240.

Alternative devices may be used in place of the computer mouse 303 for the input of selection signals, including for example any conventional pointing device such as a touch screen or touch pad device. Alternatively, a keyboard 304 may be used for the input of commands or co-ordinates.

In the method of FIG. 26, the user may choose to change from one mode to another at any time by selecting one of the mode icons 330.

The method of the above aspect of the present invention described with reference to FIGS. 1, 19, and 21 to 29 can be implemented by a computer program operating on the computer apparatus 300, the program comprising processor implementable instructions for controlling the processor 301. The program may be stored in a storage medium such as floppy disk 306. An aspect of the present invention thus provides a storage medium storing processor implementable instructions for carrying out the above described method.

Further, the computer program may be obtained in electronic form for example by downloading the program code as a signal 311 over a network such as the internet via the modem 310.

A further aspect of the present embodiment will now be described using corresponding reference numerals to those of preceding figures where appropriate for corresponding elements. This aspect of the embodiment relates to the provision of a method and apparatus enabling an interface to allow a user to evaluate the quality of a model of the type discussed above, and in particular of the type discussed with reference to FIG. 1 using the apparatus described above with reference to FIG. 19.

As previously discussed, a user may adopt one of a number of techniques for refining and editing model data in order to achieve an improved model image. In order to evaluate the quality of the model image, this aspect of the embodiment allows views of the model image and camera image to be presented in respective model image windows and camera image windows on the display screen and for the respective images to be presented such that both the camera image and model image represent views of the object from substantially the same viewpoint and in respect of which substantially the same image settings such as magnification, field of view, etc, are provided (these latter parameters are referred to below as "camera intrinsics").

Figure 31:
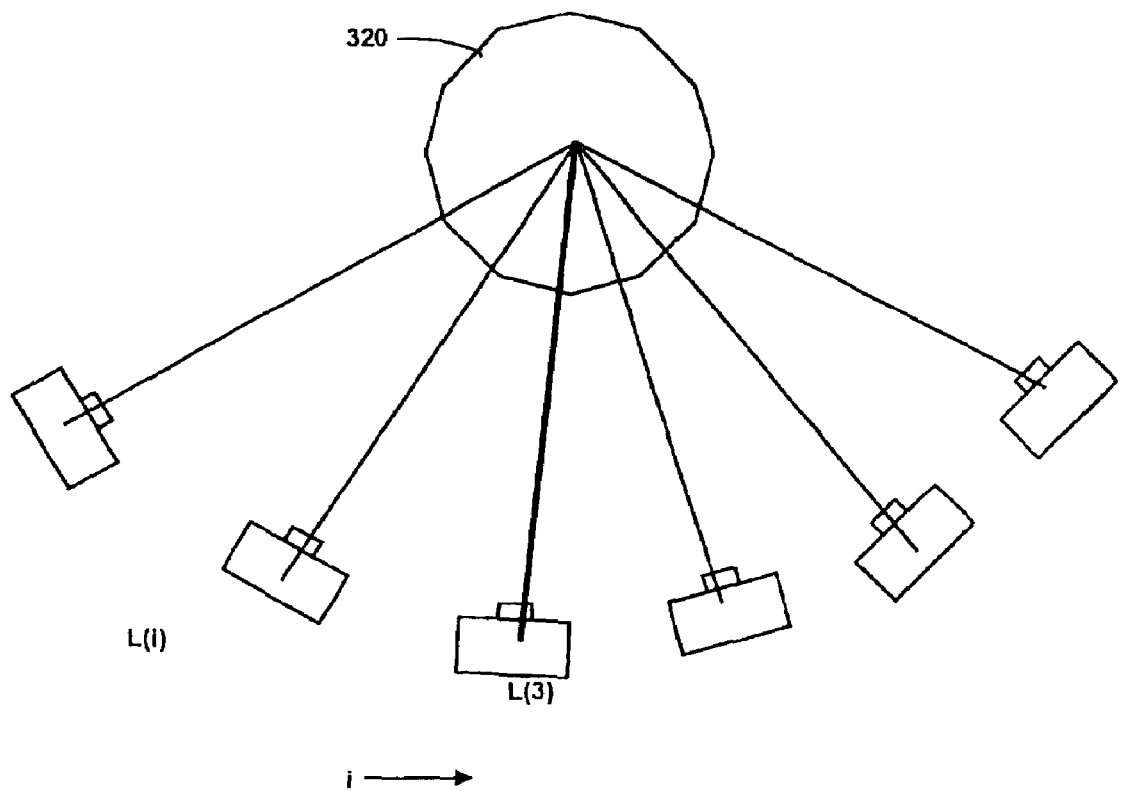
FIGS. 31 to 35 illustrate a further aspect of the present invention, FIG. 22 illustrating schematically camera positions in relation to an object to be modelled.

FIG. 31 illustrates the relationship between a physical object 320 which is the subject of the modelling exercise and a set of camera positions L(i), relative to the object 320, from which a set of frames of image data are obtained, a corresponding camera image I(i) being obtained. The camera images may be obtained by moving a single camera successively into the camera positions L(i), by having a set of different cameras or by moving the object relative to a stationary camera, for example.

Having obtained model data allowing model images to be displayed, the user wishes to evaluate the model by displaying side by side a camera image and a model image. In FIG. 31, camera position L(3) is of particular interest to the user.

Using the apparatus of FIG. 19, the user operates the apparatus to achieve this result using the method steps illustrated in the flowchart of FIG. 33 which will be illustrated below with reference to FIG. 32.

Figure 32:
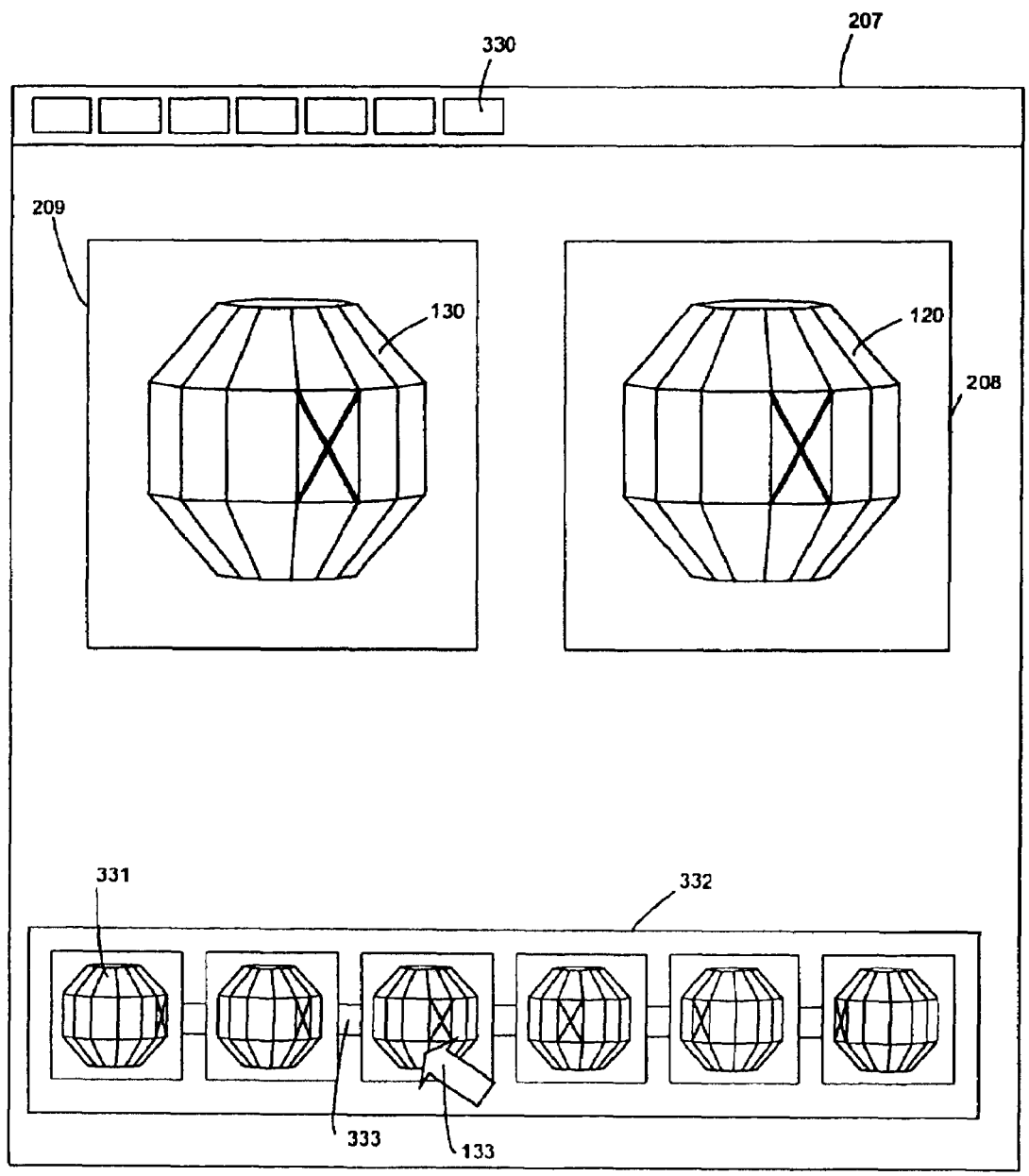

At step 340, the user selects the required mode of operation for displaying camera and model images for the purpose of evaluation, mode selection being achieved using the interface provided by the display screen 307, the cursor 133 and the mouse 303 to select one of the mode icons 330 located in a peripheral region of the display screen as shown in FIG. 32.

At step 341, the apparatus generates camera image data for each of the frames of image data, using the thumbnail image format, and displays the thumbnail images as icons 331 within an icon window 332 of the display screen 307.

The icons 331 are displayed in a sequence as calculated by camera position calculation module 6 which corresponds to the spatial relationship of the positions L(i) as shown in FIG. 31, so that the sequence L(i), i=1 to n progressing from left to right is maintained in the layout of the icons on the display screen 307 such that images I(i), i=1 to n, are positioned from left to right according to the value of i.

For simplicity of representation, the images shown in FIG. 32 are those of a regular polyhedron in which an x is drawn on one of the faces so that the apparent position of the x in each of the displayed thumbnail images corresponds to the view which would be obtained from the camera positions L(i).

At step 342 the user views the icons and at step 343 the user selects one of the icons as being of particular relevance for the purpose of evaluation of the images. The user selects the icon as indicated in FIG. 32 by the cursor 133 overlaying the third image, i=3, corresponding to selection of the camera position L(3) of FIG. 31.

At step 344, the apparatus receives the icon selection input and at step 345, the apparatus identifies the selected camera image for display in a camera image window 309. At step 346, the apparatus determines the position data for the selected camera by accessing data stored with the camera image data and at step 347 calculates the model image data using the selected position data to define the viewpoint for the model. In calculating the model image data, the apparatus also uses camera intrinsic parameters stored with the camera image data. The intrinsic parameters of the camera comprise the focal length, the pixel aspect ratio, the first order radial distortion coefficient, the skew angle (between the axes of the pixel grid) and the principal point (at which the camera optical axis intersects the viewing plane).

At step 348, the apparatus displays a model image 120 in the model image window 308 and the camera image 130 in a camera image window 309, thereby allowing the user to view and compare the selected camera image and the model image as calculated from a corresponding viewpoint.

In FIG. 32, the icons 331 are linked in series by links 333. If necessary, a large number of such icons may be displayed in an array comprising a number of rows, maintaining the links between successive icons in order to visually indicate the continuity of the sequence (i.e. the direction of increasing i). The use of such links therefore assists in providing the user with an indication of where the most appropriate image is to be selected.

Figure 33:
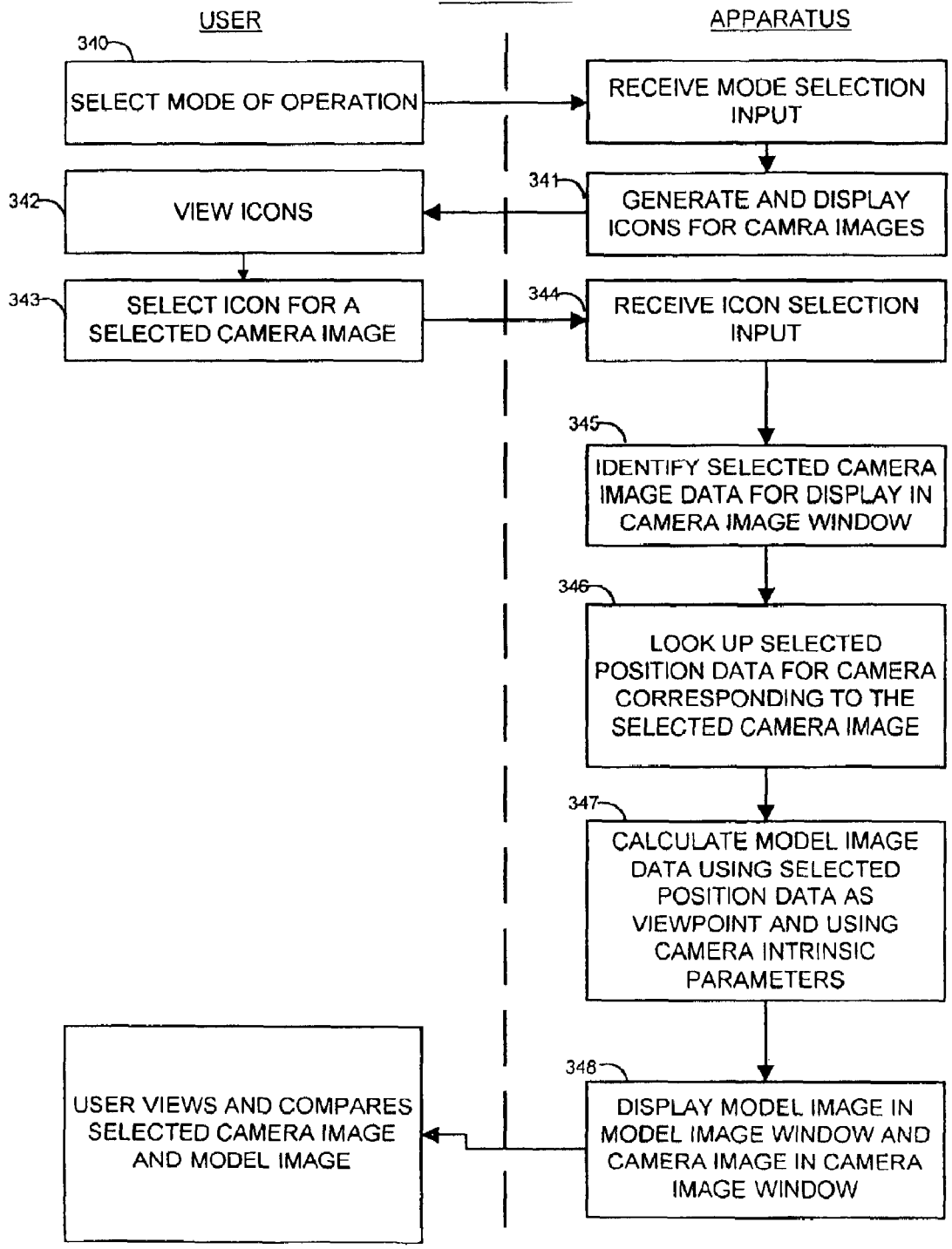

After viewing the images for a selected viewpoint, the user may then choose to view camera and model images for different viewpoints by selecting different icons, repeating step 343 of FIG. 33, and resulting in the apparatus repeating steps 344 to 348 to enable the further views to be seen.

If the user then decides that the model data requires editing, the user may then select a different mode of operation by selecting the appropriate mode icon 330 for further operation of the apparatus.

An alternative embodiment will now be described with reference to FIG. 34 and the flowchart of FIG. 35.

Figure 34:
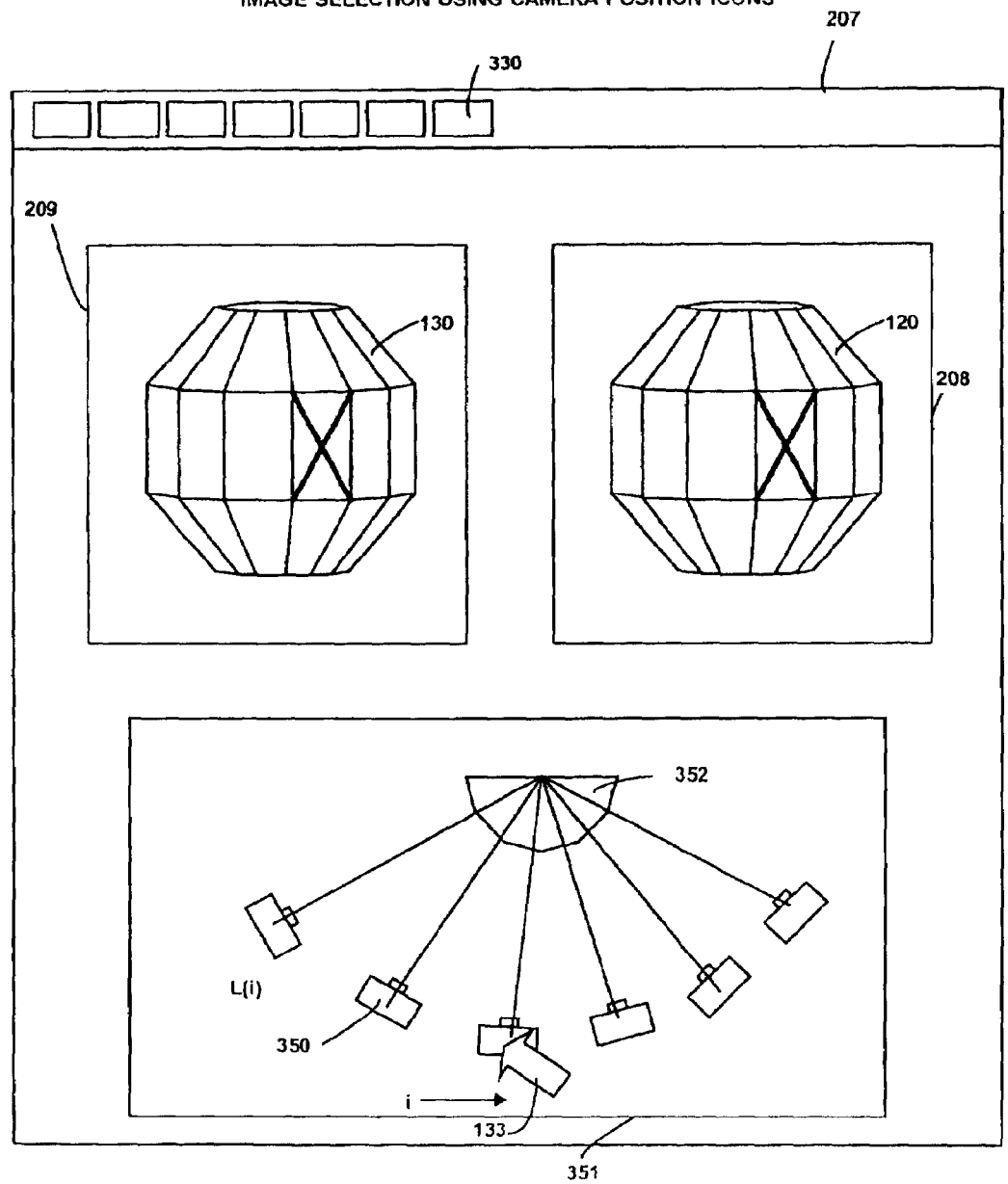
Figure 35:
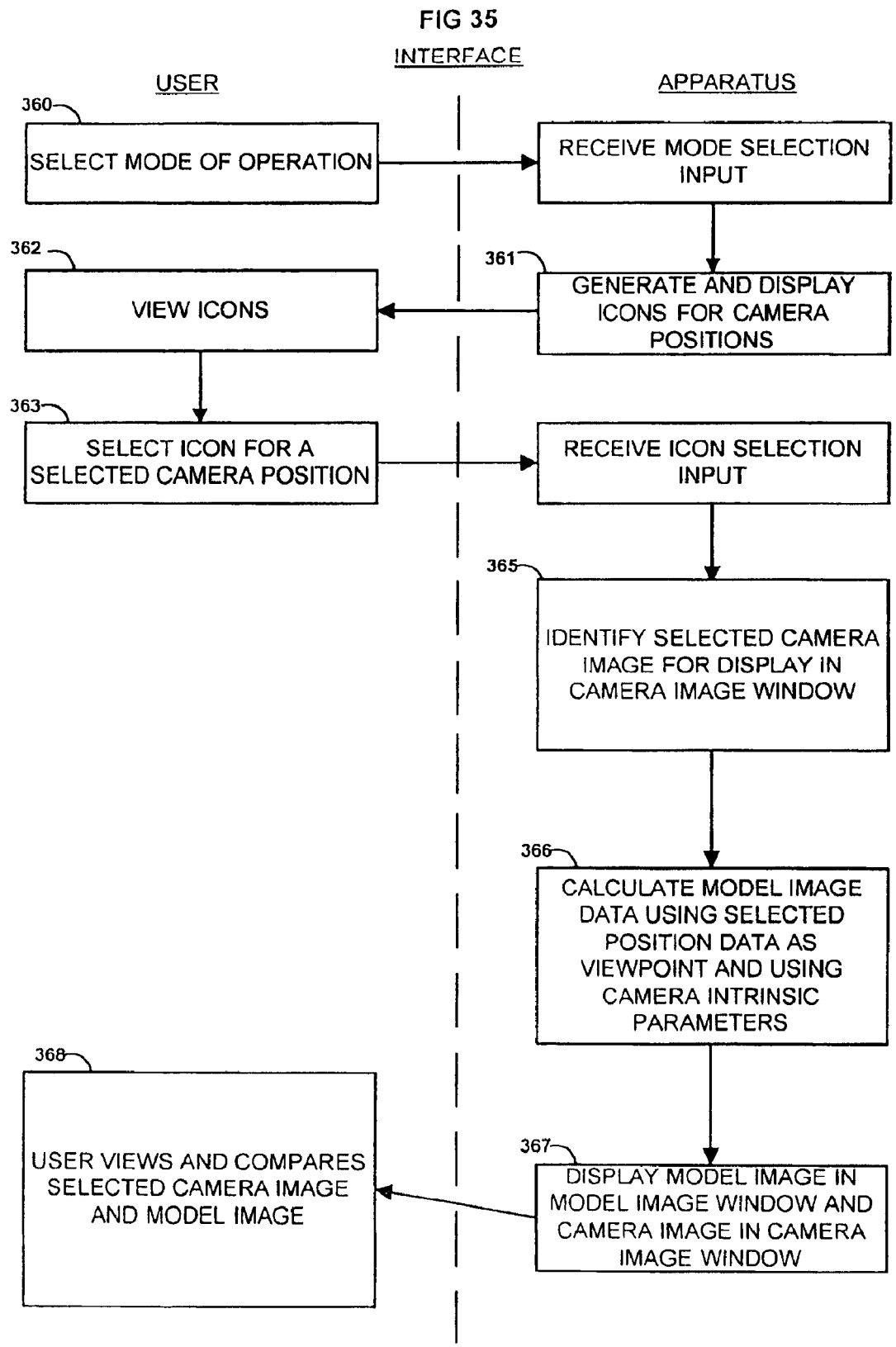

Referring to FIG. 35, at step 360 the user selects a required mode of operation by selecting the appropriate mode icon 330 of FIG. 34. The apparatus responds by generating and displaying icons 350 in a camera position window 351.

Within the camera position window 351, a display generated by the apparatus at step 361 comprises a representation 352 of the object based upon the model data together with representations of cameras at positions L(i), i=1 to n, such that the relative positions of the cameras and the representation 352 correspond to the calculated camera positions developed by the camera position calculation module 6 of FIG. 1. The representation 352 is thereby placed at the origin of the co-ordinate system of the model and the icons 350 located in effect at the calculated camera positions.

This representation of the relative positions of the cameras and object allows the user to easily select a viewing point for the camera and model images to be displayed. In order to select a particular viewpoint, the user at step 362 views the icons 350 within the window 351 and at step 363 selects one of the icons at the desired camera position. The apparatus responds at step 365 by identifying the camera image data corresponding to the selected camera position. At step 366, the apparatus then proceeds to calculate the model image data using the selected position data as a viewpoint and using camera intrinsic parameters stored in conjunction with the camera image data identified in step 365.

At step 367, the apparatus then displays the model image in model image window 308 and the camera image 130 in camera image window 309 to be viewed by the user at step 368. The user is then able to evaluate the quality of the image by comparison between the images.

In each of the display interfaces of FIGS. 34 and 35, the camera image window 309 and the model image window 308 may be moved relative to one another using a drag and drop method by means of actuating the mouse. Similarly, the icon windows 332 and 351 may be moved relative to the image windows 308 and 309, thereby allowing the user to arrange the windows for maximum ease of selection and comparison.

The method of the present invention can be implemented by a computer program operating on the computer apparatus 300, the program comprising processor implementable instructions for controlling the processor 301. The program may be stored in a storage medium such as floppy disk 306. An aspect of the present invention thus provides a storage medium storing processor implementable instructions for carrying out the above described method.

Further, the computer program may be obtained in electronic form for example by downloading the program code as a signal 311 over a network such as the internet via the modem 310.

The following embodiments described with reference to FIGS. 36 to 57 may be embodied in particular as part of the feature detection and matching module 2 (although it has applicability in other applications, as will be described later).

Figure 36:
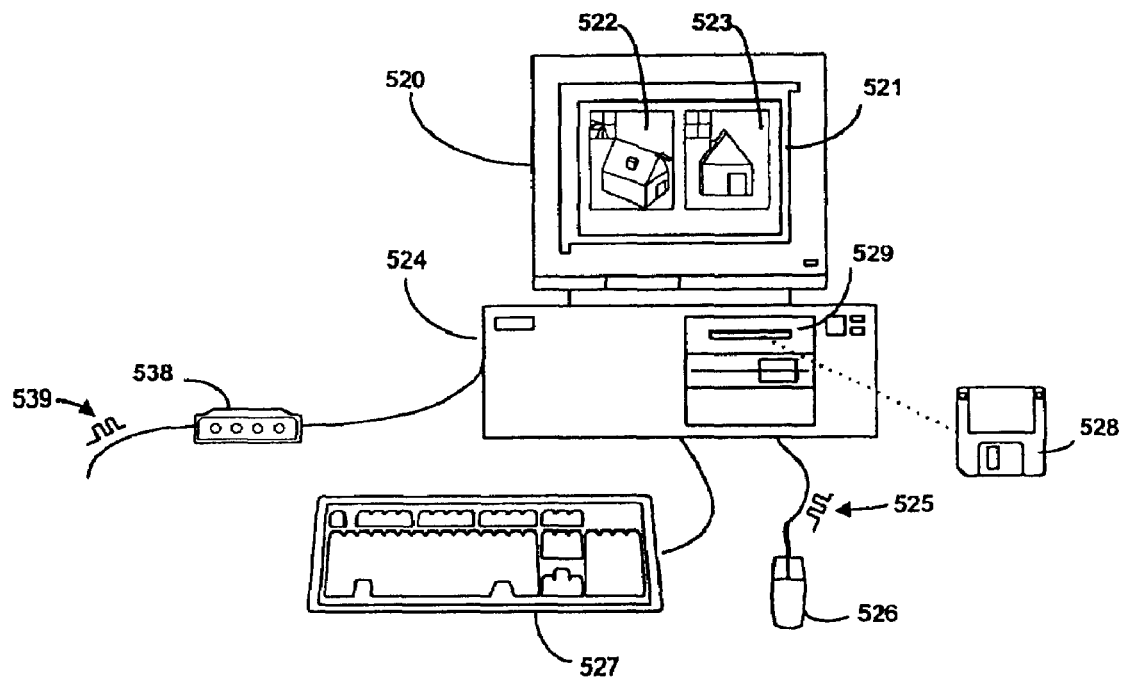
FIG. 36 is a schematic representation of the apparatus of the present invention including a processor having a display and pointing device for use in the system of FIG. 1.

FIG. 36 illustrates a display monitor 520 having a display screen 521 on which are displayed first and second images 522 and 523. A processor 524 programmed with program code for creating a three dimensional computer model is connected to drive the display monitor 520 and receives pointing signals 525 from a computer mouse 526 actuated by the user. The selection of frames of image data for providing the first and second images 522 and 523 may be made manually by the user or automatically by the processor 524 as described below with reference to FIGS. 42 to 57.

Additional data may also be input to the processor 524 via a keyboard 527. Software for operating the processor 524 is input to the processor from a portable storage medium in the form of a floppy disc 528 via a disc drive 529.

FIG. 37 illustrates in greater detail the first and second images 522 and 523 displayed in the display screen 521, FIG. 37 in particular showing a first phase of operation in which a cursor 530 is positioned within the first image. The cursor 530 is displayed by the display screen 521 at a position determined by movement of the mouse 526.

As shown in FIG. 37, the first and second images 522 and 523 represent successive first and second frames of camera views of a real object, in this case a house, the camera views being from different camera positions.

The processor 524 causes the display monitor 520 to present the images of FIG. 37 in response to user selection of a point matching mode, the interactive selection of program operating modes by the user being by use of the computer mouse 526 and a menu of icons 548 displayed in a peripheral portion of the display screen 521.

During the first phase shown in FIG. 37, the user selects visually an image point 531, in this example being an apex formed at the intersection of roof surfaces and an end wall of the house, and manipulates the mouse 526 to move the cursor 530 into a region of the first image proximate to the image point 531.

The first image 522 is displayed within a rectangular image window 533 which is partially overlaid by a first magnified image window 534. The first magnified image window 534 is square in shape and overlays the upper left hand corner of the image window 533. The first magnified image window 34 includes a graticule 535 in the form of horizontal and vertical cross wires intersecting at the centre of the first magnified image window.

A first magnified image 536 is displayed within the first magnified image window 534 and corresponds to a localised portion 532 of the first image 522, centred on the cursor position, and magnified to a sufficient magnitude to allow detail within the localised portion to be viewed more clearly by the user and to allow better resolution of any misalignment between the visually selected image point 531 and the image point corresponding to the current position of the cursor 530.

The processor 524 controls the display monitor 520 such that the first magnified image 536 is continuously displayed during a first phase of operation during which a point is to be selected in the first image. An enlarged view of the localised portion 532 is displayed, the image features displayed being determined instantaneously to be local to the position of the cursor 530, it being apparent therefore that any movement of the cursor relative to the first image is accompanied by movement of image features within the first magnified image relative to the fixed graticule 535. The graticule 535 thereby serves as a fiducial means pointing to an image point 537 in the first magnified image corresponding to the same image feature as the image point 531 at the position of the cursor 530.

The first phase of operation ends when the user determines that the cursor 530 and graticule 535 are correctly aligned with the desired image point 537 for selection and the user actuates the pointing device, i.e. clicks the mouse 526, to generate a selection signal interpreted by the processor 524 as being representative of coordinates of a first selected point in the first image.

The processor thereafter freezes the first magnified image 536 within the first magnified image window 534 so that it continues to indicate alignment between the graticule 535 and the first selected point 537 irrespective of subsequent mouse movement. The processor 524 also generates an indicator 546 displayed in the first image 522 at the co-ordinates of the first selected point.

The user then operates the apparatus in a second phase illustrated in FIG. 38 in which the cursor 530 is moved into the second image 523 with the intention of the user completing the matching process by selecting a second point corresponding to the same image feature as the first selected point 537 in the first image. The user visually identifies the feature of the apex in the house from the different view of the house shown in the second image and, as shown in FIG. 38, moves the mouse 526 to position the cursor 530 in a region of the second image which is local to the apex.

The second image 523 is displayed within a second image window 541 which is rectangular in shape and which is overlaid at a top left hand corner by a second magnified image window 542 of similar square shape to the first magnified image window and similarly including a graticule 544 in the form of intersecting crosswires.

The display monitor 520 is controlled by the processor 524 to display within the second magnified image window 542, after commencement of the second phase, a second magnified image 543 corresponding to an enlargement of a localised portion 540 instantaneously determined to be local to the cursor 530 within the second image 523.

In this way, movement of the cursor 530 is accompanied by a change in view within the second magnified image window 542 so that the precise cursor position relative to the visually selected feature in the second image can be refined by viewing within the second magnified image window. Alignment is completed when the intersection of the cross wires of the graticule 544 is coincident with the selected feature and a second selected image point 545 is determined by actuating the pointing device, i.e. clicking the mouse.

The processor 524 interprets receiving a selection signal resulting from the mouse click as being representative of coordinates of the second selected image point indicated by the current cursor position, as confirmed by coincidence of the image feature with the graticule 544 in the second magnified image window 542.

The processor 524 thereafter controls the display monitor 520 to freeze the view displayed in the second magnified image window 542. Coordinates of the matching points defined by the first and second selected image points 537 and 545 are then processed by the processor 524 to generate three dimensional model data for the model. In the system of FIG. 1, this process is performed by the camera position calculation module 6 and the 3D surface generation model 12. Additional pairs of matching points may then be input in subsequent steps, each subsequent step comprising a respective first phase and second phase as described above.

To commence the matching for an additional pair of points, the user moves the cursor 530 back into the first image 522 to commence the first phase and the processor 524 then causes the first magnified image 536 to be unfrozen and to vary according to cursor position in the manner described above.

Figure 39:
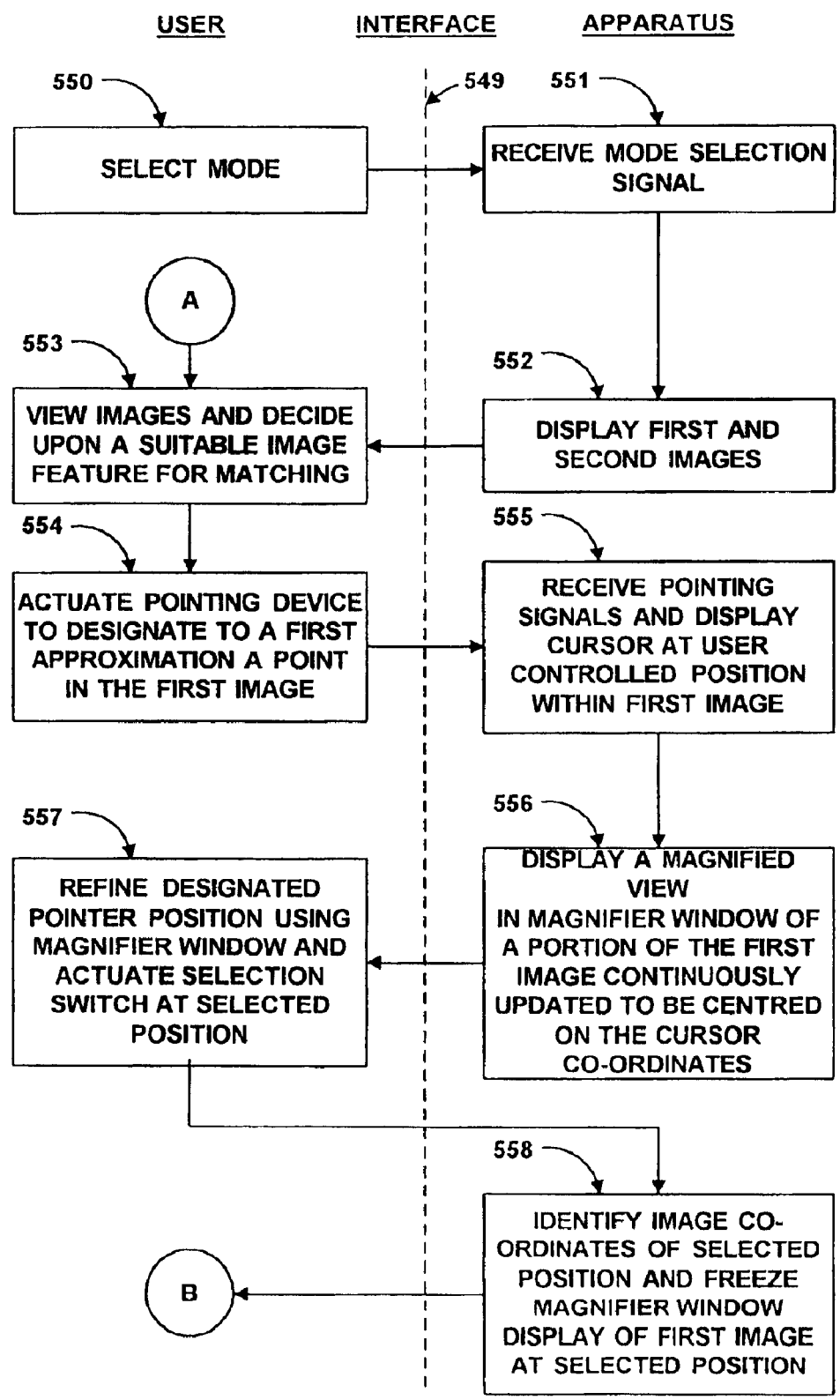
FIG. 39 is a schematic flowchart illustrating the first phase of operation.

The method steps performed in the above process described with reference to FIGS. 37 and 38 are summarised in FIGS. 39 and 40 in which those steps performed by the user are shown separated from those steps performed by the apparatus by a broken line representing the interface 549 defined by the display screen 521 and user input devices including the mouse 526.

At step 550, the user selects the mode of operation which in this example is a matching mode for selecting matching points. The processor 524 receives the mode selection signal at step 551 displays at step 552 the first and second images 522 and 523 (as shown in FIG. 37) and at step 553 the user views the images and decides upon a suitable image feature.

At step 554, the user actuates the pointing device, i.e. moves the mouse, to designate to a first approximation the position of the first image point 531 corresponding to the selected feature. At step 555, the processor receives the pointing signals resulting from actuation of the pointing device, causing the display to indicate the cursor position accordingly at a user controlled position 530 within the first image.

At step 556, the processor causes the display to present a first magnified image 536 in the first magnified image window 534 so as to be continuously updated to be centred on the cursor coordinates.

At step 557, the user views the first magnified image 536 and refines the cursor position by viewing the magnified image. When finally the user is satisfied that the desired image feature is coincident with the intersecting crosswires of the graticule 535, the user actuates the selection switch of the computer mouse 526.

At step 558, the processor identifies the image coordinates at the selected position and freezes the view displayed in the first magnifier window.

Figure 40:
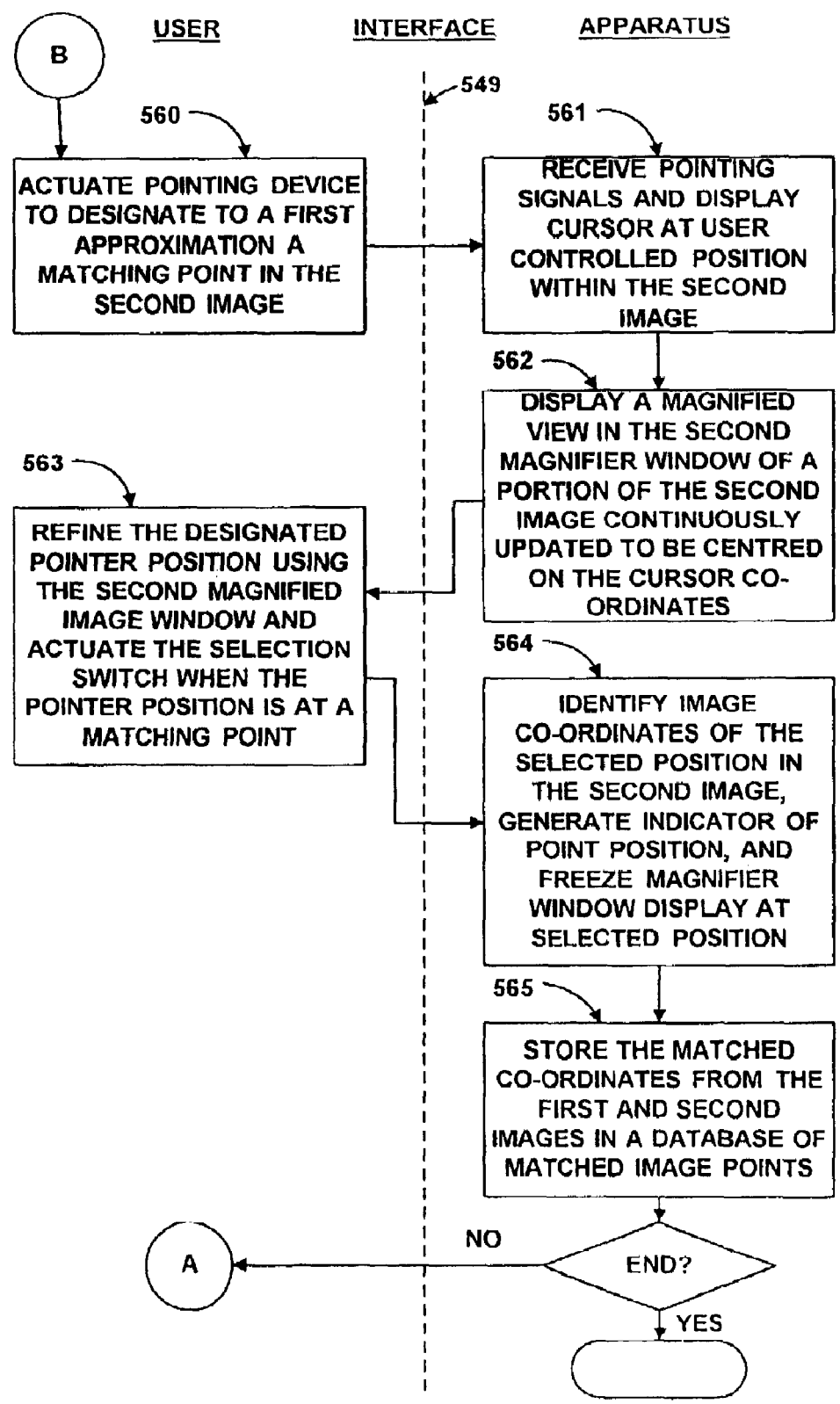
FIG. 40 is a schematic flowchart illustrating a second phase of operation.

The second phase illustrated schematically at FIG. 40 then commences in which the user at step 560 actuates the mouse 526 to move the cursor into the second image 523 and, to a first approximation, aligns the cursor 530 with the matching image feature in the second image 523.

At step 561, the processor receives pointing signals corresponding to mouse movement and causes the display to display the cursor 530 at the user controlled position within the second image 523.

At step 562, a magnified view is displayed in the second magnified image window 542, a magnified image being displayed of the localised portion 540 of the second image centred on the cursor coordinates.

At step 563, the user refines the pointer position using the second magnified image window 542 and actuates the selection switch of the mouse when the crosswires of the graticule 544 intersect precisely at the location of the matching image feature as viewed in the second magnified image 543.

At step 564, the processor identifies from selection signals generated by the mouse actuation the image coordinates of the selected matching position in the second image and fixes the magnified image displayed in the second magnified image window. At step 565, the processor stores the matched coordinates from the first and second images in a database of matched image points.

The next subsequent step of matching a pair of points then commences by returning to step 554 described above until the procedure is ultimately terminated by either the processor indicating that sufficient points have been matched or by the user selecting a different mode using a different one of the mode selecting icons 48.

By using the above apparatus and method, a user may rapidly enter successive pairs of matching points with the advantage of having a magnified view of the localised area of interest but with the minimum amount of actuation of the computer mouse since a single click of the mouse is required to select each one of the matching points. No further actuation of keyboard or mouse is needed to initiate generation of the required magnified view.

The matching procedure implemented by the feature detection and matching module of the system of FIG. 1 may in some circumstances require matching points to be identified in more than two images. A situation may then arise where the user wishes to identify in a third image a number of image points matched to a number of existing points for which matching co-ordinates have already been obtained in first and second images, using for example the method described above with reference to FIGS. 37, 38, 39 and 40.

Figure 41:
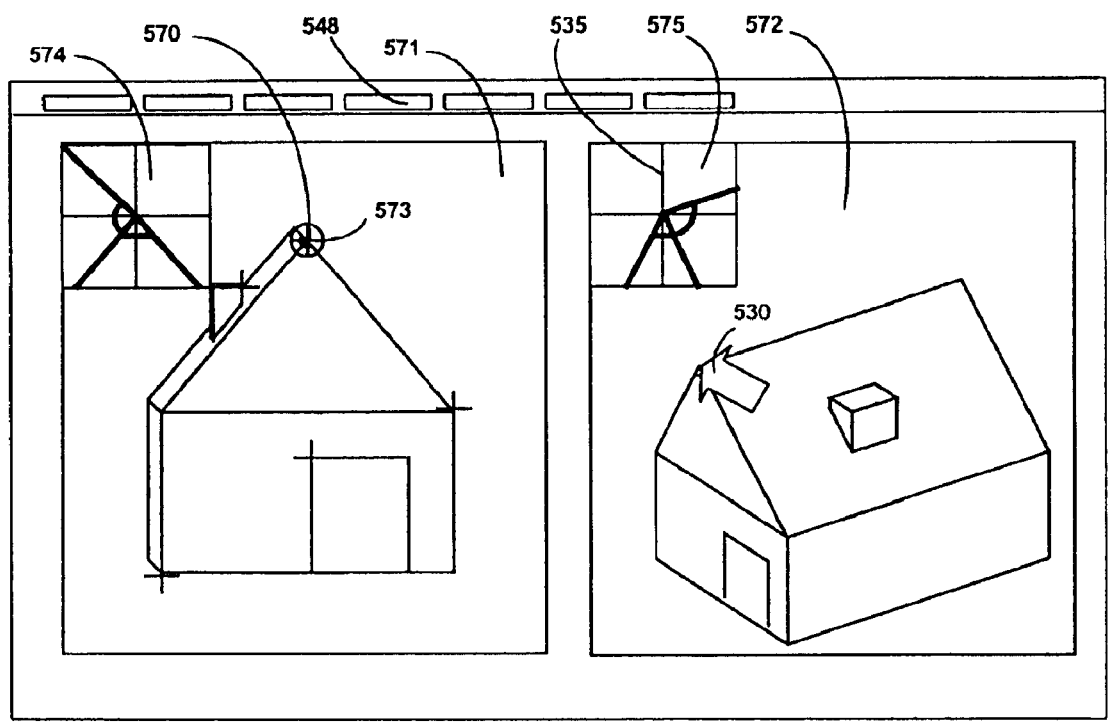
FIG. 41 is a schematic representation of a further phase of operation in which image points are matched in a third image.

In order to undertake the matching process to identify the points in the third image, the second and third images 571 and 572 are displayed side by side and the existing matched points are displayed in the second image by a series of indicators 570 in the form of crosses as illustrated in FIG. 41. Magnified image windows 574 and 575 are provided in the image windows of the second and third images 571 and 572 respectively. The task of matching between the second and third images 571 and 572 shown in FIG. 41 differs from the above described method with reference to FIGS. 37 and 38 since in the second image 571 the set of image points is predetermined by the previous matching step. To perform a matching process, the user selects one of the image points represented by the indicators 570 by placing the cursor on or adjacent to the image point and actuating the mouse. This pointing signal is detected by the processor 524 which then causes the displayed indicator 570 of the selected image point to be highlighted, for example by changing colour. In FIG. 41, the selected point is highlighted by enclosing the indicator 570 by a circle 573. The magnified image window 574 then displays a magnified view of the second image local to the selected point.

The user then uses the mouse 526 to move the cursor 530 into the third image 572 and aligns the cursor 530 with the image feature corresponding to the selected point represented by the highlighted indicator 570, 573 in the second image 571. Final adjustment is made by viewing the magnified image within the magnified image window 575 in which the matching image point to be selected in the third image is identified by the location of the graticule 535 relative to the magnified image 575. The mouse 526 is then actuated by the user to provide a selection signal resulting in the input of co-ordinates to the model of matching image points in the second and third images 571 and 572. Matched points in the third image may be represented by indicators (not shown) as a guide to identifying which points in the second image remain to be matched.

Alternative embodiments are envisaged within the scope of the present invention including for example the use of alternative pointing devices such as a joystick or touch pad. Although in the preferred embodiment of FIGS. 36 to 41 the magnified image 574, 575 overlays a fixed portion of the displayed image, an alternative arrangement allows the operator to select the position of the magnified image window during an initial configuring step, the magnified image window thereafter remaining fixed in position. Such a configuring step may be advantageous where point matching is required in a peripheral portion of the image which might otherwise be hidden.

The graticule 535 within the magnified image window may alternatively be replaced by a stationary cursor, white spot or coloured spot, or any other fiducial means for identifying a fixed position within the magnified window.

The apparatus of the above embodiment may conveniently be constituted by a desktop computer operated by a computer program for operating the above described method steps in accordance with program code stored in the computer. The program code may be stored in a portable storage medium such as a CD ROM, floppy discs or optical disc, represented generally by reference 528 in FIG. 36.

An aspect of the present invention thus provides such a storage medium 528 storing processor implementable instructions for controlling a processor 524 to carry out the method described above.

Further, the computer program can be obtained in electronic form for example by downloading the code over a network such as the Internet. In FIG. 36, a modem 538 suitable for such downloading is represented schematically.

Thus, in accordance with another aspect of present invention, there is provided an electrical signal 539 (FIG. 36) carrying processor implementable instructions for controlling the processor 524 to carry out the method described above.

Further embodiments of the present invention are envisaged in which for example a series of points in a displayed image are selected by a user and co-ordinates of the selected points are input to a processor 524 with the aid of a magnified image as described above. Such alternatives include methods of categorising images such as fingerprint analysis and aerial photograph interpretation for use in cartography.

A further aspect of the present invention will now be illustrated by the following embodiments. This aspect of the invention may be used in the modular system of FIG. 1 as described above and using the apparatus of FIG. 36 including processor 524, display monitor 520 and computer mouse 526 actuated by the user.

As in the preceding embodiments, the processor 524 is programmed with program code for creating a three-dimensional computer model, the processor being connected to drive the display monitor 520 and receive pointing signals 525 from the computer mouse 526.

Additional data may also be input to the processor 524 via keyboard 527. Software for operating the processor 524 is input to the processor from a portable storage medium in the form of a floppy disc 528 via a disc drive 529 or may be input in the form of a signal 539 via a modem 538.

Once model data has been created by processing image data of a number of frames of camera images, it is often the case that the user may judge that the model data requires refinement, for example to add further detail relating to a specific feature of the model or to correct model data in the case of the model image providing an incorrect representation of the object.

Procedures for adding and correcting model data typically require the display monitor to display both the model image and one or more camera images, in each case showing the relevant feature of the model and the object, to allow the user to interactively input model data and view the result when translated into an updated model image.

Since the model data may be derived from a large number of frames of image data, manual selection by the user of the most appropriate frames of image data may be time consuming and may provide less than optimum results. In accordance with the following embodiment, the processor 524 is therefore programmed to provide automatic selection of the most appropriate camera images for this purpose.

Figure 43:
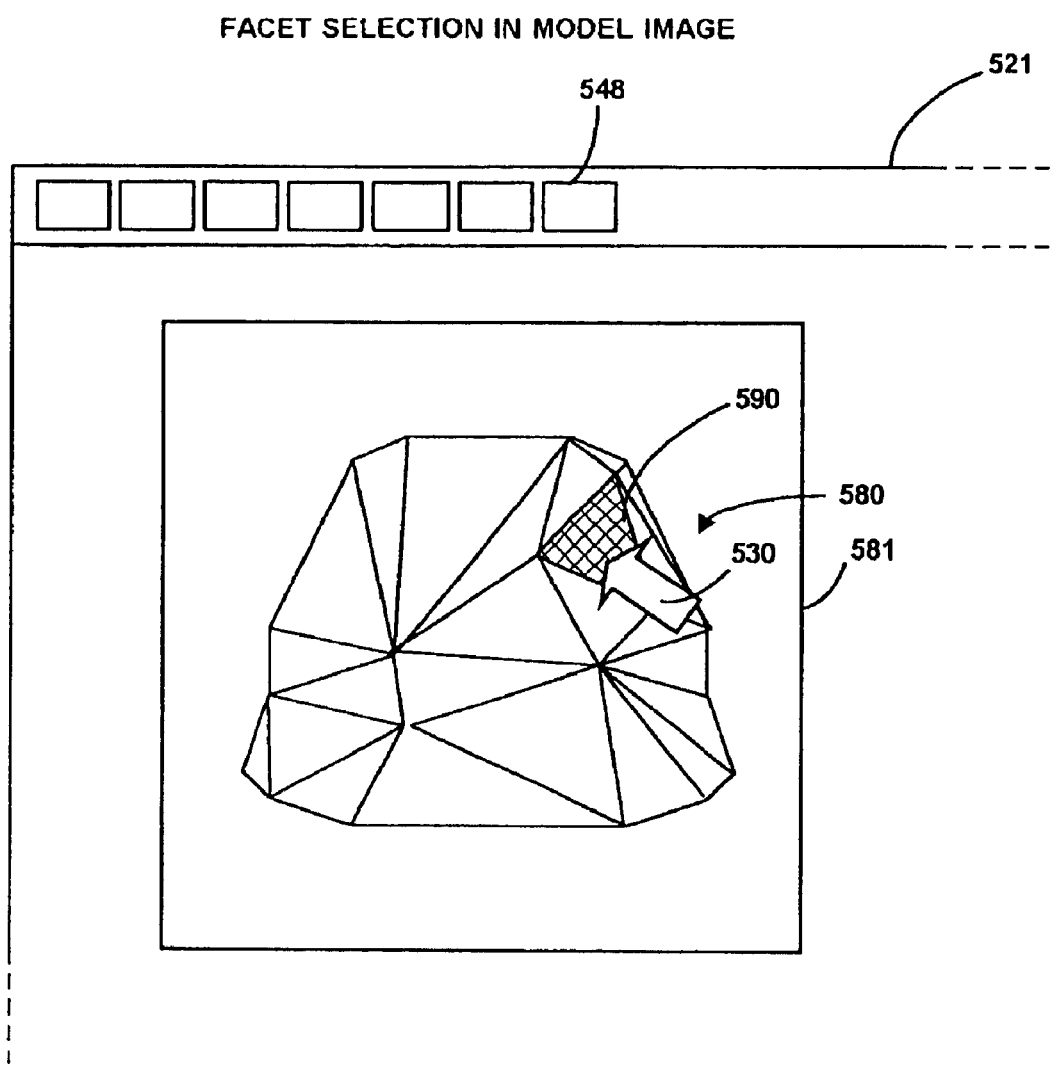
FIG. 43 is a schematic representation of selection of a facet in the model image of FIG. 42.
Figure 44:
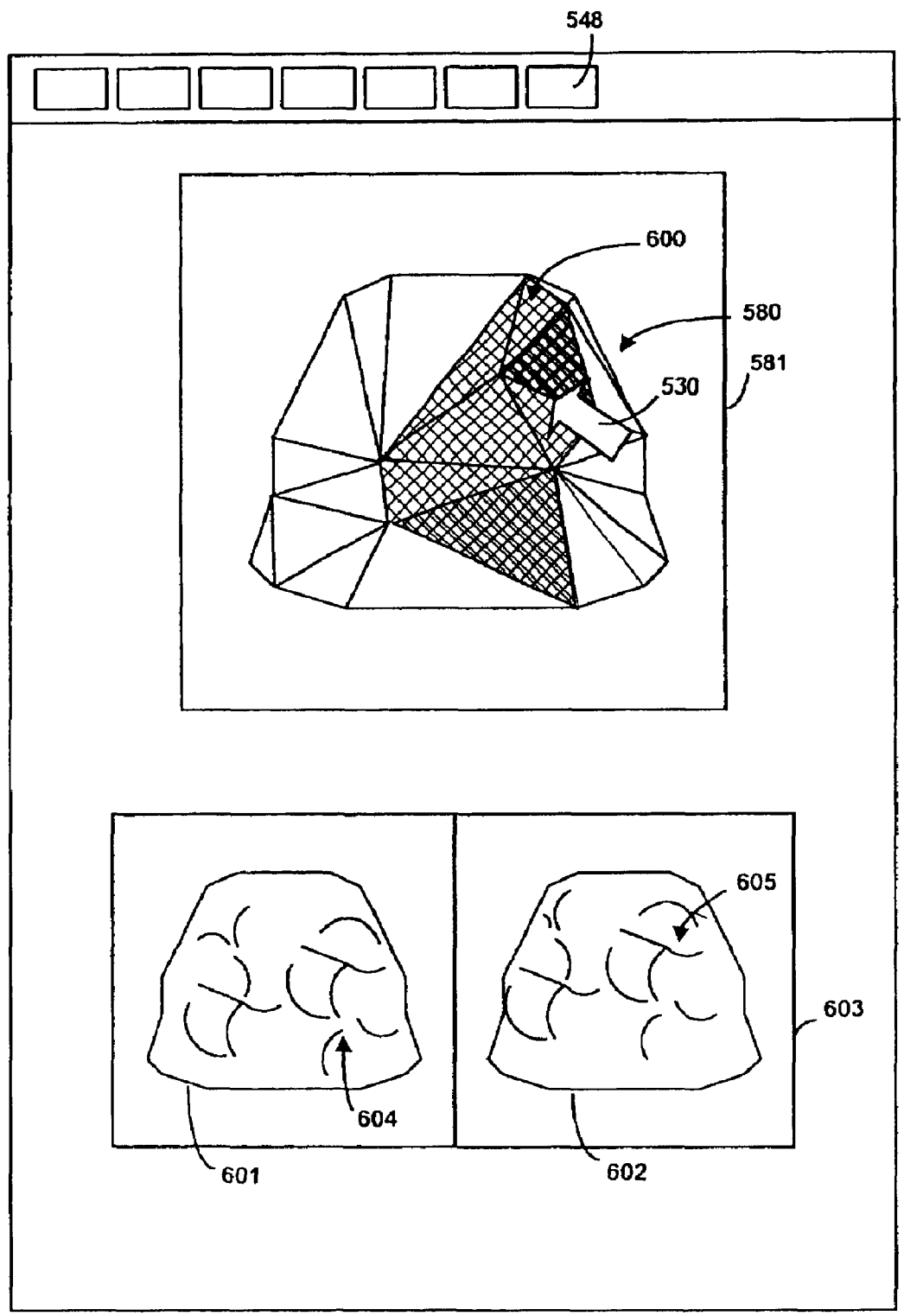
FIG. 44 is a schematic representation of a display of the model image of FIGS. 42 and 43 in which multiple facets have been selected and camera images corresponding to an optimum view and a complementary view are displayed in conjunction with the model image.
Figure 52A:
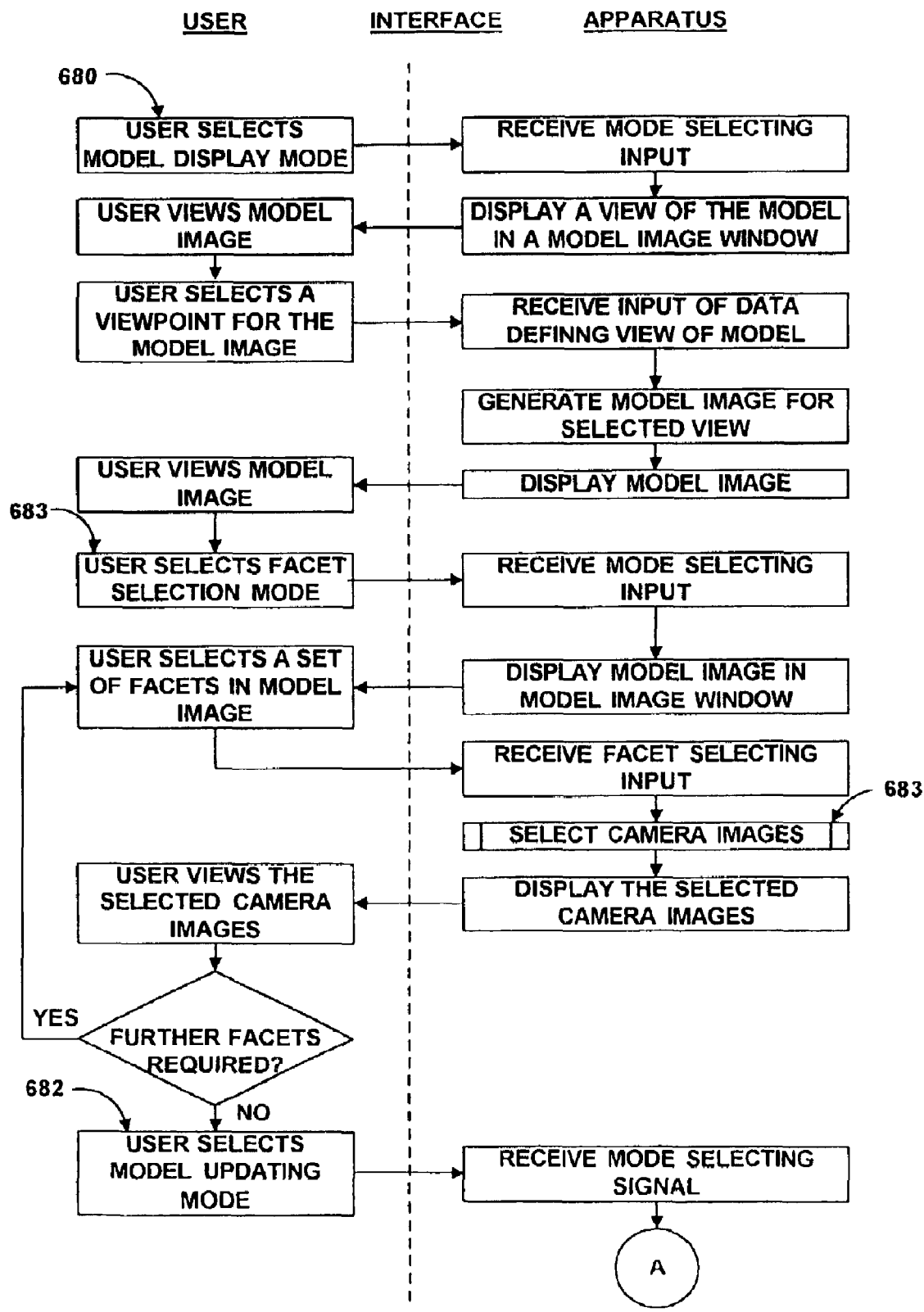
FIGS. 52A and 52B is a flowchart illustrating operation of the apparatus to select camera images and update the image data.

Control of the process relies upon the interface provided by the display screen 521 and the input of pointing and selecting signals using computer mouse 526, steps in the method being illustrated in FIG. 52 in which a left hand column contains steps conducted by the user and a right hand column contains steps executed by the apparatus in the form of the processor 524 connected to the display screen 521, the columns being separated by a broken line representing the interface. During the following description, reference will be made to the method steps shown in FIG. 52 in relation to the images displayed on the display screen as shown in FIGS. 42 to 44.

Figure 42:
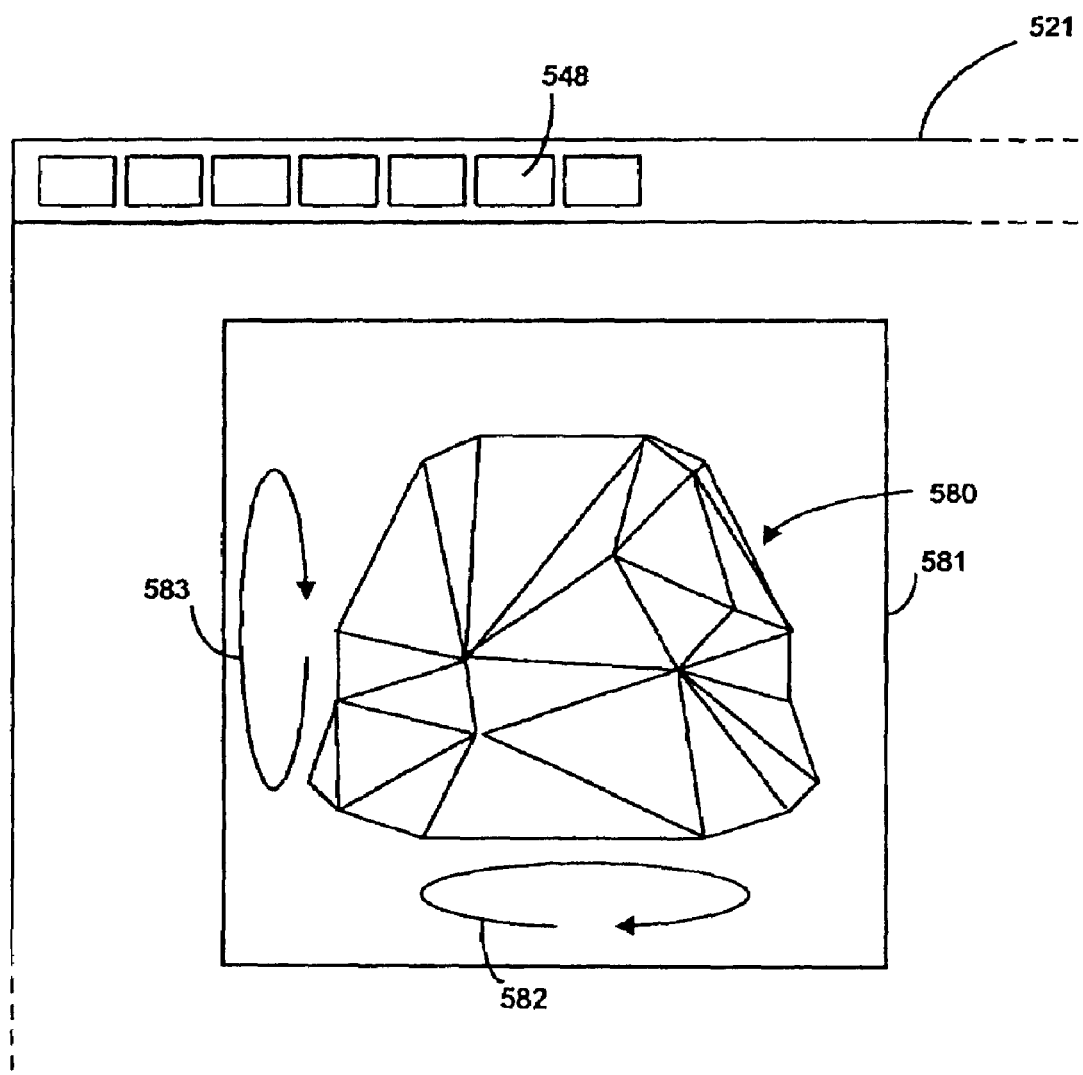
FIG. 42 is a schematic representation, in a further aspect of the present invention, showing the initial orientation of a model image.

The user at step 680 initially selects a model display mode from a menu of available modes of operation represented by mode selecting icons 548 and, in response to receiving the mode selecting input, the apparatus displays a view of the model in a model image window 581 as illustrated in FIG. 42. In FIG. 42, the representation of the model image 580 is illustrated as an irregular shape with a surface formed of a number of triangular facets. This representation is a simplified schematic representation, the actual model image typically being visually identifiable with a real object and comprising a much larger number of facets, the model image being rendered to include surface texture emulating the object.

The user actuates the mouse 526 to rotate the model image 580, left/right mouse movement effecting rotation of the model image in longitude as indicated by arrow 582 and forward/reverse movement of the mouse effecting rotation of the model image in latitude as indicated by arrow 583. A second mode of movement may be selected to vary the size of the model image. Throughout the above image movements, a virtual viewpoint for viewing the model is defined such that the model is always viewed in a direction directed to the centre of the co-ordinate system of the model data.

As shown in FIG. 52, after selecting a viewpoint for the model image, such that the model image generated by the apparatus corresponds to a selected view showing a feature of particular interest to the user, the user selects at step 681 a facet selection mode. In this mode, movement of the mouse 526 effects movement of a cursor 530 relative to the model image 580 and, as shown in FIG. 43, clicking the mouse 526 provides a facet selecting input signal in response to which a selected facet 590 at the location of the cursor 530 is highlighted in the model image, as illustrated by the cross hatched area in FIG. 43.

The user it thereby able to select facets identifying a particular feature of interest in respect of which model data requires refinement or correction.

The user repeats facet selection until a set of selected facets is accumulated, as shown in FIG. 44 in which the set of selected facets 600 are shaded.

As illustrated in FIG. 44, the apparatus responds at step 683 by automatically selecting first and second camera images 601 and 602 which are displayed in a camera image window 603, based upon a determination of the optimum view of the model derived from the input of selected facets 600 described above.

The first camera image 601 includes a first view 604 of a feature constituted by a prominence of a particular shape protruding from the irregular surface of the object shown in the camera image, a second view 605 of the feature being provided in the second camera image 602. If the user is not satisfied that the correct camera images have been displayed, further facets may be added to the set 600 by selecting further facets shown in the model image window 681.

Once the user is satisfied that the displayed first and second camera images 601 and 602 are the most appropriate camera images, the user then selects at step 682 a model updating mode as shown in FIG. 52. The apparatus continues to display the model and camera images and responds to further user input by following an interactive updating procedure based on the displayed images such that the model data is updated. The updated model data is used to update the displayed model image, giving the user the opportunity to continue the updating procedure to progressively refine the model as required.

According to a preferred embodiment using "aspect measurements" defined below, step 683 of selecting camera images as shown in FIG. 52 is illustrated in further detail in the flowchart of FIG. 53 and will now be described with additional reference to FIGS. 45 to 49. For each facet f of the selected facets 600 selected and highlighted during the facet selection mode of operation referred to above, a respective set of aspect measurements M(f,i), i=1 to n is calculated, each aspect measurement of the set being representative of the visibility of the facet when viewed from a virtual camera L(i).

Figure 45:
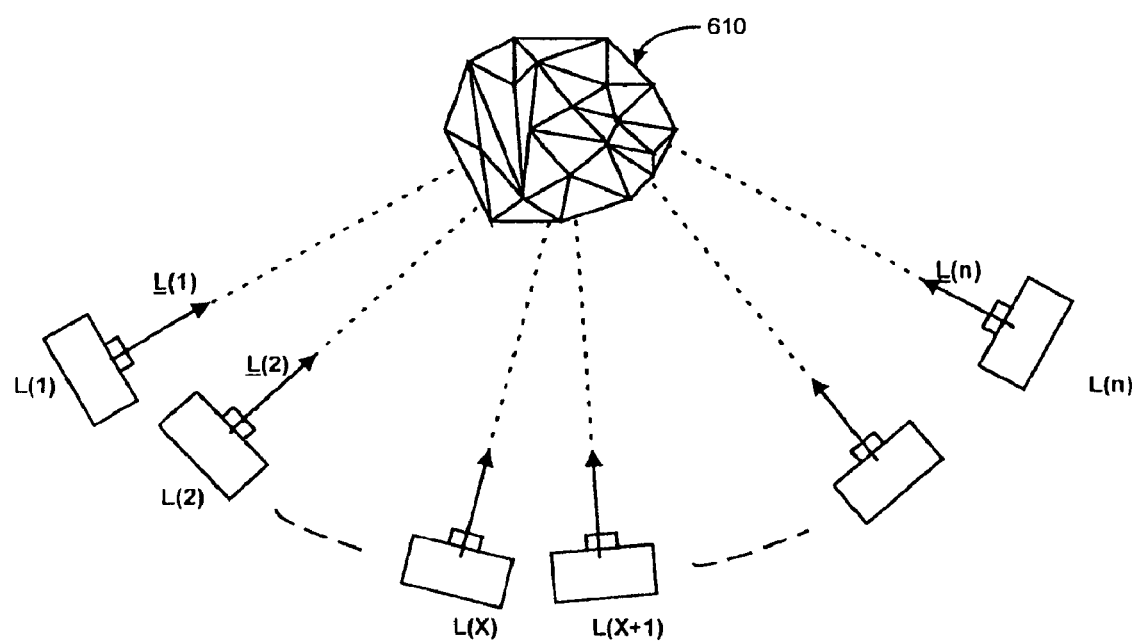
FIG. 45 is a schematic diagram illustrating the relative position of virtual cameras relative to the model in three dimensions.

FIG. 45 illustrates schematically the relationship between the three-dimensional model 610 and the virtual cameras L(i), i=1 to n. Each of the virtual cameras L(i) is represented by co-ordinates in the three dimensional space of the model to represent a camera position as calculated by the camera position calculation module 6 of FIG. 1 and a look direction represented in FIG. 45 by look direction vectors $\underline{L}$(i) which represent the direction normal to the image plane of the camera L(i). The term "virtual camera" in the present context therefore refers to the calculated positions in model space corresponding to actual camera positions relative to the object being modelled.

Figure 46:
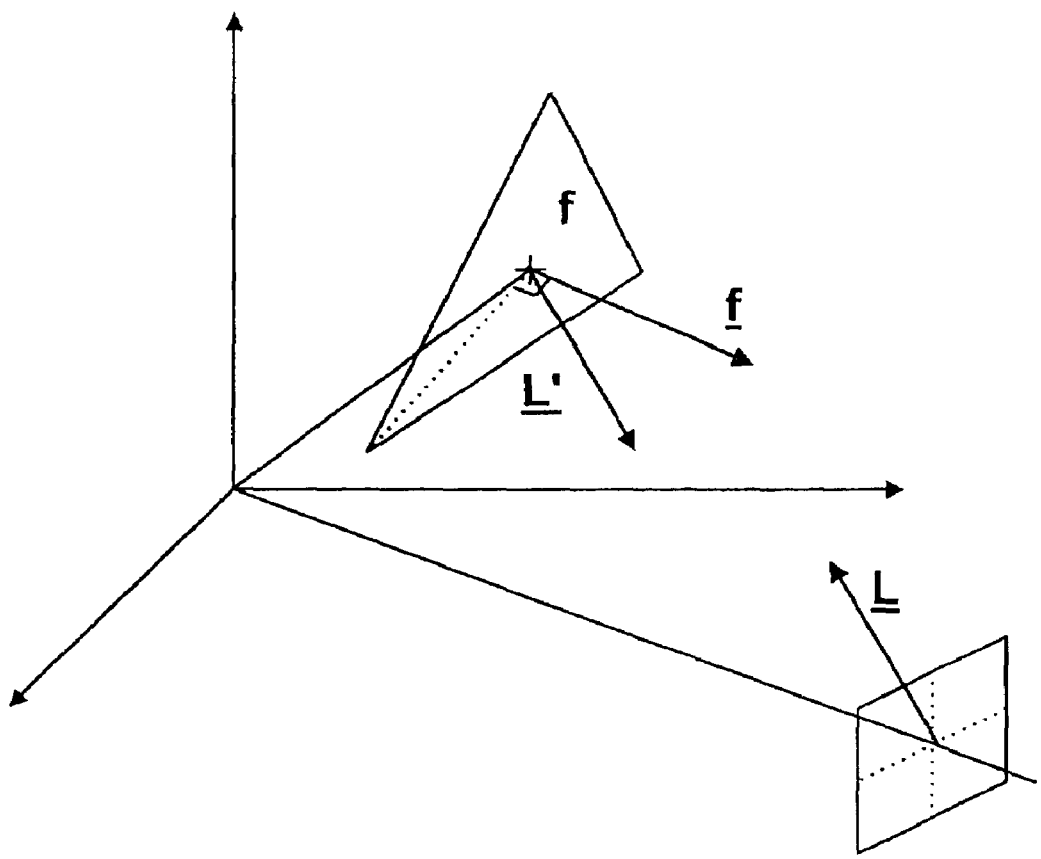
FIG. 46 is a diagram illustrating the relationship between unit vectors used in an aspect measurement calculation.

The method of calculating the aspect measurement M(f,i) is illustrated in FIG. 46 which shows the relationship between a facet f and one of the virtual cameras L(i). The extent to which the facet f is visible with respect to virtual camera L(i) is dependent on the relationship between the look direction of the virtual camera, as defined by unit vector $\underline{L}$, and a unit vector $\underline{f}$ defined to be a unit vector normal to the plane of the facet f.

Defining $\underline{L}'$ to be parallel to and in an opposite direction to the unit vector $\underline{L}$, the scalar product $\underline{f} \cdot \underline{L}'$ has a magnitude which is representative of the extent to which the facet is visible. For example, a facet which has a normal unit vector $\underline{f}$ parallel to the look direction $\underline{L}$ will be fully visible and the scalar product will be unity whereas a facet oriented such that the look direction $\underline{L}$ is parallel to the plane of the facet will have minimum visibility and the scalar product will be zero.

Figure 48:
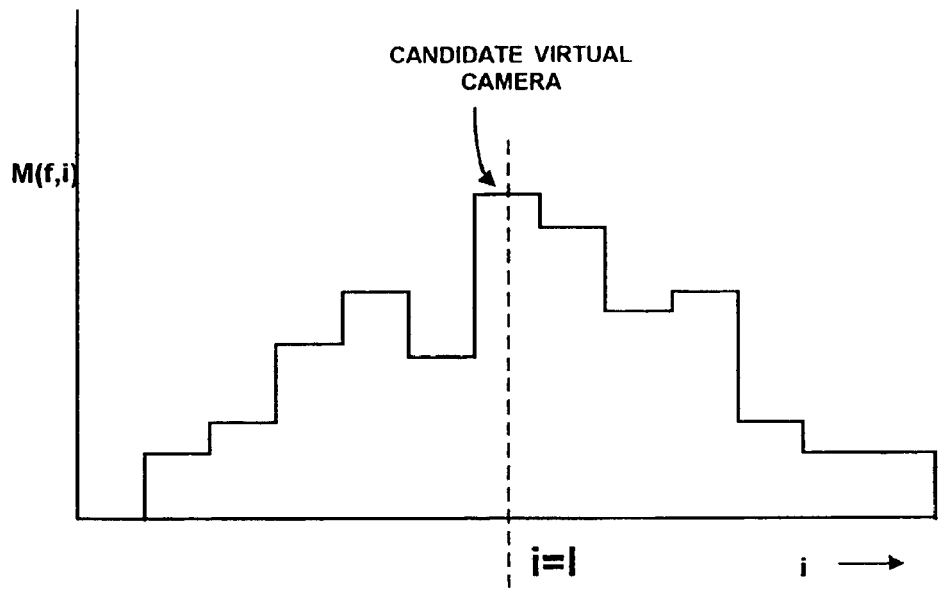
FIG. 48 is a graphical representation of aspect measurement for a given facet and for a plurality of virtual cameras.

FIG. 48 illustrates graphically for a given facet f the variation of aspect measurement with i, the identifier of the virtual cameras. In the example of FIG. 48, a maximum value of aspect measurement is obtained for a virtual camera identified by i=I so that camera L(I) is identified as being a candidate for the optimum virtual camera.

Figure 53:
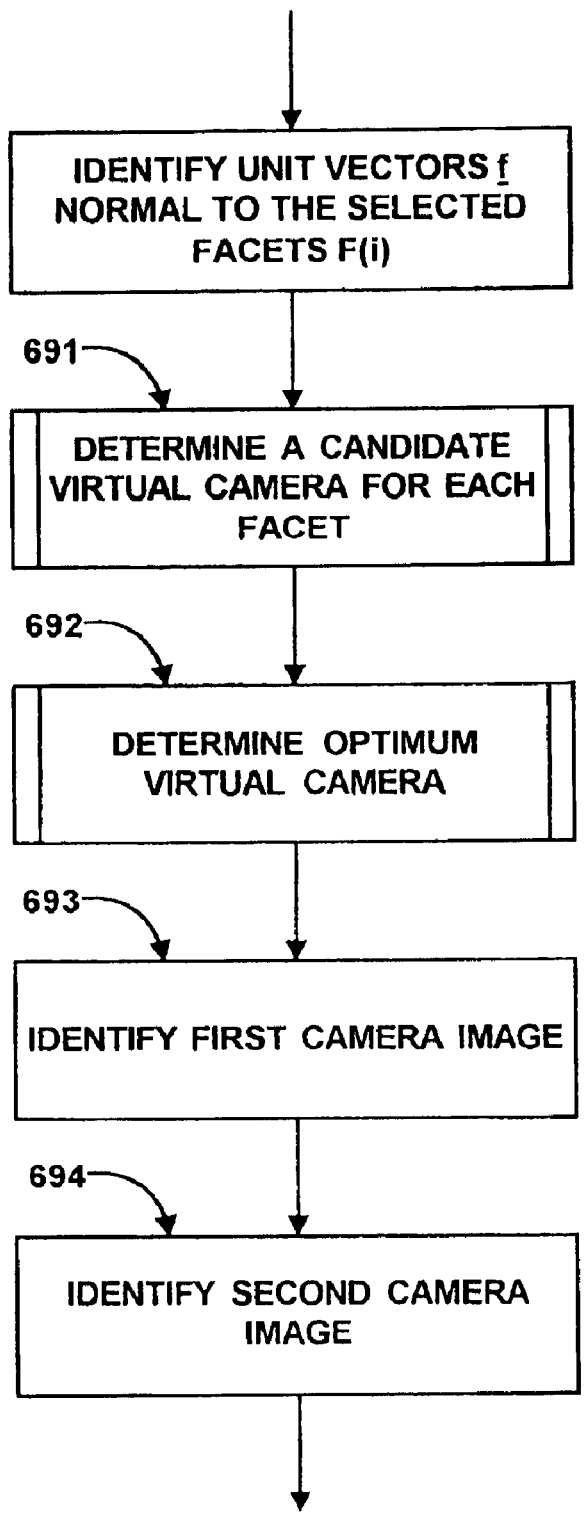
FIG. 53 is a flowchart illustrating selection of an optimum camera images.
Figure 54:
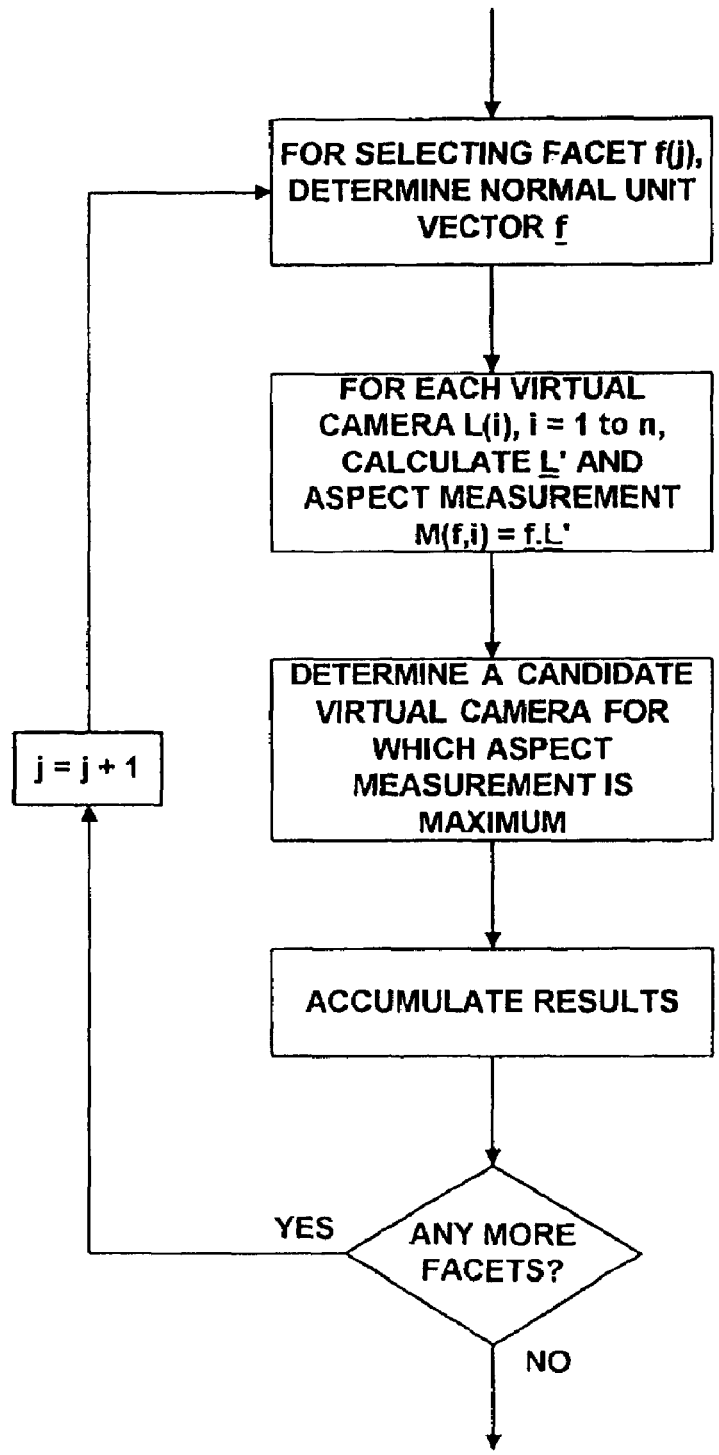
FIG. 54 is a flowchart illustrating determination of candidate virtual cameras.
Figure 55:
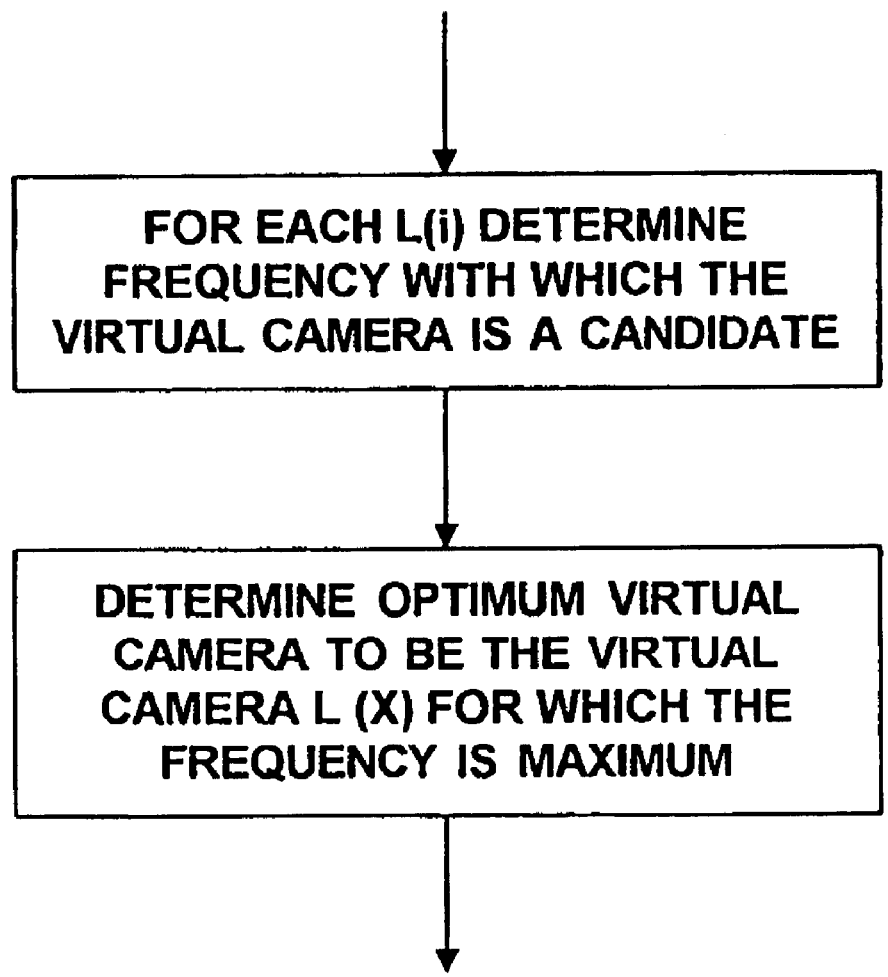
FIG. 55 is a flowchart illustrating the determination of the optimum virtual camera.
Figure 56:
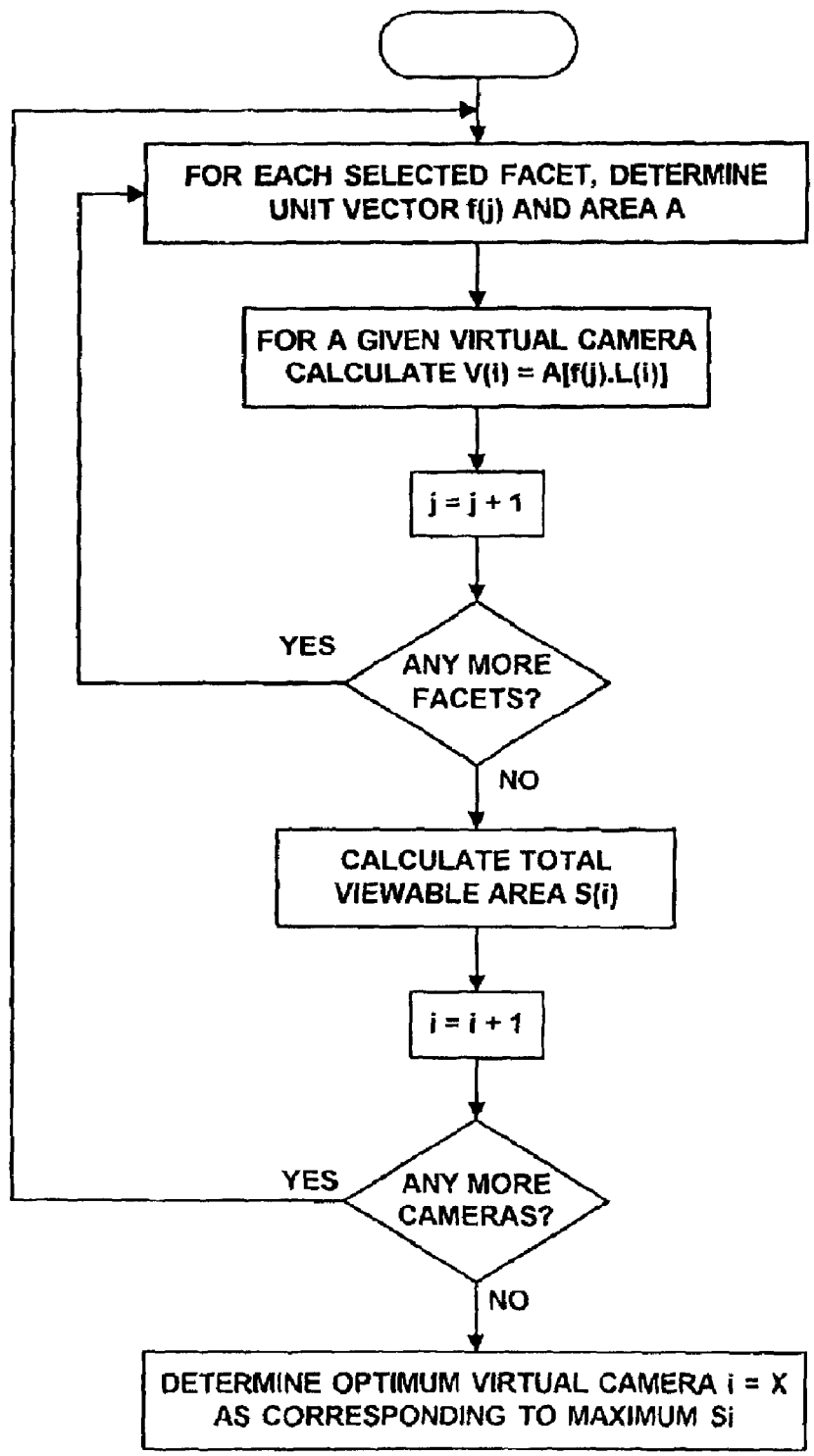
FIG. 56 is a flowchart illustrating the determination of the optimum virtual camera based on viewable area measurements.

The selection of optimised camera images as summarised in FIG. 53 therefore includes at step 691 the step of determining a candidate virtual camera for each facet, the candidate virtual camera being in each case a respective virtual camera L(I) for which the aspect measurement M(f,i) has a maximum value. This determination is repeated for each of the facets as illustrated in the flowchart of FIG. 54 where the results of aspect measurement are accumulated until all of the selected facets have been processed.

Figure 49:
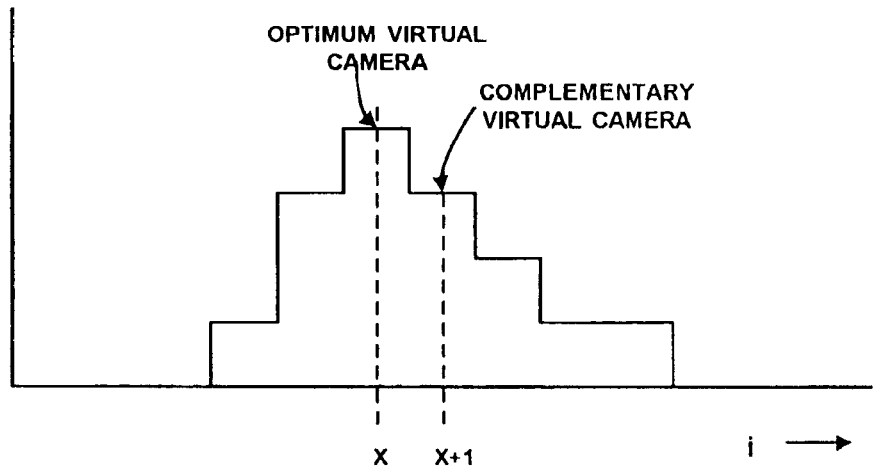
FIG. 49 is a graphical representation showing the frequency with which virtual cameras are selected as candidate virtual cameras for the selected set of facets.

The accumulated results for a given set of facets are illustrated in FIG. 49 in histogram form, showing the frequency with which each of the virtual cameras is selected to be a candidate virtual camera in step 691.

The virtual camera for which this frequency is a maximum is identified from the accumulated results as being the optimum virtual camera, illustrated in FIG. 49 to correspond to the value i=X.

In FIG. 53 therefore, step 692 of determining the optimum virtual camera consists of identifying the maximum frequency from the accumulated results of step 691, thereby identifying virtual camera X from the candidate virtual cameras and thereby allowing the first camera image to be identified at step 693 by identifying the image data yielding the position and look direction data for virtual camera X.

The first camera image 601 as illustrated in FIG. 44 corresponds to this image data. To obtain the second camera image 602, a second virtual camera must be identified at step 694 of FIG. 53. A complementary virtual camera is therefore selected from the accumulated results of aspect measurement according to a predetermined protocol in which, for a frequency distribution as shown in FIG. 49, the complementary virtual camera corresponds to i=X+1, being the virtual camera for which the next highest frequency is obtained in the direction of increasing i.

The predetermined protocol for determining the complementary virtual camera may take account of frequency distributions in which there are twin peaks or where there are several virtual cameras having the same maximum frequency by selecting the first maximum to occur in the direction of increasing i as being the optimum virtual camera and the second maximum frequency to occur in the direction of increasing i as indicating the complementary virtual camera.

The image data selected for the second camera image 602 is identified as corresponding to the complementary virtual camera image and the first and second camera images are then displayed side by side as illustrated in FIG. 43 in the camera image window 603.

Figure 52B:
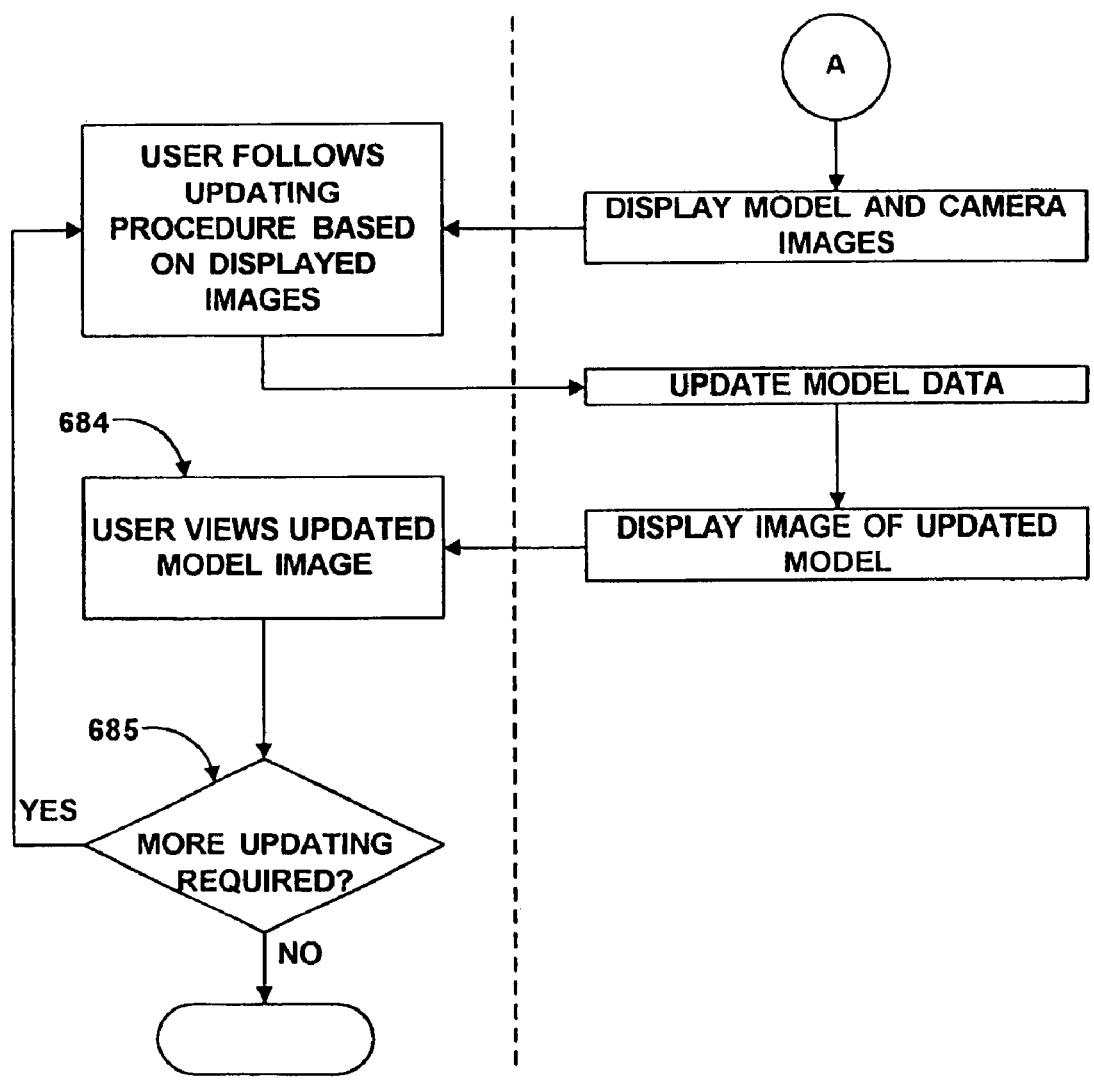

As indicated in FIG. 52B, the user then selects at step 684 the model updating mode which in the example of the present embodiment will be described in terms of updating the model data in response to the input of matching points in the first and second camera images. This method therefore utilises aspects of the method described above with reference to FIGS. 37 to 41.

During the updating procedure, the user successively enters image co-ordinates using the computer mouse 526 as a pointing device in conjunction with the cursor 530, matched points in the first and second camera images 601 and 602 being used by the apparatus to develop further model data and produce an updated model image 580 therefrom.

The user may then refine the appearance of the model image 580 to match more closely the camera images 601, 602. In particular, by matching points in the first and second camera images surrounding the feature seen in views 604 and 605 respectively of FIG. 43, the model data relating to the region of the selection facets 600 may then be refined.

Figure 50:
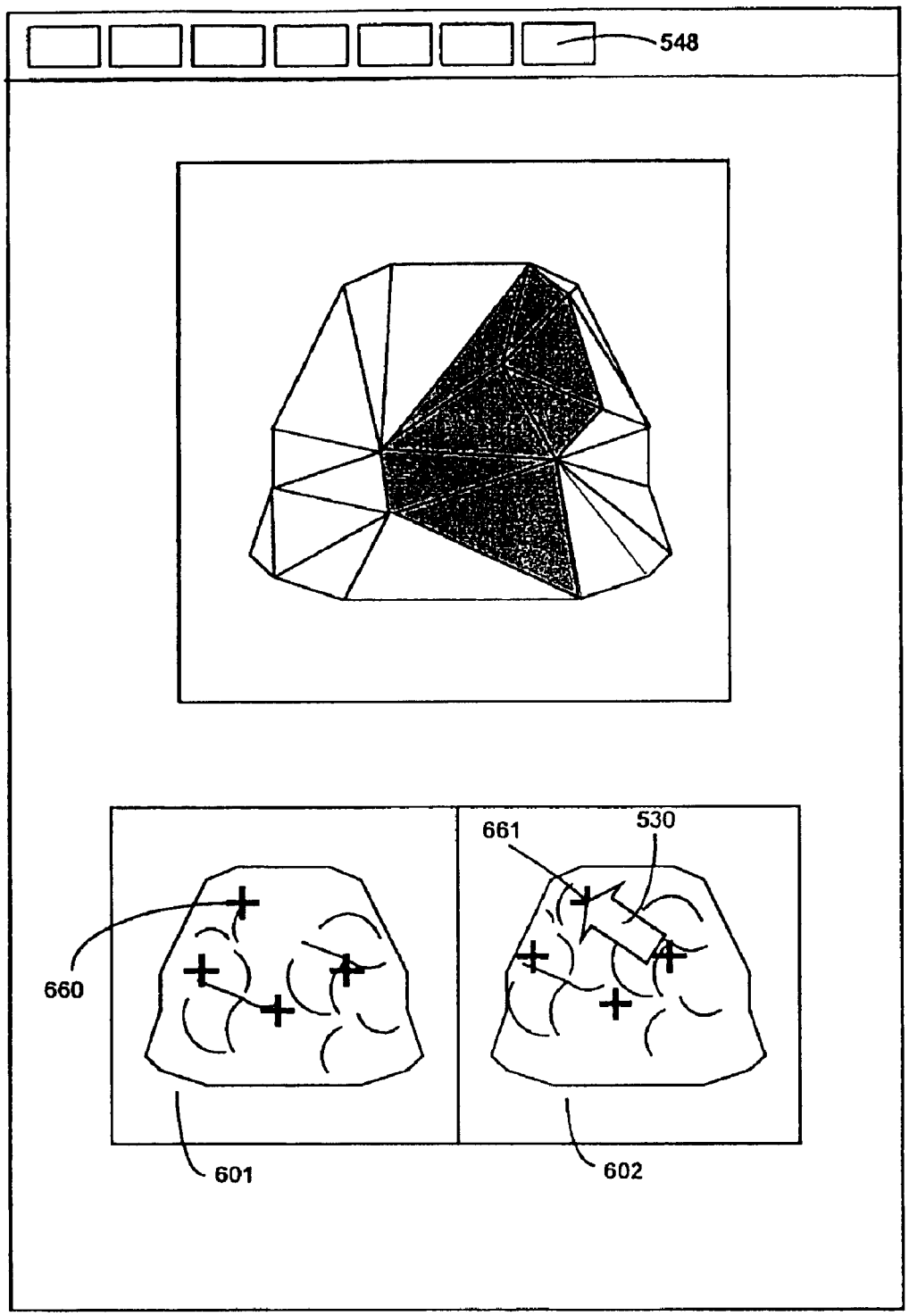
FIG. 50 is a schematic illustration of updating model data by the selection of matching points in camera images.

FIG. 50 illustrates schematically the process of entering matching points 660 and 661 in the first and second camera images 601 and 602 respectively, the model image 580 being updated in real time accordingly as the model data is updated. A first point 660 is entered by clicking the mouse when the cursor 530 is positioned at a required feature in the first camera image and a second point 661 is then entered in the second camera image 602 at a position judged by the user to match the image feature identified by the first point 660. This matched pair of points is then processed by the apparatus. Further pairs of matched points are subsequently entered and the model image is incrementally updated accordingly.

As illustrated in FIG. 52B, the process ends when the updating of the model data is judged at step 685 to be complete by the user.

Figure 47:
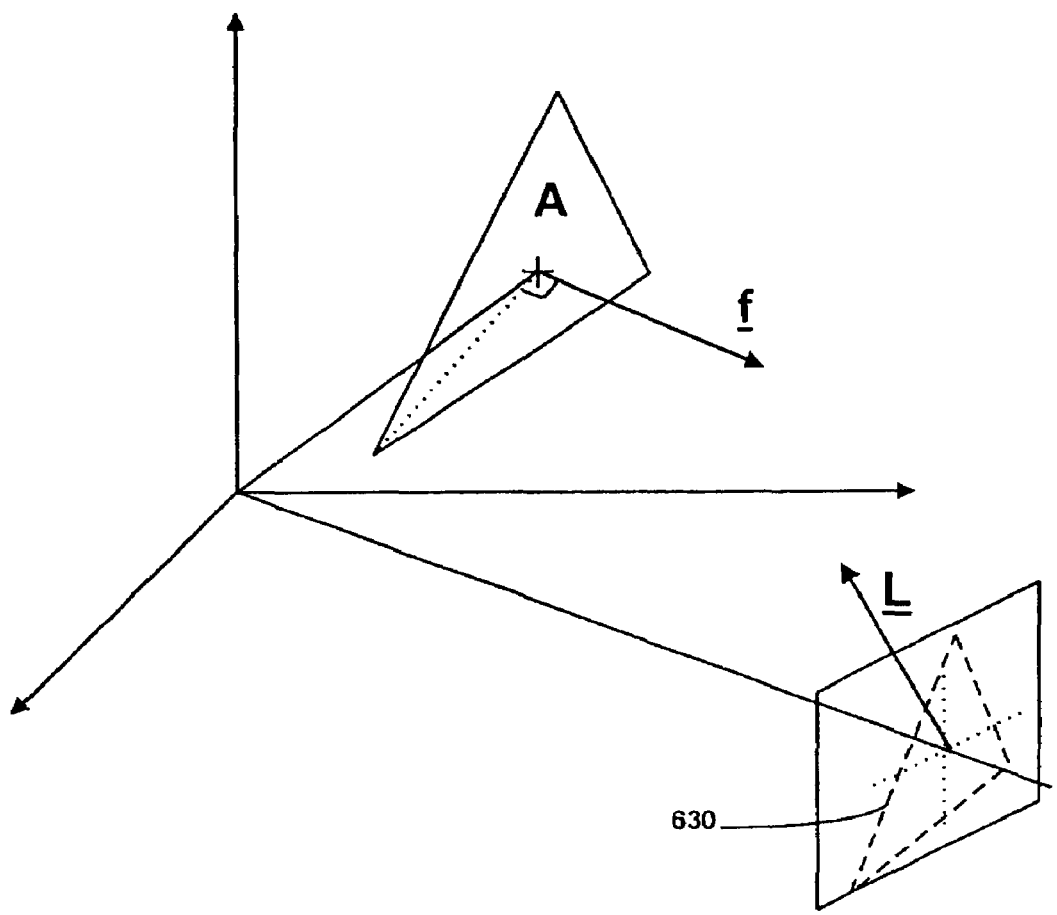
FIG. 47 is a diagram illustrating a projected area of a facet for use in visible area measurement.

An alternative method of calculating the optimum virtual camera based on visible area measurement will now be described with reference to FIG. 47, the method being based on a viewable area measurement. For each facet of the selected set of facets, a surface area A and a unit vector $\underline{f}$ normal to the facet are defined. For a given virtual camera L(i) having a look direction defined by unit vector $\underline{L}$, the viewable area 630 when viewed from the virtual camera in projection in the look direction is proportional both to the scalar product of the unit vectors and to the area; a viewable area measurement V(i) is therefore defined to be $$V(i)=A[f.L]$$

where the square brackets indicate modulus. The viewable area measurement is calculated for each of the selected facets with respect to the virtual camera and summed to provide a total viewable area measurement S(i).

The calculation of total viewable area measurement is repeated for each of the virtual cameras i and the optimum virtual camera determined as being the virtual camera for which S(i) is a maximum. The first camera image 601 may thereby be identified from this determination of the optimum virtual camera by determining the frame of image data associated with this virtual camera. The second camera image 602 may then be identified by determining a complementary virtual camera by determining the maximum total viewable area measurement of the remaining virtual cameras. As in the case of the aspect measurement process, ambiguities caused by a plurality of cameras having the same measurement are resolved by selecting virtual cameras in the order of increasing i.

The method steps for the calculation of the optimum virtual camera described above are illustrated in the flowchart of FIG. 56.

An alternative method for updating the model data using a "drag and drop" technique will now be described with reference to FIGS. 51A and 51B and the method steps in the flowchart of FIG. 57.

Figure 51A:
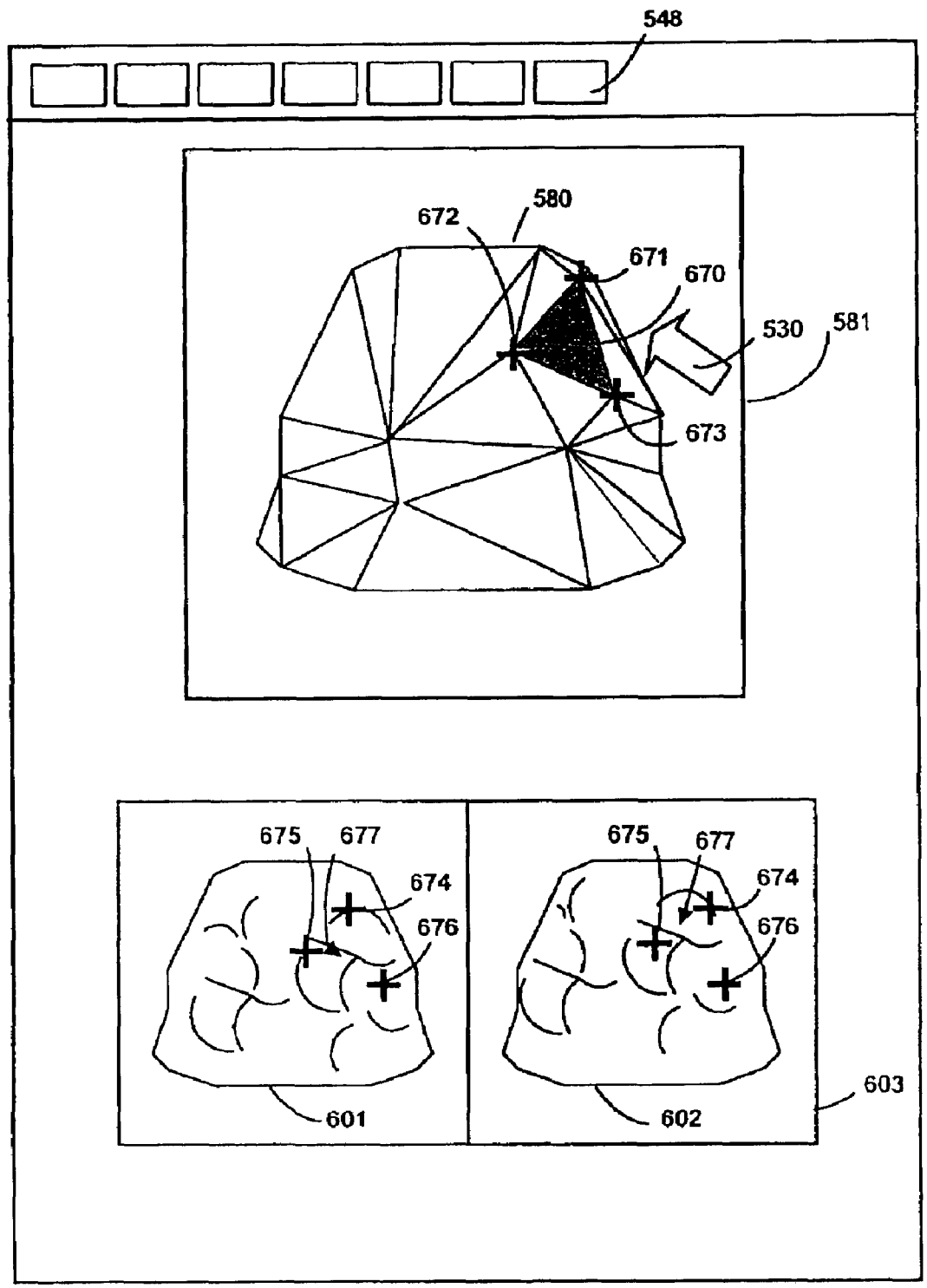
FIG. 51A is a schematic illustration of updating model data using a drag and drop technique.
Figure 57:
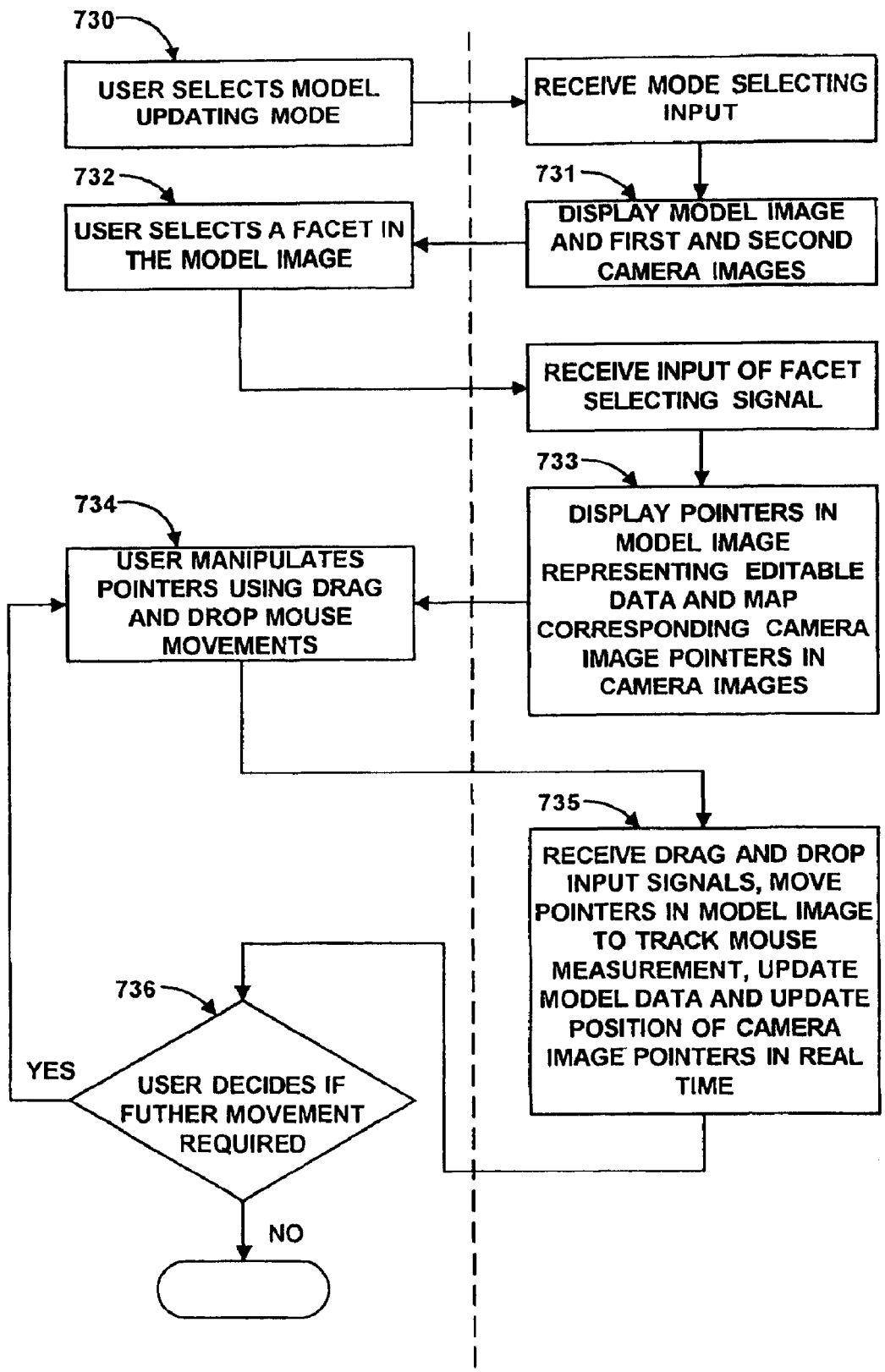
FIG. 57 is a flowchart illustrating an alternative method for updating model data using a drag and drop technique.

As indicated in FIG. 57, the user selects at step 730 a model updating mode in response to which the apparatus displays (step 731) a model image 580 as shown in FIG. 51A in a model image window 581, and at the same time displays first and second camera images 601 and 602 in a camera image window 603. The first and second camera images 601 and 602 may be selected by any of the above described methods. The user then selects (step 732) a facet 670 in the model image 580 using the cursor 530 and mouse, the apparatus responding to the generation of the facet selection signal by displaying (step 733) pointers 671, 672 and 673 in the model image 580 at corners of the facet 670 to represent model data points which can be edited. Corresponding pointers 674, 675 and 676 are mapped into each of the camera images 601 and 602 at locations determined in accordance with the camera position and look direction information associated with these frames of the image data.

As shown in FIG. 51A, the camera images 601 and 602 include a prominent feature 677, the apex of which is represented in the model image by pointer 672 which, as illustrated schematically in FIG. 51A, is incorrectly positioned when compared with the camera images. The user then uses the mouse 526 and cursor 530 to manipulate (step 734) the position of the pointer 672 in the model image 580 using a "drag and drop" technique in which the mouse is actuated to select the pointer 672 and the mouse actuating key depressed while moving the mouse and cursor position to a revised position. The apparatus tracks this movement (step 735) and, on releasing the mouse, the pointer 672 then remains in its edited position. The user may decide (step 736) to carry out further editing, repeating steps 734 and 735 accordingly. The model data is updated in accordance with the edited positions. Although the movement of the pointer 672 defines movement of the model point in only two dimensions, the edited model point position can be determined by constraining movement to lie in a plane orthogonal to the direction in which the projection of the model is viewed to arrive at the model image 580.

Figure 51B:
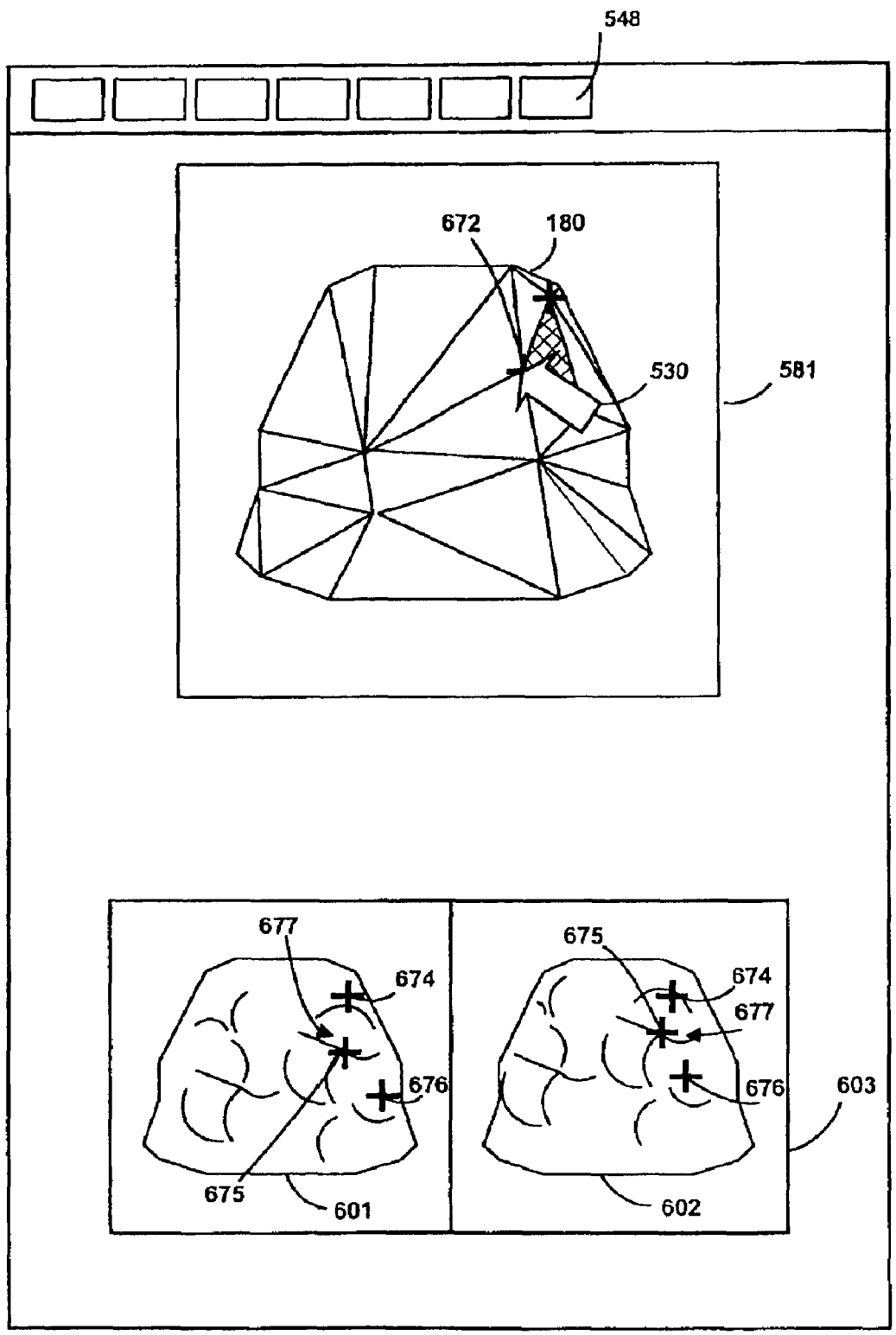
FIG. 51B is a further illustration of the drag and drop technique, showing movement of a model point.

The editing process is illustrated in FIG. 51B in which the new position of the pointer 672 is shown in the model image. Throughout this editing process, the position of the corresponding pointers 675 in the camera images 601 and 602 are updated in real time so that the user may observe this movement until, as shown in FIG. 51B, these pointers are coincident with the apex of the feature 677. The model data is thereby edited such that the model image represents more closely the prominent feature 677.

As illustrated in the flowchart of FIG. 57, this editing procedure may be repeated by dragging and dropping further pointers from the same facet 670 or by selecting further facets to access additional pointers.

The above mentioned methods for selecting the optimum virtual camera in order to select the best camera image ensure that the above drag and drop editing process is carried out in the simplest and most effective manner since the best camera images are provided to the user for the editing procedure.

The apparatus of the above embodiment may conveniently be constituted by a desktop computer operated by a computer program for operating the above described method steps in accordance with program code stored in the computer. The program code may be stored in a portable storage medium such as a CD ROM, floppy discs or optical disc, represented generally by reference 528 in FIG. 36.

An aspect of the present invention thus provides such a storage medium storing processor implementable instructions for controlling a processor to carry out the method described above.

Further, the computer program can be obtained in electronic form for example by downloading the code over a network such as the Internet. In FIG. 36, a modem 538 suitable for such downloading is represented schematically.

Thus, in accordance with another aspect of present invention, there is provided an electrical signal 539 (FIG. 36) carrying processor implementable instructions for controlling the processor to carry out the method described above.

Further embodiments of the present invention are envisaged in which for example the display of the model image may be other than a rendered image and may for example be in the form of a wire frame.

The embodiments described with reference to FIGS. 42 to 57 refer to the selection of facets in the model image. More generally, the invention is applicable to the selection of any appropriate primitives in the model, such as for example, polygonal facets of more than three sides, lines or three-dimensional elements, and corresponding methods using such primitives are intended to fall within the scope of the present invention by appropriate modification to the above described embodiments.

Similarly, in the drag and drop method described above with reference to FIGS. 51A and 51B, other primitives may be moved by the drag and drop technique, for example the entire facet may be moved in a manner which retains its shape or a line may be translated from one position to another. The drag and drop technique may also incorporate rotational movement for those primitives in respect of which such rotation would be appropriate.

In the above described technique of matching points as shown in FIG. 50, a magnified image window of the type illustrated in FIG. 37 may additionally be provided in each of the camera images in order to assist the operator in accurate cursor movement, using the method described above with reference to FIGS. 37 to 41.

The present application incorporates by cross-reference the full contents of the following application of the assignee which are being filed simultaneously herewith:

Attorney reference CFP1793US (2636550) which claims priority from UK applications 9927876.4, 9927875.6, 0019081.9 and 0019122.1.

Attorney reference CFP1797US (2641050) which claims priority from UK applications 9929957.0 and 0019123.9.

Attorney reference CFP1796US (2641950) which claims priority from UK applications 9927906.9, 9927907.7, 9927909.3, 0019080.1, 0019087.6 and 0019086.8.

ANNEX. A

1. Corner Detection 1.1 Summary

This process described below calculates corner points, to sub-pixel accuracy, from a single grey scale or colour image. It does this by first detecting edge boundaries in the image and then choosing corner points to be points where a strong edge changes direction rapidly. The method is based on the facet model of corner detection, described in Haralick and Shapiro[i].

1.2 Algorithm

The algorithm has four stages:

(1) Create grey scale image (if necessary);

(2) Calculate edge strengths and directions;

(3) Calculate edge boundaries;

(4) Calculate corner points.

1.2.1 Create Grey Scale Image

The corner detection method works on grey scale images. For colour images, the colour values are first converted to floating point grey scale values using the formula:

$$\text{grey\_scale}=(0.3\times\text{red})+(0.59\times\text{green})+(0.11\times\text{blue}) \quad \text{A-1}$$

This is the standard definition of brightness as defined by NTSC and described in Foley and van Dam[ii].

1.2.2 Calculate Edge Strengths and Directions

The edge strengths and directions are calculated using the 7×7 integrated directional derivative gradient operator discussed in section 8.9 of Haralick and Shapiro[i].

The row and column forms of the derivative operator are both applied to each pixel in the grey scale image. The results are combined in the standard way to calculate the edge strength and edge direction at each pixel.

The output of this part of the algorithm is a complete derivative image.

1.2.3 Calculate Edge Boundaries

The edge boundaries are calculated by using a zero crossing edge detection method based on a set of 5×5 kernels describing a bivariate cubic fit to the neighbourhood of each pixel.

The edge boundary detection method places an edge at all pixels which are close to a negatively sloped zero crossing of the second directional derivative taken in the direction of the gradient, where the derivatives are defined using the bivariate cubic fit to the grey level surface. The subpixel location of the zero crossing is also stored along with the pixel location.

The method of edge boundary detection is described in more detail in section 8.8.4 of Haralick and Shapiro[i].

1.2.4 Calculate Corner Points

The corner points are calculated using a method which uses the edge boundaries calculated in the previous step.

Corners are associated with two conditions:

(1) the occurrence of an edge boundary; and (2) significant changes in edge direction.

Each of the pixels on the edge boundary is tested for "cornerness" by considering two points equidistant to it along the tangent direction. If the change in the edge direction is greater than a given threshold then the point is labelled as a corner. This step is described in section 8.10.1 of Haralick and Shapiro[i].

Finally the corners are sorted on the product of the edge strength magnitude and the change of edge direction. The top 200 corners which are separated by at least 5 pixels are output.

2. Feature Tracking 2.1 Summary

This process described below tracks feature points (typically corners) across a sequence of grey scale or colour images.

The tracking method uses a constant image velocity Kalman filter to predict the motion of the corners, and a correlation based matcher to make the measurements of corner correspondences.

The method assumes that the motion of corners is smooth enough across the sequence of input images that a constant velocity Kalman filter is useful, and that corner measurements and motion can be modelled by gaussians.

2.2 Algorithm

1) Input corners from an image.

2) Predict forward using Kalman filter.

3) If the position uncertainty of the predicted corner is greater than a threshold, A, as measured by the state positional variance, drop the corner from the list of currently tracked corners.

4) Input a new image from the sequence.

5) For each of the currently tracked corners:

a) search a window in the new image for pixels which match the corner;

b) update the corresponding Kalman filter, using any new observations (i.e. matches).

6) Input the corners from the new image as new points to be tracked (first, filtering them to remove any which are too close to existing tracked points).

7) Go back to (2)

2.2.1 Prediction

This uses the following standard Kalman filter equations for prediction, assuming a constant velocity and random uniform gaussian acceleration model for the dynamics:

$$X_{n+1}=\Theta_{n+1,n}X_n \quad \text{A-2}$$

$$K_{n+1}=\Theta_{n+1,n}K_n\Theta_{n+1,n}^T+Q_n \quad \text{A-3}$$

where x is the 4D state of the system, (defined by the position and velocity vector of the corner), K is the State covariance matrix, Θ is the transition matrix, and Q is the process covariance matrix.

In this model, the transition matrix and process covariance matrix are constant and have the following values:

$$\Theta_{n+1,n} = \begin{pmatrix} I & I \\ 0 & I \end{pmatrix} \quad \text{A-4}$$

$$Q_n = \begin{pmatrix} 0 & 0 \\ 0 & \sigma_v^2 I \end{pmatrix} \quad \text{A-5}$$

2.2.2 Searching and Matching

This uses the positional uncertainty (given by the top two diagonal elements of the state covariande matrix, K) to define a region in which to search for new measurements (i.e. a range gate).

The range gate is a rectangular region of dimensions:

$$\Delta x = \sqrt{K_{11}}, \Delta y = \sqrt{K_{33}} \quad \text{A-6}$$

The correlation score between a window around the previously measured corner and each of the pixels in the range gate is calculated.

The two top correlation scores are kept.

If the top correlation score is larger than a threshold, $C_0$, and the difference between the two top correlation scores is larger than a threshold $\Delta C$, then the pixel with the top correlation score is kept as the latest measurement.

2.2.3 Update

The measurement is used to update the Kalman filter in the standard way:

$$G = KH^T(HKH^T + R)^{-1} \quad \text{A-7}$$

$$x \leftarrow x + G(\hat{x} - Hx) \quad \text{A-8}$$

$$K \leftarrow (I - GH)K \quad \text{A-9}$$

where G is the Kalman gain, H is the measurement matrix, and R is the measurement covariance matrix.

In this implementation, the measurement matrix and measurement covariance matrix are both constant, being given by:

$$H = (I\,0) \quad \text{A-10}$$

$$R = \sigma^2 I \quad \text{A-11}$$

2.2.4 Parameters

The parameters of the algorithm are:
Initial conditions: $x_0$ and $K_0$.
Process velocity variance: $\sigma_v^2$.
Measurement variance: $\sigma^2$.
Position uncertainty threshold for loss of track: $\Delta$.
Covariance threshold: $C_0$.
Matching ambiguity threshold: $\Delta C$.

For the initial conditions, the position of the first corner measurement and zero velocity are used, with an initial covariance matrix of the form:

$$K_0 = \begin{pmatrix} 0 & 0 \\ 0 & \sigma_0^2 I \end{pmatrix} \quad \text{A-12}$$

$\sigma_0^2$ is set to $\sigma_0^2 = 200(\text{pixels/frame})^2$.

The algorithm's behaviour over a long sequence is anyway not too dependent on the initial conditions.

The process velocity variance is set to the fixed value of 50 (pixels/frame)$^2$. The process velocity variance would have to be increased above this for a hand-held sequence. In fact it is straightforward to obtain a reasonable value for the process velocity variance adaptively.

The measurement variance is obtained from the following model:

$$\sigma^2 = (rK + a) \quad \text{A-13}$$

where $K = 1/\sqrt{(K_{11} K_{22})}$ is a measure of the positional uncertainty, r is a parameter related to the likelihood of obtaining an outlier, and a is a parameter related to the measurement uncertainty of inliers. "r" and "a" are set to r=0.1 and a=1.0.

This model takes into account, in a heuristic way, the fact that it is more likely that an outlier will be obtained if the range gate is large.

The measurement variance (in fact the full measurement covariance matrix R) could also be obtained from the behaviour of the auto-correlation in the neighbourhood of the measurement. However this would not take into account the likelihood of obtaining an outlier.

The remaining parameters are set to the values: $\Delta$=400 pixels$^2$, $C_0$=0.9 and $\Delta C$=0.001.

3. 3D Surface Generation

3.1 Architecture

In the method described below, it is assumed that the object can be segmented from the background in a set of images completely surrounding the object. Although this restricts the generality of the method, this constraint can often be arranged in practice, particularly for small objects.

The method consists of five processes, which are run consecutively:

First, for all the images in which the camera positions and orientations have been calculated, the object is segmented from the background, using colour information. This produces a set of binary images, where the pixels are marked as being either object or background.

The segmentations are used, together with the camera positions and orientations, to generate a voxel carving, consisting of a 3D grid of voxels enclosing the object. Each of the voxels is marked as being either object or empty space.

The voxel carving is turned into a 3D surface triangulation, using a standard triangulation algorithm (marching cubes).

The number of triangles is reduced substantially by passing the triangulation through a decimation process.

Finally the triangulation is textured, using appropriate parts of the original images to provide the texturing on the triangles.

3.2 Segmentation

The aim of this process is to segment an object (in front of a reasonably homogeneous coloured background) in an image using colour information. The resulting binary image is used in voxel carving.

Two alternative methods are used:

Method 1: input a single RGB colour value representing the background colour—each RGB pixel in the image is examined and if the Euclidean distance to the background colour (in RGB space) is less than a specified threshold the pixel is labelled as background (BLACK).

Method 2: input a "blue" image containing a representative region of the background.

The algorithm has two stages:

(1) Build a hash table of quantised background colours (2). Use the table to segment each image.

Step 1) Build Hash Table

Go through each RGB pixel, p, in the "blue" background image.

Set q to be a quantised version of p. Explicitly:

$$q = (p + t/2)/t \quad \text{A-14}$$

where t is a threshold determining how near RGB values need to be to background colours to be labelled as background.

The quantisation step has two effects:
1) reducing the number of RGB pixel values, thus increasing the efficiency of hashing;
2) defining the threshold for how close a RGB pixel has to be to a background colour pixel to be labelled as background.

q is now added to a hash table (if not already in the table) using the (integer) hashing function $$h(q)=(q\_red\&7)*2^6+(q\_green\&7)*2^3+(q\_blue\&7) \quad \text{A-15}$$

That is, the 3 least significant bits of each colour field are used. This function is chosen to try and spread out the data into the available bins. Ideally each bin in the hash table has a small number of colour entries. Each quantised colour RGB triple is only added once to the table (the frequency of a value is irrelevant).

Step 2) Segment Each Image

Go through each RGB pixel, v, in each image.

Set w to be the quantised version of v as before.

To decide whether w is in the hash table, explicitly look at all the entries in the bin with index h(w) and see if any of them are the same as w. If yes, then v is a background pixel—set the corresponding pixel in the output image to BLACK. If no then v is a foreground pixel—set the corresponding pixel in the output image to WHITE Post Processing For both methods a post process is performed to fill small holes and remove small isolated regions.

A median filter is used with a circular window. (A circular window is chosen to avoid biasing the result in the x or y directions).

Build a circular mask of radius r. Explicitly store the start and end values for each scan line on the circle.

Go through each pixel in the binary image.

Place the centre of the mask on the current pixel. Count the number of BLACK pixels and the number of WHITE pixels in the circular region.

If (#WHITE pixels≧#BLACK pixels) then set corresponding output pixel to WHITE. Otherwise output pixel is BLACK.

3.3 Voxel Carving

The aim of this process is to produce a 3D voxel grid, enclosing the object, with each of the voxels marked as either object or empty space.

The input to the algorithm is:

a set of binary segmentation images, each of which is associated with a camera position and orientation;

2 sets of 3D co-ordinates, (xmin, ymin, zmin) and (xmax, ymax, zmax), describing the opposite vertices of a cube surrounding the object;

a parameter, n, giving the number of voxels required in the voxel grid.

A pre-processing step calculates a suitable size for the voxels (they are cubes) and the 3D locations of the voxels, using n, (xmin, ymin, zmin) and (xmax, ymax, zmax).

Then, for each of the voxels in the grid, the mid-point of the voxel cube is projected into each of the segmentation images. If the projected point falls onto a pixel which is marked as background, on any of the images, then the corresponding voxel is marked as empty space, otherwise it is marked as belonging to the object.

Voxel carving is described further in "Rapid Octree Construction from Image Sequences" by R. Szeliski in CVGIP: Image Understanding, Volume 58, Number 1, July 1993, pages 23-32.

3.4 Marching Cubes

The aim of the process is to produce a surface triangulation from a set of samples of an implicit function representing the surface (for instance a signed distance function). In the case where the implicit function has been obtained from a voxel carve, the implicit function takes the value −1 for samples which are inside the object and +1 for samples which are outside the object.

Marching cubes is an algorithm that takes a set of samples of an implicit surface (e.g. a signed distance function) sampled at regular intervals on a voxel grid, and extracts a triangulated surface mesh. Lorensen and Cline[iii] and Bloomenthal[iv] give details on the algorithm and its implementation.

The marching-cubes algorithm constructs a surface mesh by "marching" around the cubes while following the zero crossings of the implicit surface f(x)=0, adding to the triangulation as it goes. The signed distance allows the marching-cubes algorithm to interpolate the location of the surface with higher accuracy than the resolution of the volume grid. The marching cubes algorithm can be used as a continuation method (i.e. it finds an initial surface point and extends the surface from this point).

3.5 Decimation

The aim of the process is to reduce the number of triangles in the model, making the model more compact and therefore easier to load and render in real time.

The process reads in a triangular mesh and then randomly removes each vertex to see if the vertex contributes to the shape of the surface or not. (i.e. if the hole is filled, is the vertex a "long" way from the filled hole). Vertices which do not contribute to the shape are kept out of the triangulation. This results in fewer vertices (and hence triangles) in the final model.

The algorithm is described below in pseudo-code.

INPUT

Read in vertices

Read in triples of vertex IDs making up triangles

PROCESSING

Repeat NVERTEX times

Choose a random vertex, V, which hasn't been chosen before

Locate set of all triangles having V as a vertex, S

Order S so adjacent triangles are next to each other

Re-triangulate triangle set, ignoring V (i.e. remove selected triangles & V and then fill in hole)

Find the maximum distance between V and the plane of each triangle

If (distance<threshold)

Discard V and keep new triangulation

Else

Keep V and return to old triangulation

OUTPUT

Output list of kept vertices

Output updated list of triangles

The process therefore combines adjacent triangles in the model produced by the marching cubes algorithm, if this can be done without introducing large errors into the model.

The selection of the vertices is carried out in a random order in order to avoid the effect of gradually eroding a large part of the surface by consecutively removing neighbouring vertices.

3.6 Further Surface Generation Techniques

Further techniques which may be employed to generate a 3D computer model of an object surface include voxel colouring, for example as described in "Photorealistic Scene Reconstruction by Voxel Coloring" by Seitz and Dyer in Proc. Conf. Computer Vision and Pattern Recognition 1997, p 1067-1073, "Plenoptic Image Editing" by Seitz and Kutulakos in Proc. 6th International Conference on Computer Vision, pp 17-24, "What Do N Photographs Tell Us About 3D Shape?" by Kutulakos and Seitz in University of Rochester Computer Sciences Technical Report 680, January 1998, and "A Theory of Shape by Space Carving" by Kutulakos and Seitz in University of Rochester Computer Sciences Technical Report 692, May 1998.

4. Texturing

The aim of the process is to texture each surface polygon (typically a triangle) with the most appropriate image texture. The output of the process is a VRML model of the surface, complete with texture co-ordinates.

The triangle having the largest projected area is a good triangle to use for texturing, as it is the triangle for which the texture will appear at highest resolution.

A good approximation to the triangle with the largest projected area, under the assumption that there is no substantial difference in scale between the different images, can be obtained in the following way.

For each surface triangle, the image "i" is found such that the triangle is the most front facing (i.e. having the greatest value for $\hat{n}_t \cdot \hat{v}_i$, where $\hat{n}_t$ is the triangle normal and $\hat{v}_i$ is the viewing direction for the "i"th camera). The vertices of the projected triangle are then used as texture co-ordinates in the resulting VRML model.

This technique can fail where there is a substantial amount of self-occlusion, or several objects occluding each other. This is because the technique does not take into account the fact that the object may occlude the selected triangle. However, in practice this does not appear to be much of a problem.

It has been found that, if every image is used for texturing then this can result in very large VRML models being produced. These can be cumbersome to load and render in real time. Therefore, in practice, a subset of images is used to texture the model. This subset may be specified in a configuration file.

REFERENCES i R M Haralick and L G Shapiro: "Computer and Robot Vision Volume 1", Addison-Wesley, 1992, ISBN 0-201-10877-1 (v.1), section 8.
ii J Foley, A van Dam, S Feiner and J Hughes: "Computer Graphics: Principles and Practice", Addison-Wesley, ISBN 0-201-12110-7.
iii W. E. Lorensen and H. E. Cline: "Marching Cubes: A High Resolution 3D Surface Construction Algorithm"; in Computer Graphics, SIGGRAPH 87 proceedings, 21: 163-169, July 1987.
iv J. Bloomenthal: "An Implicit Surface Polygonizer", Graphics Gems IV, AP Professional, 1994, ISBN 0123361559, pp 324-350.

The invention claimed is:

1. A method of generating model data representative of a model in a three dimensional space of an object from input signals representative of a set of images of the object taken from a plurality of respective camera positions, the method comprising the steps of:
using a computer to perform the following steps:
displaying a model image derived from the model data and comprising a plurality of primitives for viewing by a user;
receiving at least one primitive selection signal responsive to user actuation of an input means whereby each primitive selection signal identifies a respective selected primitive of the model;
defining a plurality of virtual cameras in the three dimensional space having positions and look directions relative to the model which correspond substantially to those of the respective actual cameras relative to the object;
evaluating which of the virtual cameras is an optimum virtual camera for generating a view of the selected primitives;
identifying from the camera images a first camera image of the plurality of camera images taken from a camera position corresponding to that of the optimum virtual camera, and
determining from the camera images a second camera image as being suitable for matching features in the first camera image and displaying the second camera image for comparison by the user with the first camera image.

2. A method as claimed in claim 1, wherein the second camera image is taken from a camera position proximate to the optimum camera position.

3. A method as claimed in claim 1, further comprising the step of receiving feature matching selection signals representative of user matched points in the first and second camera images.

4. A method as claimed in claim 3, further comprising the step of generating updated model data to include additional detail corresponding to the received feature matching selection signals rendering the updated model data to generate an updated model image and displaying the updated model image.

5. A method of generating model data representative of a model in a three dimensional space of an object from input signals representative of a set of images of the object taken from a plurality of respective camera positions, the method comprising the steps of:
using a computer to perform the following steps:
displaying a model image derived from the model data and comprising a plurality of primitives for viewing by a user;
receiving at least one primitive selection signal responsive to user actuation of an input means whereby each primitive selection signal identifies a respective selected primitive of the model;
defining a plurality of virtual cameras in the three dimensional space having positions and look directions relative to the model which correspond substantially to those of the respective actual cameras relative to the object;
evaluating which of the virtual cameras is an optimum virtual camera for generating a view of the selected primitives; and
identifying from the camera images a first camera image of the plurality of camera images taken from a camera position corresponding to that of the optimum virtual camera,
wherein the evaluating step comprises:
calculating for a selected primitive an aspect measurement representative of the visibility of the primitive when viewed in projection in the look direction of one of the virtual cameras;
repeating the calculating step to obtain a respective aspect measurement for each of the virtual cameras;

comparing the aspect measurements for the selected primitive and determining a candidate virtual camera to be the virtual camera for which the corresponding aspect measurement is a maximum;

repeating the calculating, comparing and determining steps for each of the selected primitive whereby candidate virtual cameras are determined for each selected primitive; and choosing the optimum virtual camera on the basis of the frequency with which virtual cameras are determined to be candidate virtual cameras.

6. A method as claimed in claim 5, wherein the primitives comprise facets.

7. A method as claimed in claim 6, wherein the calculation of the aspect measurement comprises, for a given facet and a given virtual camera, calculating a scalar product of a unit vector normal to the facet and a unit vector parallel to the look direction of the virtual camera.

8. A method as claimed in claim 6, wherein the calculation of aspect measurement comprises calculating, for a given facet and for a given virtual camera, an area of the facet when viewed in projection in the look direction of the virtual camera.

9. A method as claimed in claim 1, wherein the input means is a pointing means co-operable with a display means to provide input signals in the form of image co-ordinates of the displayed image.

10. A method as claimed in claim 1, further comprising the step of generating the displayed model image by rendering the image data.

11. Apparatus for generating model data representative of a model in a three dimensional space of an object from input signals representative of a set of images of the object taken from a plurality of respective camera positions, the apparatus comprising:

display means and control means operable to control the display means to display a model image derived from the model data and comprising a plurality of primitives for viewing by a user;

means for receiving at least one primitive selection signal responsive to user actuation of an input means whereby each primitive selection signal identifies a respective selected primitive of the model;

means for defining a plurality of virtual cameras in the three dimensional space having positions and look directions relative to the model which correspond substantially to those of the respective actual cameras relative to the object;

evaluating means for evaluating which of the virtual cameras is an optimum virtual camera for generating a view of the selected primitives;

identifying means for identifying from the camera images a first camera image of the plurality of camera images taken from a camera position corresponding to that of the optimum virtual camera; and determining means for determining from the camera images a second camera image as being suitable for matching features in the first camera image, the control means being operable to control the display means to display the second camera image for comparison by the user with the first camera image.

12. Apparatus as claimed in claim 11, wherein the second camera image is taken from a camera position proximate to the optimum camera position.

13. Apparatus as claimed in claim 11, further comprising means for receiving feature matching selection signals representative of user matched points in the first and second camera images.

14. Apparatus as claimed in claim 13, further comprising means for generating updated model data to include additional detail corresponding to the received feature matching selection signals, means for rendering the updated model data to generate an updated model image and means for controlling the display means to display the updated model image.

15. Apparatus for generating model data representative of a model in a three dimensional space of an object from input signals representative of a set of images of the object taken from a plurality of respective camera positions, the apparatus comprising:

display means and control means operable to control the display means to display a model image derived from the model data and comprising a plurality of primitives for viewing by a user;

means for receiving at least one primitive selection signal responsive to user actuation of an input means whereby each primitive selection signal identifies a respective selected primitive of the model;

means for defining a plurality of virtual cameras in the three dimensional space having positions and look directions relative to the model which correspond substantially to those of the respective actual cameras relative to the object;

evaluating means for evaluating which of the virtual cameras is an optimum virtual camera for generating a view of the selected primitives; and identifying means for identifying from the camera images a first camera image of the plurality of camera images taken from a camera position corresponding to that of the optimum virtual camera, wherein the evaluating means comprises:

means for calculating for a selected primitive an aspect measurement representative of the visibility of the primitive when viewed in projection in the look direction of one of the virtual cameras;

means for repeating the calculating step to obtain a respective aspect measurement for each of the virtual cameras;

means for comparing the aspect measurements for the selected primitive and for determining a candidate virtual camera to be the virtual camera for which the corresponding aspect measurement is a maximum;

means for repeating the calculating, comparing and determining steps for each of the selected primitive whereby candidate virtual cameras are determined for each selected primitive; and means for choosing the optimum virtual camera on the basis of the frequency with which virtual cameras are determined to be candidate virtual cameras.

16. Apparatus as claimed in claim 15, wherein the primitives comprise facets.

17. Apparatus as claimed in claim 16, wherein the means for calculation of the aspect measurement comprises, for a given facet and a given virtual camera, means for calculating a scalar product of a unit vector normal to the facet and a unit vector parallel to the look direction of the virtual camera.

18. Apparatus as claimed in claim 16, wherein the means for calculation of aspect measurement comprises means for calculating, for a given facet and for a given virtual camera, an area of the facet when viewed in projection in the look direction of the virtual camera.

19. Apparatus as claimed in claim 11, wherein the input means is a pointing means co-operable with the display means to provide input signals in the form of image coordinates of the displayed image.

20. Apparatus as claimed in claim 11, comprising means for generating the displayed model image by rendering the image data.

21. A computer readable medium encoded with a computer program to implement a method of generating model data representative of a model in a three dimensional space of an object from input signals representative of a set of images of the object taken from a plurality of respective camera positions, comprising the steps of:

displaying a model image derived from the model data and comprising a plurality of primitives for viewing by a user;

receiving at least one primitive selection signal responsive to user actuation of an input means whereby each primitive selection signal identifies a respective selected primitive of the model;

defining a plurality of virtual cameras in the three dimensional space having positions and look directions relative to the model which correspond substantially to those of the respective actual cameras relative to the object;

evaluating which of the virtual cameras is an optimum virtual camera for generating a view of the selected primitives;

identifying from the camera images a first camera image of the plurality of camera images taken from a camera position corresponding to that of the optimum virtual camera; and determining from the camera images a second camera image as being suitable for matching features in the first camera image and displaying the second camera image for comparison by the user with the first camera image.

* * * * *